(12) United States Patent
Cotte et al.

(10) Patent No.: US 10,990,797 B2
(45) Date of Patent: Apr. 27, 2021

(54) METHOD OF CHARACTERIZING AND IMAGING MICROSCOPIC OBJECTS

(71) Applicant: NANOLIVE SA, Ecublens (CH)

(72) Inventors: Yann Cotte, Lausanne (CH); Sebastien Equis, Penthalaz (CH); Bastian Dalla Piazza, Lausanne (CH); Sorin Pop, Cuvat (FR); Luca Clario, Saint-Sulpice (CH); Christopher Tremblay, Eysins (CH); Pierre-Alain Cotte, Amberg (DE)

(73) Assignee: NANOLIVE SA, Ecublens (CH)

( * ) Notice: Subject to any disclaimer, the term of this patent is extended or adjusted under 35 U.S.C. 154(b) by 131 days.

(21) Appl. No.: 16/309,292

(22) PCT Filed: Jun. 12, 2017

(86) PCT No.: PCT/EP2017/064328
§ 371 (c)(1),
(2) Date: Dec. 12, 2018

(87) PCT Pub. No.: WO2017/216123
PCT Pub. Date: Dec. 21, 2017

(65) Prior Publication Data
US 2019/0251330 A1 Aug. 15, 2019

(30) Foreign Application Priority Data
Jun. 13, 2016 (EP) .................................. 16174106

(51) Int. Cl.
*G06K 9/00* (2006.01)
*H04N 5/253* (2006.01)
(Continued)

(52) U.S. Cl.
CPC ........... *G06K 9/00147* (2013.01); *G01N 1/30* (2013.01); *G06K 9/0014* (2013.01);
(Continued)

(58) Field of Classification Search
USPC ........ 382/100, 103, 106–108, 128, 133–134, 382/154–155, 168, 173, 181, 190, 199,
(Continued)

(56) References Cited

U.S. PATENT DOCUMENTS

| 8,937,722 B2 | 1/2015 | Cotte et al. |
| 9,495,745 B2 * | 11/2016 | Remiszewski ....... G01N 21/314 |

(Continued)

FOREIGN PATENT DOCUMENTS

EP 2 998 776 3/2016

OTHER PUBLICATIONS

Barone-Nugent et al., "Quantitative phase-amplitude microscopy I: optical microscopy" *Journal of Microscopy*, vol. 206, pt 3: 194-203 (Jun. 2002).

(Continued)

*Primary Examiner* — Seyed H Azarian
(74) *Attorney, Agent, or Firm* — Nixon & Vanderhye P.C.

(57) ABSTRACT

Microscopic object characterization system (1), comprising a computer system (2, 2a, 2b), a microscope (4) with a computing unit (5) connected to the computer system, and an object characterization program (17) executable in the computer system configured to receive refractive index data representing at least a spatial distribution of measured values of refractive index (RI) or values correlated to refractive index of said microscopic object. The object characterization program is operable to execute an algorithm applying a plurality of transformations on said refractive index data. The transformations generate a distribution of two or more parameters used to characterize features of the microscopic object. The computer system further comprises a feedback interface configured for connection to one or more data servers in a network computing system, via a global communications network such as the internet, and configured to (Continued)

receive feedback data from the data servers for processing by the object characterization program to calibrate, refine or enhance a characterization of said features.

30 Claims, 42 Drawing Sheets

(51) Int. Cl.
*G01N 1/30* (2006.01)
*G06T 7/00* (2017.01)
*G06F 3/0484* (2013.01)

(52) U.S. Cl.
CPC ........ *G06K 9/00127* (2013.01); *G06T 7/0012* (2013.01); *G06F 3/04847* (2013.01); *G06T 2207/10056* (2013.01); *G06T 2207/10064* (2013.01); *G06T 2207/30024* (2013.01)

(58) Field of Classification Search
USPC ....... 382/219, 224, 276, 285–291, 305, 312, 382/272; 356/457; 348/49, 79; 514/1.1
See application file for complete search history.

(56) References Cited

U.S. PATENT DOCUMENTS

| | | | |
|---|---|---|---|
| 2009/0088376 A1* | 4/2009 | Baker, Jr. | A61K 49/0043 514/1.1 |
| 2013/0057869 A1* | 3/2013 | Cotte | G02B 21/365 356/457 |
| 2016/0252719 A1* | 9/2016 | Liu | G06T 7/337 348/49 |
| 2017/0205390 A1* | 7/2017 | Shaked | G01N 15/1468 |
| 2017/0262984 A1* | 9/2017 | Barnes | G06T 7/11 |

OTHER PUBLICATIONS

Fienup, "Reconstruction of an object from the modulus of its Fourier transform" *Optics Letters*, vol. 3, No. 1: 27-29 (Jul. 1978).

Gerchberg et al., "A Practical Algorithm for the Determination of Phase from Image and Diffraction Plane Pictures" *Optik*, vol. 35, No. 2: 237-246 (1972).

Goodman, *Introduction to Fourier Optics*, second edition., McGraw-Hill (1968).

Gureyev et al., "Phase retrieval with the transport-of-intensity equation: matrix solution with use of Zernike polynomials" *J. Opt. Soc. Am. A*, vol. 12, No. 9: 1932-1941 (1995).

Teague, "Image formation in terms of the transport equation" *J. Opt. Soc. Am. A*, vol. 2, No. 11: 2019-2026 (1985).

Yang and Gu, "On the amplitude-phase retrieval problem in optical systems" *Acta Physica Sinica*, vol. 30, No. 3 (Mar. 1981), w/ abstract.

International Search Report and Written Opinion of the ISA for PCT/EP2017/064328, dated Jul. 17, 2017, 14 pages.

Pollaro et al., "Digital Staining: Microscopy of Live Cells Without Invasive Chemicals", Microscopy Today, vol. 23, No. 4, Jul. 1, 2015, pp. 12-17.

Pollaro et al., "Stain-free 3D Nanoscopy of Living Cells: A new holographic tomographic microscope for quantitative and non-invasive 3D live cell nanoscopy", Optik & Photonik, vol. 11, No. 1, Feb. 18, 2016, pp. 38-42.

Cotte et al., "Marker-free phase nanoscopy", Nature Photonics, vol. 7, No. 2, Jan. 20, 2013, pp. 113-117.

Plissiti et al., "Combining shape, texture and intensity features for cell nuclei extraction in Pap smear images", Pattern Recognition Letters, vol. 32, No. 6, 2011, pp. 838-853.

Schneider et al., "Cryo X-ray microscope with flat sample geometry for correlative fluorescence and nanoscale tomographic imaging", Journal of Structural Biology Academic Press, vol. 177, No. 2, 2012, pp. 212-223.

\* cited by examiner

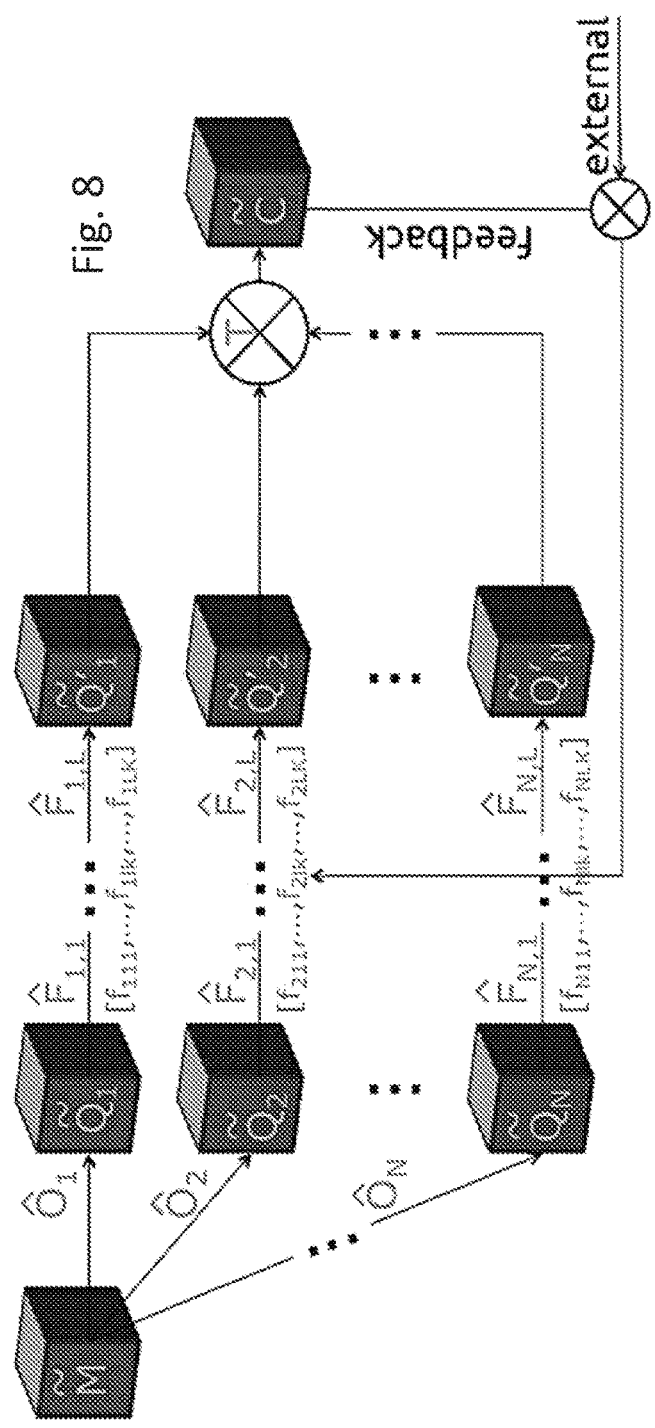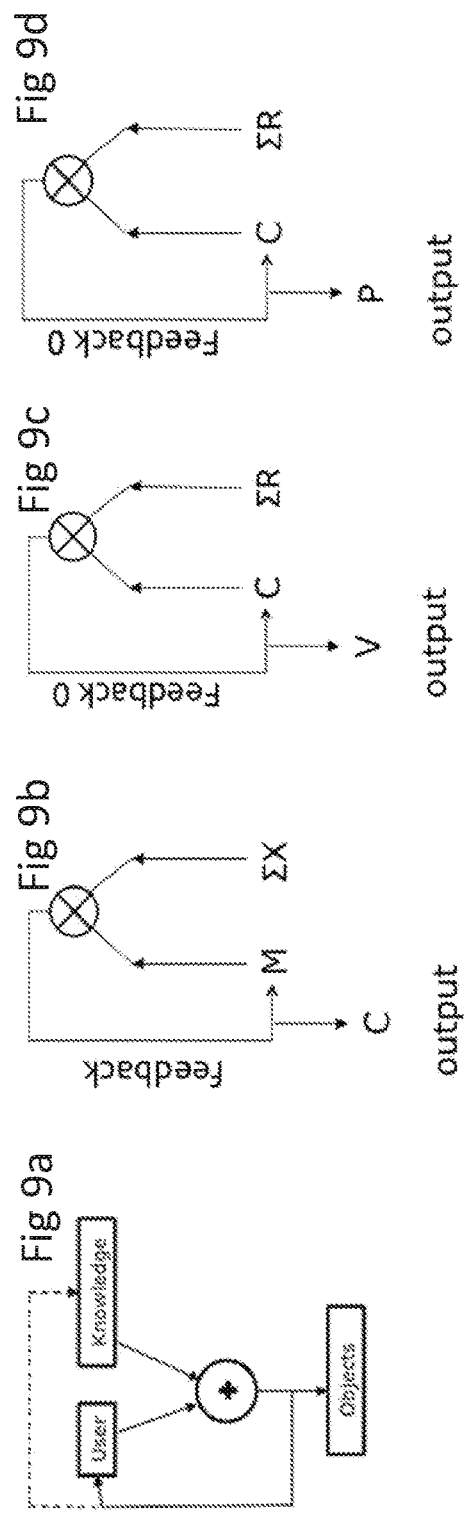

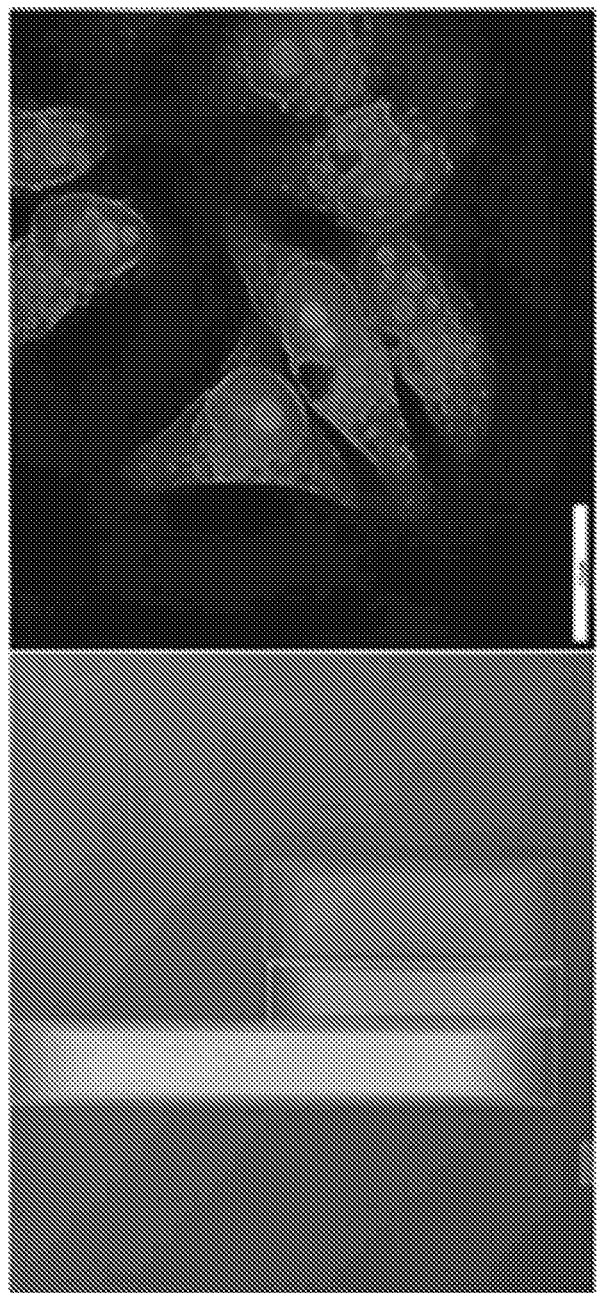
Fig. 19

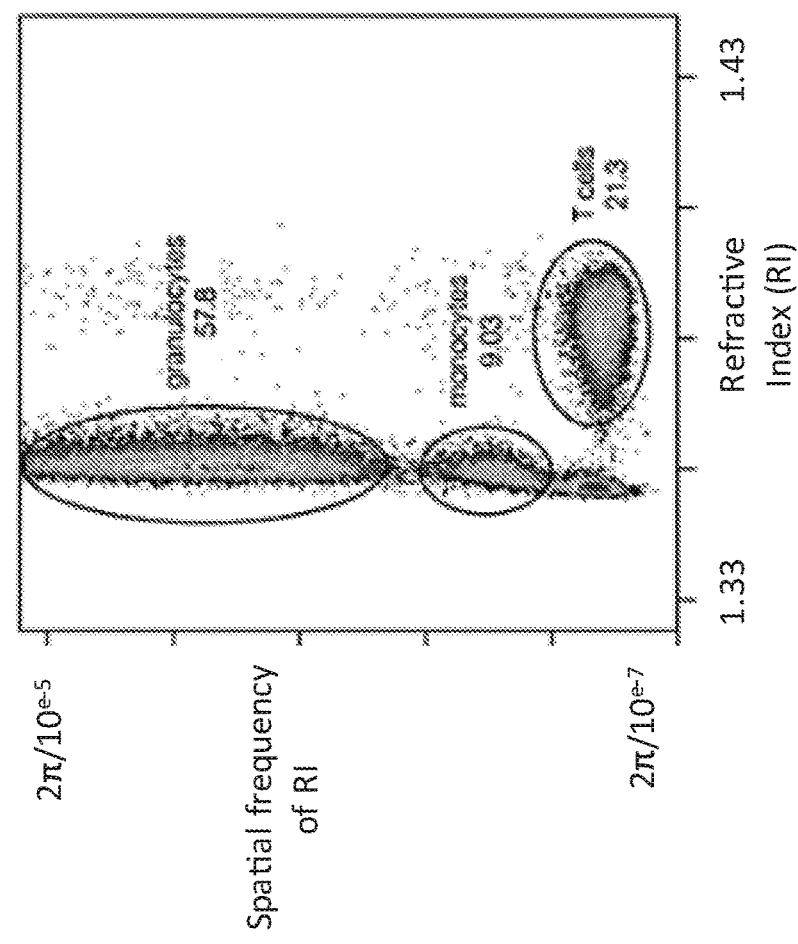
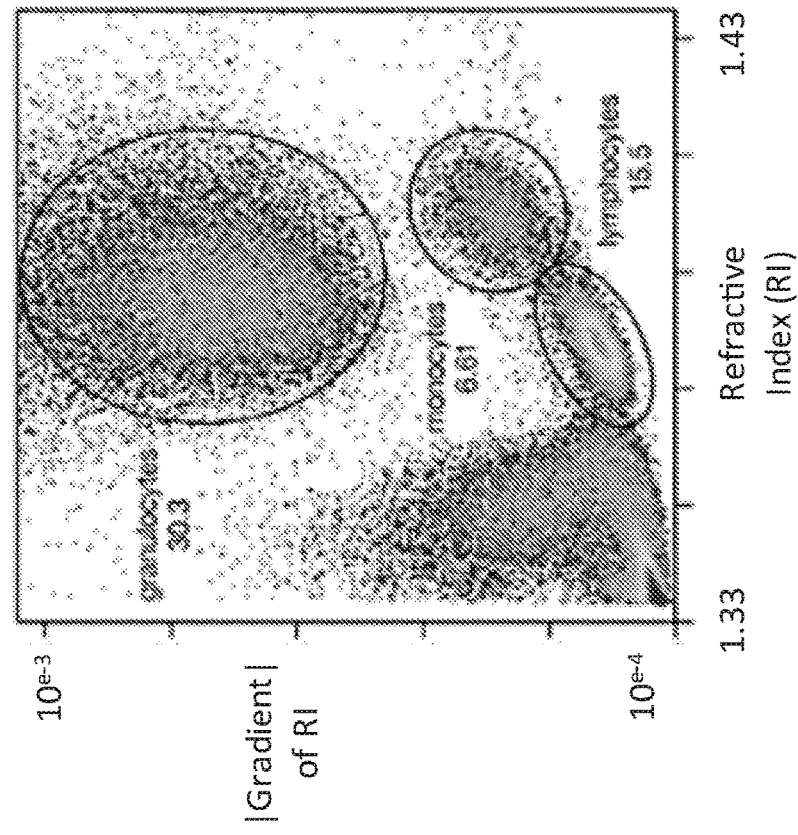
Fig. 35 a.  b.  c.

3D Digital Stain calibrated on Mitochondria from DsRed a.  2D Fluorescence Stain b.  3D Digital Stain calibrated on Plasma Membrane (Fyn-GFP)

Identify out-of-focus signals & recover lost information a.  2D Fluorescence Stain b., c.  3D Digital Stain calibrated on Plasma Membrane (Fyn-GFP)

Fig.48
Plasma membrane
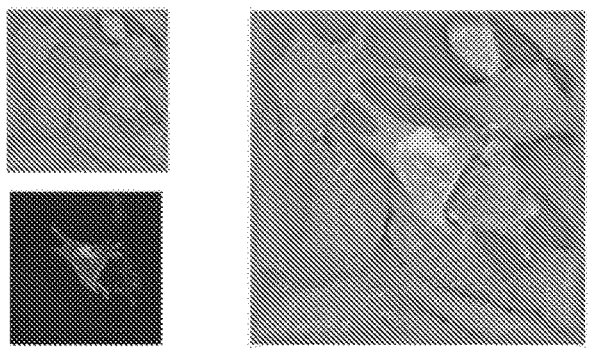
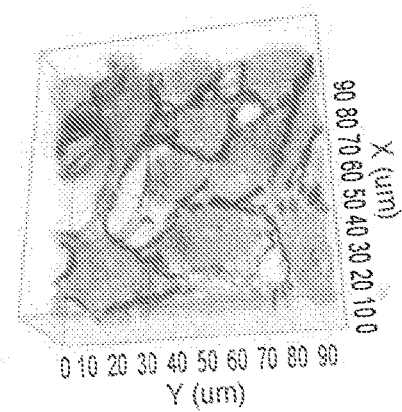
Mitochondria
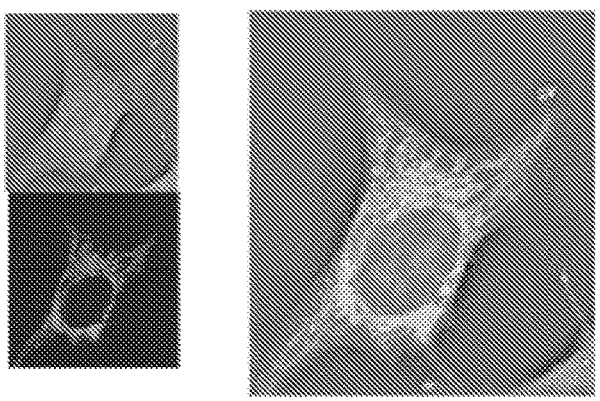
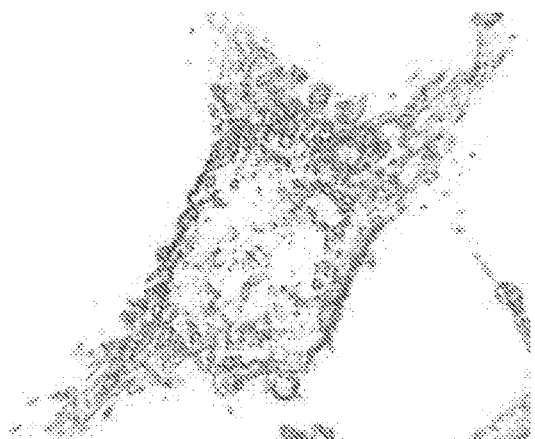
Nucleus
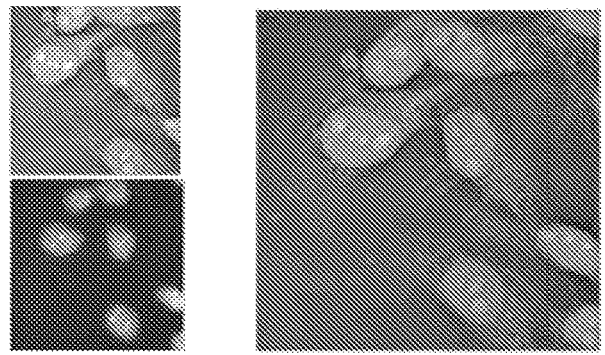
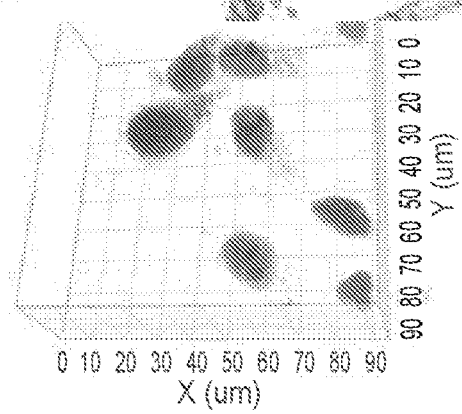
Co-localize fluorescence (3 channels) & Digital Stains
(7 channels at single aquisition)
Define Digital stain libraries calibrated on fluorescence markers Co-localize fluorescence (3 channels) & Digital Stains
(7 channels at single aquisition)
Define Digital stain libraries calibrated on fluorescence markers Fig. 49
a. Mitochondria
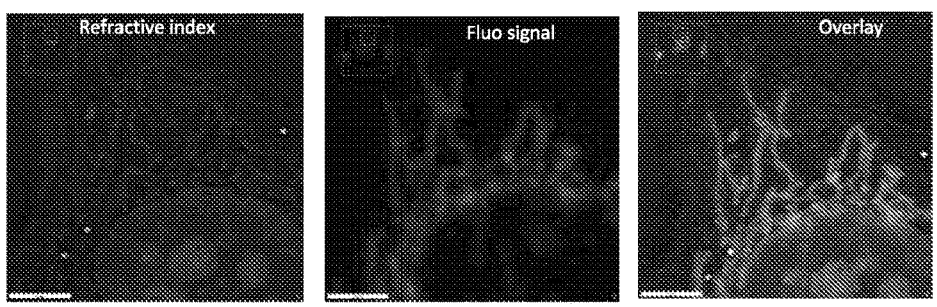
b. Nucleoli Nucleus +
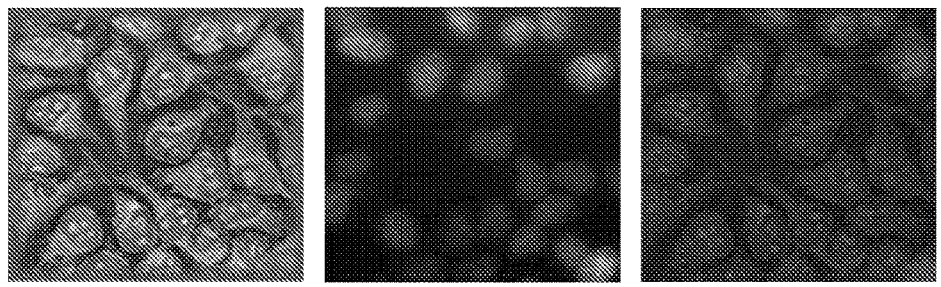
c. Membrane
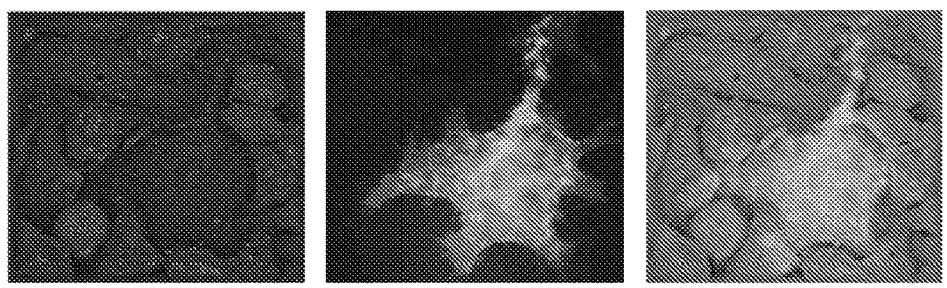
Fig. 49
d. Lipid Droplets
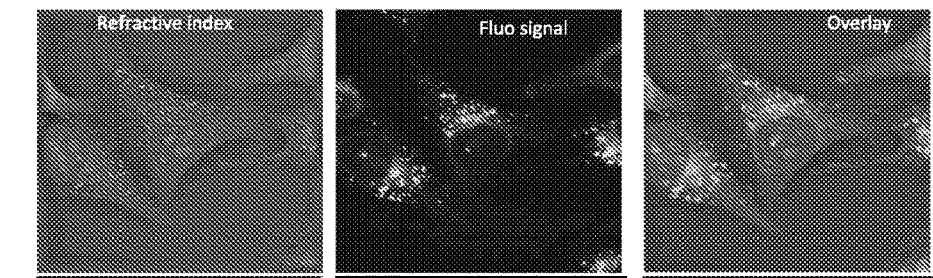
e. Nuclear Membrane
f. Lysosomes

Flow diagram:
Acquisition & calibration single shot

Flow diagram:
Acquisition & calibration time-lapse

METHOD OF CHARACTERIZING AND IMAGING MICROSCOPIC OBJECTS

This application is the U.S. national phase of International Application No. PCT/EP2017/064328 filed 12 Jun. 2017, which designated the U.S. and claims priority to EP Patent Application No. 16174106.1 filed 13 Jun. 2016, the entire contents of each of which are hereby incorporated by reference.

FIELD OF THE INVENTION

The invention relates to a method and system for characterizing and imaging microscopic objects, in particular biological specimens. In particular, the invention may be used in the field of cell biology and its quantification based on non-invasive optical imaging technologies.

BACKGROUND

Being capable of directly interacting with biological specimens such as living cell specimens, opens a wealth of new applications in the fields of medicine, pharmaceutics, cosmetics, basic research and education. Since the cell was discovered in 17th century, engineers have been trying increase the optical resolution of imaging systems. However, due to the transparent nature of cells, it has been difficult to image living cells without damaging them.

The limitation to increasing resolution manifests itself through a smallest distance up to which two light scatterers may be recognized as separated. Until recently, efforts to improve resolution have mainly dealt with intensity based image fields gained by incoherently illuminated instruments. Contrary to incoherent techniques, phase and other electromagnetic field properties strongly affect the resolution achievable with coherent light techniques. One such technique, holographic microscopy, suffers from inferior lateral resolution compared to intensity based imaging systems.

Nevertheless, both incoherently illuminated and coherently laminated systems share a number of basic aspects of image formation theory. High resolution imaging of microscopic objects based on light propagating in the far field meets resolution limitations due to their limited spectrum associated with their limited energy. These spectral limitations apply in the time as well as in the spatial domain. The bandwidth limitations introduce naturally a bandstop or band rejection filter in the spatial frequency domain (SFD). The occupation of the spatial frequency domain is therefore limited to a finite area of the optical system's bandwidth [Goodman, 1968]. Further limitations are due to instrumental considerations, in particular the effective spectrum of the wavefield is further constrained by the configuration of the instrument that collects the scattered object wave. Light enters a microscope objective (MO) within a cone that intercepts the microscope objective's pupil. Mathematically, the angular spectrum is limited by the numerical aperture (NA) of the microscope objective. The spectrum appears multiplied by a complex function called the coherent transfer function (CTF), which is the Fourier transform of the complex valued amplitude point-spread function (APSF). The square of the APSF is the intensity point spread function (IPSF) or more commonly the point spread function (PSF). The PSF is usually considered to qualify the intensity images. The autocorrelation of the coherent transfer function is the Fourier transform of the point spread function and is commonly denominated optical transfer function (OTF). It is usually considered as a descriptor of the bandwidth of the optical instrument, thus resolution.

The understanding of imaging in terms of transfer of information through the spatial bandwidth indicates ways of overcoming its limitations, notably by deconvolution. Deconvolution methods may improve general image quality by deblurring, enhancing optical sectioning capability, or improving resolution. Such benefits have made deconvolution a common post-processing method for biological applications such as deconvolution of fluorescence microscopy images. Many standard deconvolution techniques have been developed for incoherent imaging.

Based on holographic tomography [Cotte et al., Nature Photonics 7 (2013) 113-17, U.S. Pat. No. 8,937,722, EP2998776] three-dimensional (3D) refractive index (RI) distributions of biological samples can be achieved without markers and without damaging the specimen. By a combination of holography and rotational scanning the system detects changes to light as it propagates through the cell. This optical path forms one arm of a Mach-Zehnder interferometer set-up, with the other being the reference path. The sample beam may illuminate the sample through the rotational illumination arm at a very steep angle. A hologram is recorded by a digital camera that combines the beam that has passed through the sample with the reference beam.

The sample beam is then rotated by a small angle and the process is repeated, with one hologram recorded for each beam position. Using the aforementioned microscope, the parameter measured by holographic tomography is neither absorption nor fluorescence intensity of an exogenous molecule as with most light optical microscopes. Instead, the physical refractive index of the sample is obtained in a three dimensional (3D) distribution with a resolution better than the diffraction limit given by the microscope objective. The output is the refractive index distribution within the biological specimen, for instance a cell. The result is quantitative cell tomography, in vitro, without any invasive sample preparation such, in particular without using fluorescence markers. Improved image resolution is achieved by employing a synthetic aperture and multiple-viewpoint-holographic methods. After the holograms have been captured, high-resolution images of each plane in the sample may be generated by computer processing.

SUMMARY OF THE INVENTION

The methods and system of the present invention seek to provide improved characterization and/or imaging of microscopic biological specimens using quantitative multi-dimensional data, in particular three-dimensional (3D), four dimensional (4D), or higher dimensional data, acquired for instance using the abovementioned holographic tomography techniques.

Beyond the techniques of holographic tomography, the methods of the present invention may be equally applied to any other data acquired by devices reconstructing the 3D, 4D or higher dimensional refractive index distribution of a microscopic biological specimen. In particular, the refractive index (RI) distribution can also be extracted by non-holographic approaches, for instance by accessing the complex spectrum from the specimen's wavefield intensity in the space domain, for instance based on assumptions of the complex wavefield and adjusting the propagated intensities to the measured intensities. Minimization schemes can serve for this purpose. In particular, Fienup [1978] proposed iterative algorithms for phase retrieval from intensity data. The Gerchberg-Saxton [Gerchberg, 1972] and error reduction algorithms [Fienup, 1978; Yang and Gu, 1981] were used to solve the inverse problem posed by the determination of the complex wavefield. Another approach is based on measuring field intensities at various axial distances [Teague, 1985]. Gureyev et al. [1995] demonstrated that quantitative phase imaging can be derived from the intensity transport equation (TIE) and has been applied successfully to different domains in microscopy [Barone-Nugent et al., 2002].

Objects of the invention have been achieved by providing methods and systems according to the independent claims.

Dependent claims describe various advantageous characteristics of the invention. Further objects and advantageous characteristics of the invention are found in the following description and appended drawings.

In the present invention, technical methods on how to extract meaningful analysis and interpretation of a microscopic object, in particular a biological specimen, are described. Data representing a 3D, 4D or higher dimensional refractive index distribution of a microscopic object, in particular a biological specimen such as a cell, may be processed, visualized and analyzed by using interactive visual representations (digital stains) of the data, and in addition quantitative analysis on the measured refractive index distribution may also be performed. An object characterization program installed in a computer system may be used to process the data and to generate visual representations of the microscopic object for display on a screen, and to present tools for interactive feedback, analysis, re-modeling and visualization of the microscopic object.

The invention allows for quantitative digital staining based on characteristic parameters defined in an N-dimensional space of values based on refractive index, including for instance refractive index values, refractive index gradient, and other mathematical transformations of refractive index values. These mathematical transformations may be performed by applying transfer functions to the data input into the object characterization program.

Defining refractive index based multi-dimensional transfer functions yields many advantages for characterizing and visualizing microscopic objects and in particular biological specimens as described hereinbelow.

According to a first aspect of the invention, a digital stain space and its various transfer functions for characterizing and imaging a microscopic object, in particular a biological specimen, is defined.

According to a second aspect of the invention, digital staining parameters and thresholds for multi-dimensional (in particular 3D or 4D) refractive index values are described for characterization of biologically relevant contents updated through any one or more of:
  a. Interactive Expertise feedback;
  b. Statistical comparison through Database learning;
  c. Reference data from complementary technologies.

Disclosed herein is a method of digital characterization of a microscopic object based on measured refractive index data representing at least a spatial distribution of measured values of refractive index (RI) or values correlated to refractive index of said microscopic object. The method comprises:
  inputting in a computing system said measured refractive index data;
  executing an algorithm applying a plurality of transformations on said refractive index data to generate a distribution of a plurality of parameters;
  associating a label characterizing a feature of the microscopic object to a defined range of values of said plurality of parameters, whereby different features of the microscopic object are characterized by different defined ranges of values of the plurality of parameters and associated to different labels.

The label may represent any one or more attributes of the feature, such as the type of feature, the relationship of the feature to other features or objects, the state or condition of the feature, the geometry or size of the feature, or any other factors that affect the physical attributes of the feature.

In an embodiment, the plurality of transformations on said refractive index data generates a three dimensional spatial distribution of the plurality of parameters.

In an embodiment, said distribution of a plurality of parameters and associated labels define an n dimension stain space, n being greater than 1.

In an embodiment, the method further comprises a segmentation of the n dimension stain space, said segmentation including generating, by a program executable in the computing system, at least one feature dataset comprising ranges of values of said plurality of parameters and said associated label characterizing at least one feature of the microscopic object.

In an embodiment, the method may further comprise associating a stain colour to said at least one feature dataset and generating an image file for display of said at least one feature on a screen for a user to visualize.

In an embodiment, the microscopic object comprises a plurality of different features, a plurality of feature datasets being generated, each feature dataset characterizing a different one of said plurality of different features.

In an embodiment, different stain colors may be associated to different features.

In an embodiment, the method may comprise generating an image file for display of the microscopic object including a plurality of features on a screen for a user to visualize.

In an embodiment, the microscopic object is biological matter, including any of prokaryotes or eukaryotic organisms.

In an embodiment, the biological matter is a eukaryotic cell or a portion of a eukaryotic cell.

In an embodiment, the feature is an organelle of a cell.

In an embodiment, the characterization of the feature may include a measurement of the volume of the feature.

In an embodiment, the characterization of the feature may include recognizing the type of organelle and associating an organelle type to the feature dataset.

In an embodiment, the characterization of the feature may include a state or condition of the feature, for instance a state or condition of health or sickness, normality or abnormality, live or dead, age and other conditions that affect the physical attributes of the feature.

In an embodiment, said measured refractive index data is a complex refractive index distribution, represented by phase and intensity values, of the measured microscopic object.

In an embodiment, the segmentation includes a feedback loop for adjusting values of said feature dataset based on external or user based input.

In an embodiment, said feedback includes user based inputs from said user visualizing said image displayed on a screen.

In an embodiment, said feedback includes external inputs, said external inputs any one or more of previously acquired data characterizing microscopic objects, data on reference objects, data from machine learning programs, data characterizing the microscope by which the microscopic object is measured, shape recognitions programs, or correlation functions of said external data with the microscopic object.

In an embodiment, said feedback includes reference object inputs, for instance geometrical objects (e.g. spheroids, rods, etc), calibrated objects such as previously validated tomograms of organelles (e.g. high resolution SEM/TEM images), physical constrains such as connected membranes or flux continuity of organelles (e.g. an organelle cannot instantly disappear and re-appear), or physical constrains related to the microscope by which the microscopic object is measured. One aspect is to replace the 'pixelated' data, e.g. mitochondria, by a higher resolution one, e.g. vector graphic.

In an embodiment, said plurality of parameters include spatial and temporal parameters in order to characterize or visualize a behavior over time of the microscopic object or a portion thereof.

In an embodiment, said plurality of transformations include transfer functions operated on the input measured refractive index data.

In an embodiment, said transfer functions comprise any one or more in form of integral, cumulative, frequency, derivative and higher momentums, wavelet inc. fractal, texture sensitive transformation, Fourier, Gabor, Laplacian transform, or through Harmonic analysis, and the use of discrete, discrete-time, data-dependent, linear or non-linear, metric functions and/or distribution functions, logical operators (e.g. Min and max, And OR, fuzzy logic, etc), bandpass filters, color functions, hardness, alpha and gamma transfer functions, surface rendering such as diffusion, Hough transforms, and imaging processing transforms such as ridge or edge detection.

Also disclosed herein is a microscopic object characterization system (1), comprising a computer system (2, 2a, 2b) connectable to a microscope (4) with a computing unit (5), and an object characterization program (17) executable in the computer system configured to receive refractive index data representing at least a spatial distribution of measured values of refractive index (RI) or values correlated to refractive index of said microscopic object. The object characterization program is operable to execute an algorithm applying a plurality of transformations on said refractive index data. The transformations generate a distribution of two or more parameters used to characterize features of the microscopic object. The computer system further comprises a feedback interface configured for connection to one or more data servers in a network computing system, via a global communications network such as the internet, and configured to receive feedback data from the data servers for processing by the object characterization program to calibrate, refine or enhance a characterization of said features.

In an embodiment, the computer system may be formed by a plurality of computer systems interconnected to the network computing system.

In an embodiment, the microscopic object characterization system may incorporate one or more microscopes.

In an embodiment, the system may further comprise a database accessible by authorized users of the system, the database populated with datasets describing features of microscopic objects.

In an embodiment, the database may be configured to receive data uploaded by authorized users of the system, in particular datasets describing features of microscopic objects.

In an embodiment, the database may be installed in the data center server.

In an embodiment, the system may further comprise a display module configured to generate a command and object visualization panel (12) for display on a screen (GUI) for the user to see and operate. The command and object visualization panel may include an input panel (13), a digital stain panel (14), and a visualization panel (15). The input panel (13) provides a visual representation of the refractive index input data, and the digital stain panel (14) provides a view of at least two of said parameters used to characterize the microscopic object and configured to allow parameter ranges (18a, 18b, 18c, 18d) to be set interactively by a user. The visualization shows the output of the objet characterization program, namely the features of the microscopic object characterized by the process executed by the program, including any feedback from the user or external sources.

In an embodiment, different colors may be associated to each parameter range such that the depicted shapes representing parameter ranges in the digital stain panel have different colors, these colors being applied at each spatial position of the microscopic object where the parameters fall within the range corresponding to that color for visualization in the visualization panel.

In an embodiment, each different parameter range is associated to a corresponding different feature of the microscopic object.

Also disclosed herein, according to an independent aspect of the invention, is a display module, and a method of configuring and operating a display module, for a microscopic object characterization system (1). The display module is configured to generate a command and object visualization panel (12) for display on a screen (GUI) for a user. The command and object visualization panel includes an input panel (13), a digital stain panel (14), and a visualization panel (15), the input panel (13) configured to provide a visual representation of refractive index input data of a microscopic object, in particular measured refractive index input data of a microscopic object acquired from a microscope, and the digital stain panel (14) is configured to provide a graphical representation of at least two parameters used to characterize the microscopic object and to allow parameter ranges (18a, 18b, 18c, 18d) to be set interactively by a user, for instance by means of a screen cursor operated by the user. The visualization panel is configured to provide a visual representation of the output of an object characterization program applied on the input data, in particular showing features of the microscopic object characterized by execution of an algorithm of the program applying a plurality of transformations on said refractive index data. The object characterization program may carry out any one or more elements of the methods described above.

According to an advantageous aspect of the invention, the input panel (13) may be configured to receive user inputs in the form of a selection of a region of interest, for instance by means of a screen cursor controllable by the user. The region of interest may cover one or more pixels of the visual representation of the microscopic object displayed on the input panel. The object characterization program may advantageously be configured to apply the plurality of transformations on the refractive index data corresponding to the selected region of interest and generate the parameter ranges characterizing the region of interest in the digital stain panel (14). This allows the user to generate the parameter ranges for different features of the microscopic object by clicking with his screen cursor on different portions of the input image where the user recognizes the type of feature. For instance, if a user knows the type of microscopic object under observation, for instance a certain cell type, and can recognize certain features such as a nucleus or other organelles of the cell in the input image formed from measured refractive index data illustrated in the input panel, then the user can input (in the object characterization program, for instance via the command and visualization panel) the information on the type of cell and the types of the features associated with the parameter ranges that are generated and visually represented in the digital stain panel.

Different colors and other visual representation parameters can be selected by the user for the parameter ranges to generate the visual output in the visualization panel (15). The user can thus interact with both the input panel (13) and the digital stain panel (14) to characterize the microscopic object and also to generate a color three dimensional representation of the microscopic object and of its different features in the visualization panel (15).

The present invention also concerns a non-transient computer-readable medium having tangibly stored thereon instructions that, when executed by a processor, perform the method according to any of the aspects and embodiments mentioned above.

The present invention also concerns a computing apparatus comprising a processor and a memory having stored thereon instructions that, when executed by the processor, perform the method according to any of the aspects and embodiments mentioned above.

BRIEF DESCRIPTION OF THE FIGURES

FIG. 8 illustrates schematically a generalized microscopic object characterization process executed by an object characterization program in a computer system according to an embodiment of the invention;

FIG. 9*a* illustrates schematically a generalized feedback diagram of an object characterization process according to an embodiment of the invention;

FIG. 9*b* illustrates schematically a feedback diagram of an object characterization process according to an embodiment of the invention calibrated by external input;

FIG. 9*c* illustrates schematically a feedback diagram of an object characterization process according to an embodiment of the invention calibrated by reference objects;

FIG. 9*d* illustrates schematically a feedback diagram of an object characterization process according to an embodiment of the invention for predicting cell behavior;

FIG. 19 illustrates an effect of color space on digital stains on a biological specimen;

FIG. 35 illustrates an example of cell population distributions;

FIGS. 36 to 41 illustrate a method of calibrating the microscopic object characterization using fluorescence, with:

FIG. 36 illustrating an overview of the steps and the process. It basically consists in acquiring the 2D fluorescent and the 3D holotomographic data (panel a and b respectively) and from the overlay of both types of data (panel c) the user can define a D-stain to obtain the segmented data in 3D (panel d)

FIGS. 37-41 illustrating steps 1-5 respectively of the calibration process;

FIG. 37 slice of a 3D holographic tomogram shown with a digital stain panel

FIG. 38 same slice of a 3D holographic tomogram with a close-up view of the central cell where values of measured RI are reported. The output data is shown on the right after applying the transform of the central digital stain panel.

FIG. 39 a fluorescence image is captured with Fyn-GFP protein, specific to cell membrane, and merged with the RI holographic tomographic slice.

FIG. 40 From the merging between the RI data and the Fluorescence data, the Digital stain is calibrated.

FIG. 41 After the calibration process, the Digital Stain is specific to the same organelle as the Chemical stain and can be applied to the whole 3D and 4D dataset.

FIG. 42 illustrates a refractive index measurement of a cell and a collection of digital stains calibrated and specific of various cell features, A multi digital staining channels can thus be obtained (f.)

FIG. 43 illustrates a 2D fluorescence image and a 3D holographic tomography image of a sample. The z-axis ambiguity inherent in 2D fluorescence imaging is removed by the 3D holographic tomography. A calibrated Digital Stain from a 2D fluorescence image can be applied to a 3D dataset to yield a three-dimensional stained image.

FIG. 44 illustrates images of a 3D RI volume together with the 3D digital stain specific to mitochondria, previously calibrated from 2D fluorescence image with DsRed marker, FIG. 45 illustrates a 2D fluorescence image obtained with Fyn-GFP marker specific to the plasma membrane exhibiting typical artifacts of under and over expression of proteins. The corresponding 3D digital stain calibrated on the plasma membrane using an object characterization process according to an embodiment of the invention is proved to get rid of those artifacts and deliver a homogeneously stained image, FIG. 46 illustrates a 2D fluorescence stain of a plasma membrane with out of focus signal due to out of focus stained objects and a 3D digital stain calibrated on the plasma membrane implementing an object characterization process according to an embodiment of the invention, It is shown that the calibrated digital stain can be applied to the whole dataset, including cells which have not been transfected and featuring thus no fluorescent signal. A 3D view of 2 Digital stains calibrated, specific to plasma membrane and lipid droplets, and applied to the 3D dataset is shown in the right panel.

FIG. 47 graphically illustrates comparative examples of the invasiveness of traditional fluorescence imaging and digital stain calibration according to embodiments of the present invention, whereby the digital stain calibration is made on a single fluorescence image reducing thus phototoxicity and photobleaching of the sample allowing the cells to live a long time while performing 3D refractive index measurements thus enabling a time lapse of 3D digitally stained data to be generated, the example showing a calibration on lipid droplets;

FIGS. 48 to 50 illustrate various images of examples of cell features digitally stained using an object characterization process according to the embodiment of the invention calibrated with fluorescence imaging, with FIG. 48 showing an example of establishing a library of Digital Stains calibrated on fluorescence markers for a specific cell type: plasma membrane, mitochondria, nucleus, lipid droplets, reticulon, and nuclear envelope, FIG. 49 illustrating examples of the first steps of colocalization process on organelles with a clear refractive index signature between the RI map and the, corresponding fluorescence signal: the RI holographic tomographic and the fluorescence data are captured on a same sample and overlayed for subsequent digital stain calibration. Examples are given here for mitochondria, nucleus and nucleoli, membrane, lipid droplets, nuclear membrane and lysosomes, FIG. 50 illustrates a screen shot of a graphical user interface according to an embodiment of the invention illustrating how to use a reference data from epifluorescence microscopy to calibrate digital stains according to an embodiment of the invention;

DETAILED DESCRIPTION OF EMBODIMENTS OF THE INVENTION

Figure 2:
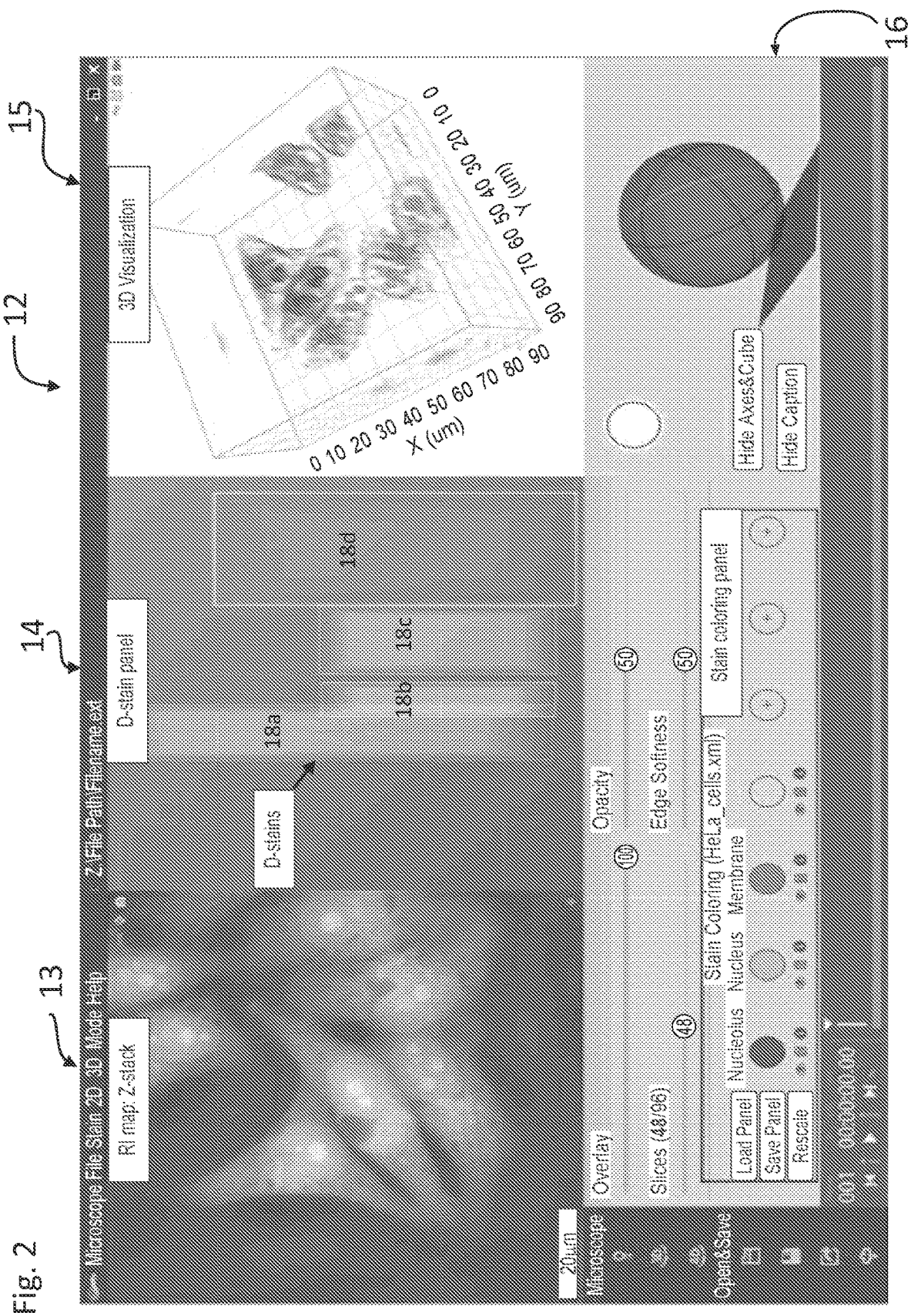
FIG. 2 illustrates an example of a graphical user interface (GUI) implementing an object characterization program according to an embodiment of the invention, whereby a top left panel illustrates input data (in this example a spatial (3D) distribution of RI values of a microscopic object), a centre top panel illustrates a digital stain panel defining ranges of parameters of transfer functions to be applied to the input data, and colors attributed to those ranges, a top right panel illustrates a visualization (in 3 dimensions in this example) of output data, and a bottom panel illustrates a command panel for user input and control of the characterization and visualization of the microscopic object.
Figure 6:
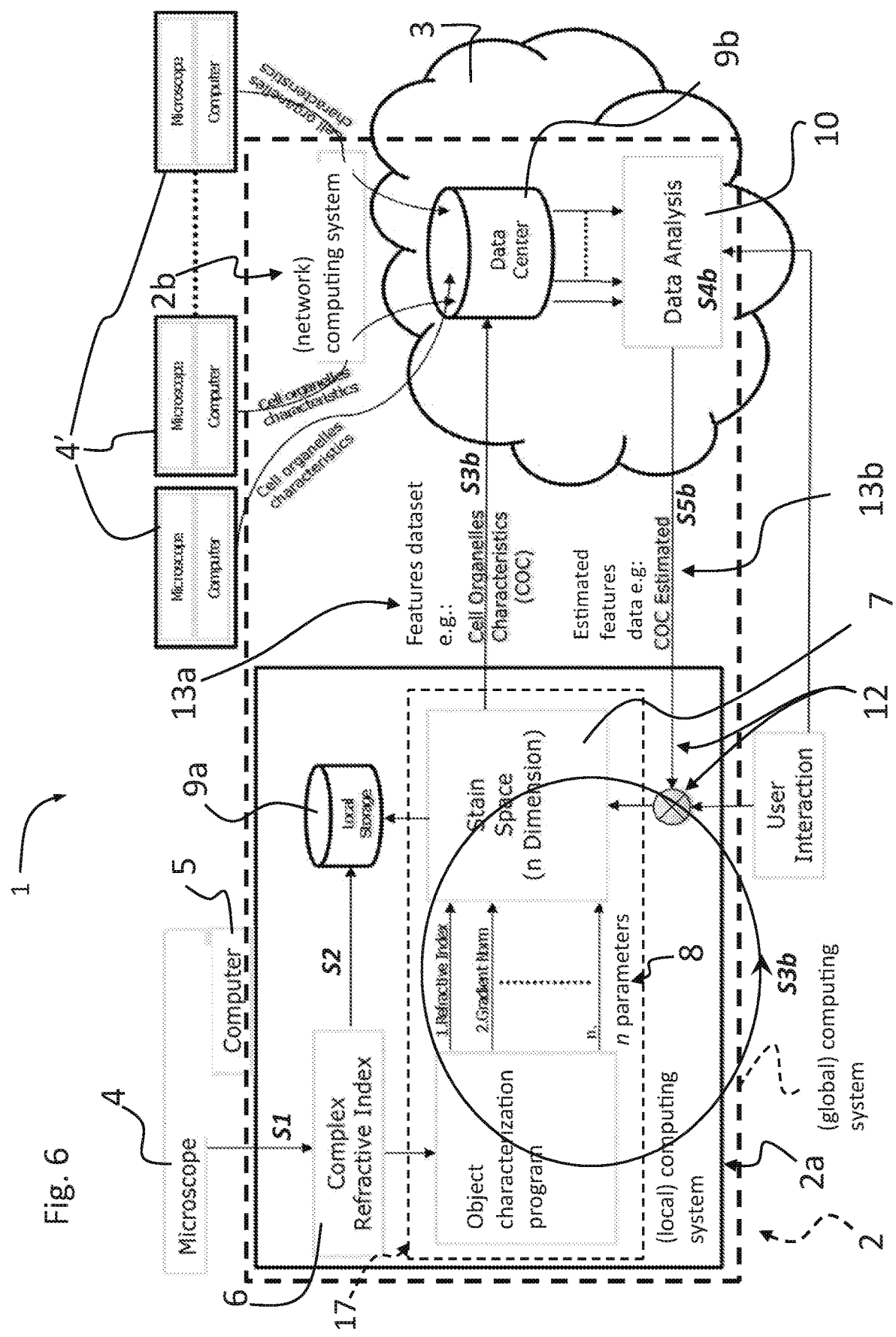
FIG. 6 illustrates schematically a computer system implementing an object characterization process according to an embodiment of the invention.
Figure 7:
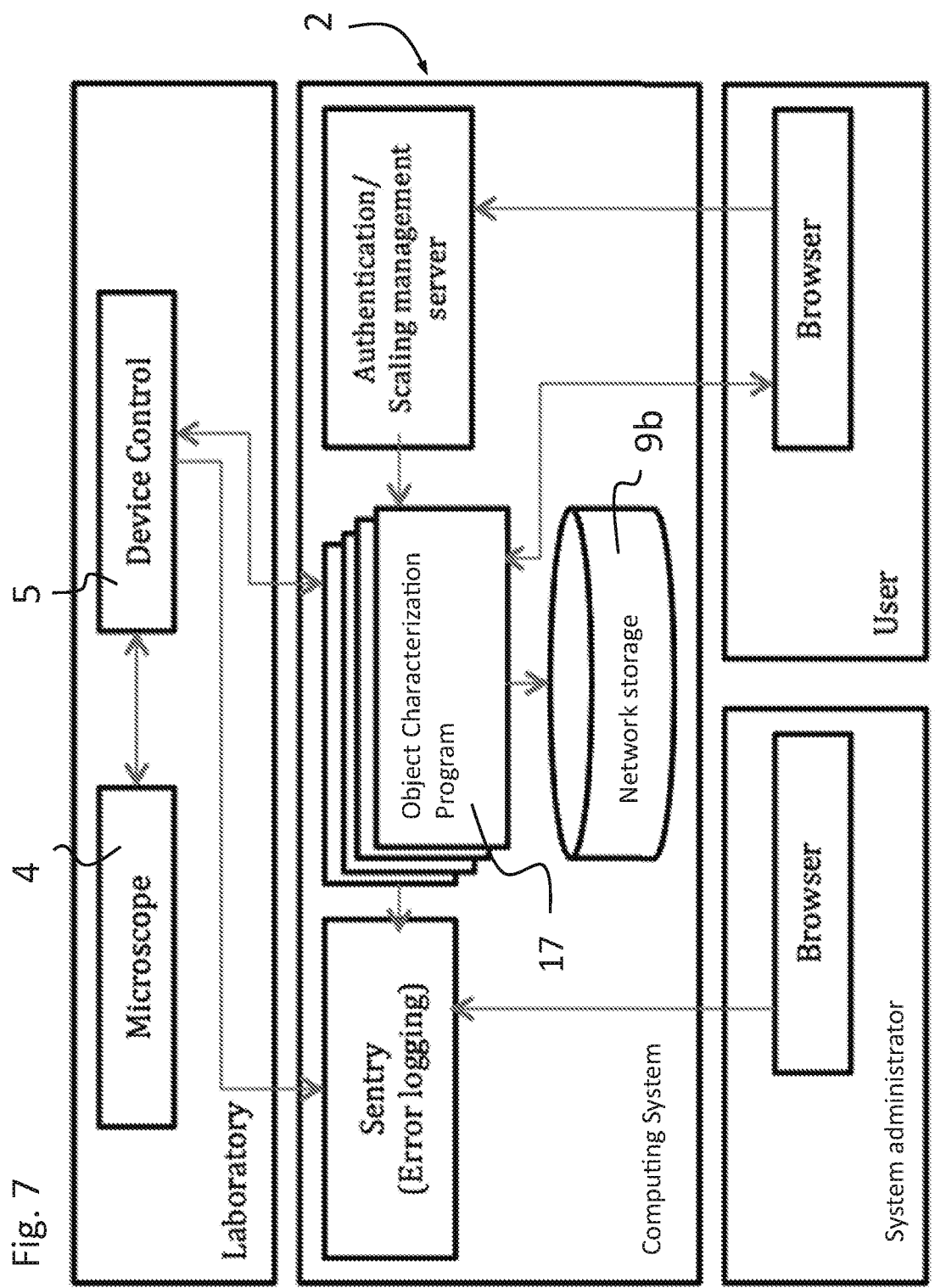
FIG. 7 illustrates schematically a computer system architecture information flow diagram according to an embodiment of the invention.

Referring in particular to FIGS. 2, 6 and 7, a microscopic object characterization system 1 comprises a computer system 2, 2a, 2b and a microscope 4 with a computing unit 5 connected to the computer system, whereby the microscopic object characterization system 1 may comprise a plurality of computer systems and a plurality of microscopes connected via a global communications network, including for instance the internet, to one or more data centers for the storage and analysis of microscope object characterization data.

A computer system 2a, which may form part of a global network based computing system 2 comprising one or more remote server systems 2b communicating through a global communications network such as the internet 3, is configured to receive data from one or more microscopes 4, 4' comprising a computing unit 5 that may be connected directly to the computer system 2, or connected to the computer system 2 via the global communications network 3. The data 6 from a microscope 4 may also be transferred and stored on portable storage media (such as a compact disc, USB key, portable hard disk, and other portable memory devices) and then transferred to the computer system 2a from the storage media. The data 6 from the microscope input into the computer system 2a comprises a spatial distribution of refractive index values measured from the microscopic object under observation in the microscope, or measurement values allowing to a construct a spatial distribution of refractive index values representative of the microscopic object under observation in the microscope.

In a preferred embodiment, the microscope is a holographic microscope or other type of microscope capable of measuring the complex refractive index values (phase and intensity) of light scattered by a microscopic object under observation in the microscope. Preferably, a microscope as described in EP2998776 (incorporated herein by reference), that allows non-invasive, marker free observation of a biological specimen, including prokaryotes or eukaryotic organisms, may be advantageously connected the computer system 2a according to an embodiment of the invention.

The computing system 2a according to the invention comprises software installed in the system, said software including an object characterization program 17 configured to receive refractive index data 6 from the microscope, or from other sources, and to process said input data to generate data characterizing one or more features of the microscopic object. In a situation where the microscopic object is a biological specimen, for instance a cell, features may include organelles of the cell such as the cell membrane, nucleus, nuclear membrane, cytoplasm, mitochondrion, lysosome, ribosome and other organelles. A feature may also consist in the biological specimen as a whole, especially for very small organisms, for instance prokaryotes such as bacteria. Different features (e.g. different organelles) of a microscopic object (e.g. a eukaryotic cell) may be characterized individually, or the object as a whole, or sections thereof may be characterized by a combination of features.

The object characterization program 17 comprises algorithms carrying out transfer functions to apply a plurality of transformations on said refractive index data. The transformations generate spatial distribution of two or more parameters 8, for instance a spatial distribution of refractive index (first parameter) and gradient of refractive index (second parameter). The spatial distribution of the two or more parameters defines an n dimension stain space 7 which may be used to characterize features of the microscopic object. The object characterization program is further configured to operate a segmentation of the n dimension stain space, said segmentation including generating at least one feature dataset comprising ranges of values of said plurality of parameters characterizing at least one feature of the microscopic object.

The dataset describing a feature of the microscopic object may be stored locally in memory 9a of the computing system 2a and/or transferred to one or more data centers 9b in one or more computer systems 2b in the network (network computing system). Other microscopes 4' and computing devices 5 may also transfer data characterizing microscopic objects and features thereof to the data center 9b. The features datasets 13a may be sent via the network to populate a database of the network computing system, accessible by users in order to perform various operations with the feature data such as visualize features, update the characterization of a feature, compare data of a feature with other data of a same or similar feature, constitute a reference dataset for a given feature and any other operation regarding the use or interactive modification of a dataset describing a feature of a microscopic object.

The network computing system may further comprise data analysis software 10 for analysis of the data describing features of microscopic objects and for receiving user inputs and applying learning techniques to improve the characterization of the features of microscopic objects. The network computing system may further comprise data mining software to obtain and analyze data available in the network relevant to the characterization of features, such as organelles of a cell. The data analysis software 10 may advantageously be configured to generate estimated data describing a feature or elements of a feature to the computer system 2a via the network 3, in order to provide an estimation of a feature dataset 13b, in particular in order to provide the user an estimation upon which the user can further interact.

The features datasets contain information that enable generation of an image file representing the features, such that an image (which may be two dimensional but preferably three dimensional) of the microscopic object and features thereof, may be generated by imaging software installed in the computer system 2a and displayed on a screen for visualization by a user. The user may interactively change the parameters or the values of parameters defining the stain space 7 for one or more features in order to modify the characterization of the one or more features displayed.

Figure 11:
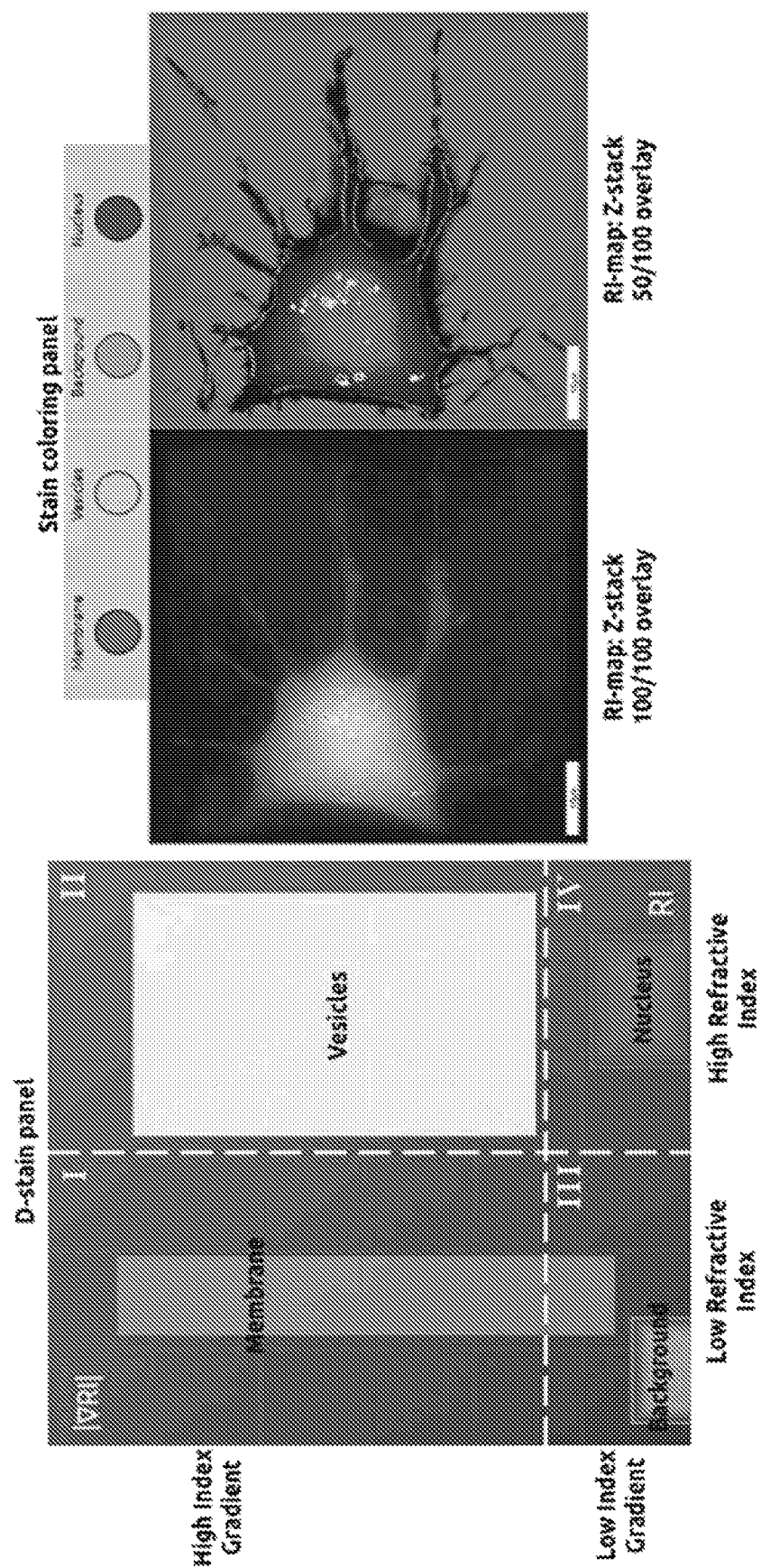
FIG. 11 illustrates a digital stain panel and a biological specimen visualization of a graphical user interface of an object characterization program according to an embodiment of the invention.
Figure 20:
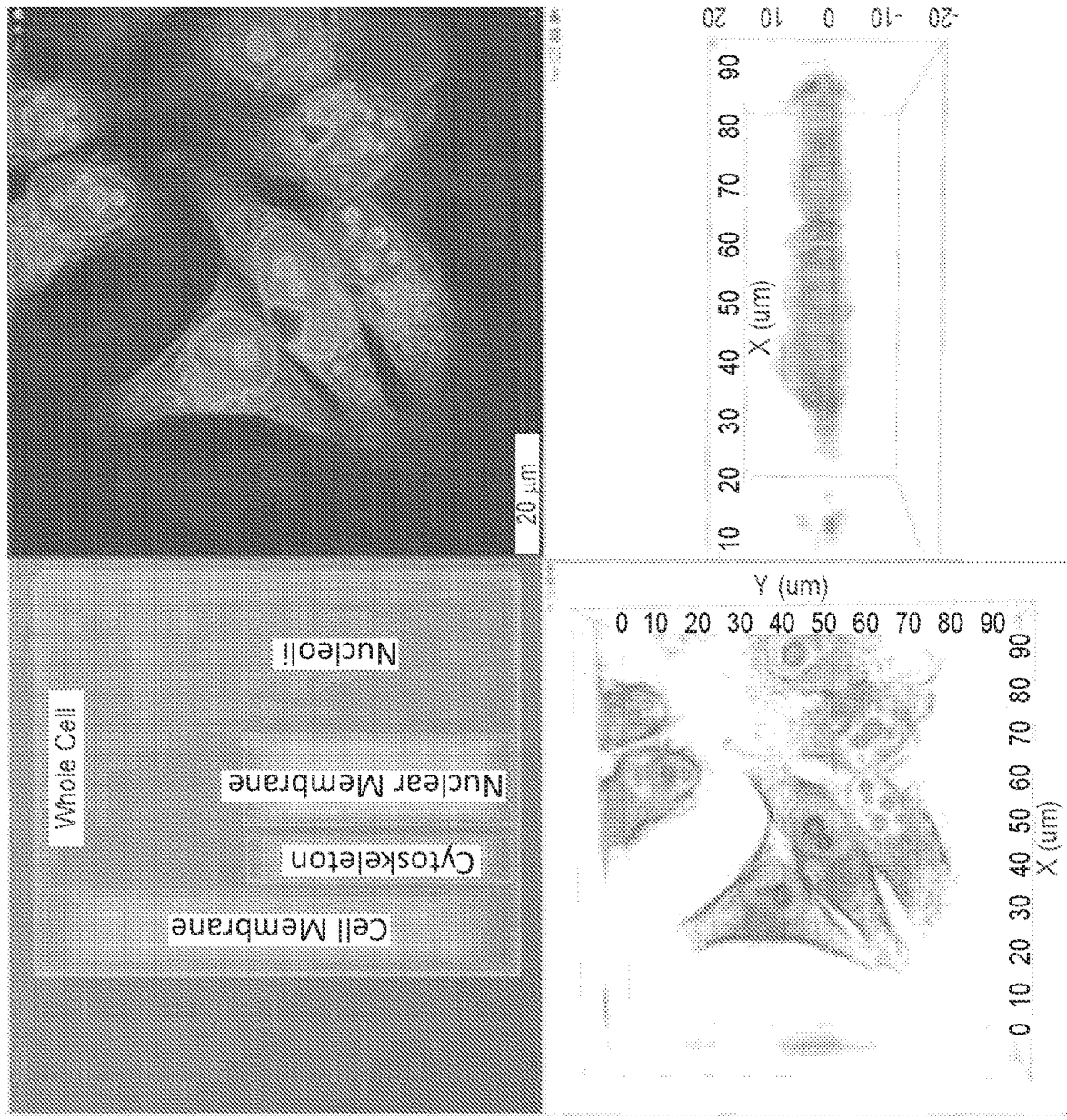
FIG. 20 illustrates an effect of intersection-free object characterization parameters, represented in the digital stain panel, on a biological specimen.
Figure 21:
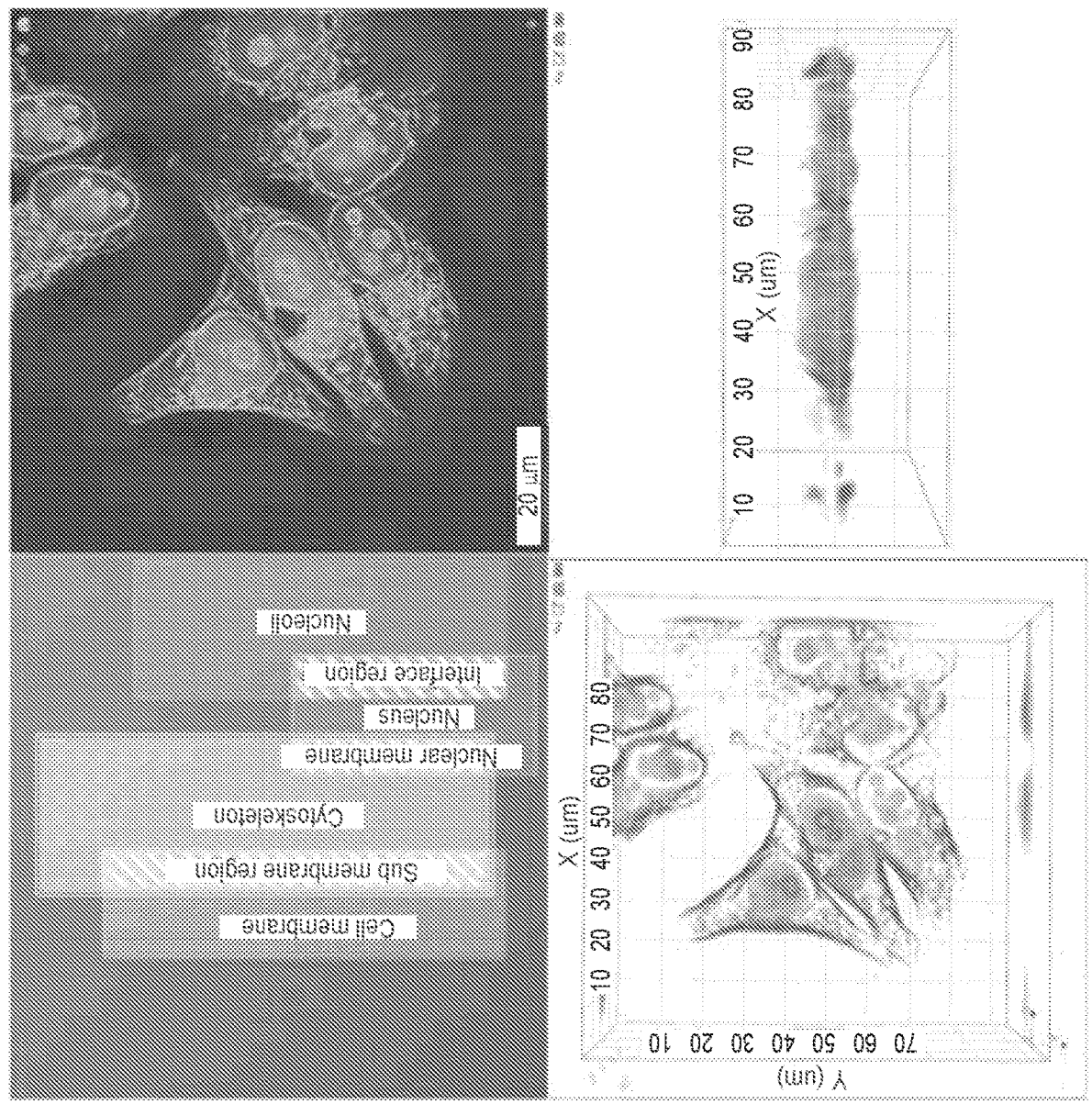
FIG. 21 illustrates an effect of intersection of object characterization parameters, represented in the digital stain panel, on a biological specimen.

Referring in particular to FIG. 2, the object characterization program comprises a display module configured to generate a command and object visualization panel 12 for display on a screen (graphical user interface GUI) for the user to see and operate. The command and object visualization panel 12 in an embodiment comprises an input panel 13, a digital stain panel 14, a visualization panel 15, and a command panel 16. The input panel 13 provides a visual representation of the refractive index input data, for instance a Z-Stack black and white image representing the refractive index distribution of a microscopic object measured by the microscope 4. The digital stain panel 14 provides a view of at least two of the parameters used to define the n dimension stain space, for instance in the illustrated example refractive index on the horizontal axis (x-axis) and refractive index gradient (normalized) on the vertical axis (y-axis). Parameter ranges 18a, 18b, 18c, 18d may be set and viewed in the digital stain panel 14, the parameter ranges defining the range of values of the parameters of the digital stain panel. For instance, the rectangular shape of a range indicates that both parameters of the horizontal and vertical axes have maximum and minimum values. More complex (i.e. non rectangular shapes) may however define the parameter ranges. Different colors may be associated to each parameter range such that the depicted rectangles (or other shapes as the case may be) have different colors. These colors may then be applied at each spatial position of the microscopic object where the parameters fall within the range corresponding to that color. Each parameter range corresponds to a feature of the microscopic object and thus the corresponding color enables easy visualization of the feature. For instance, as illustrated in FIGS. 11, 20 and 21, each parameter range may describe the properties of a different organelle of a cell and be provided with distinct colors to better visualize the corresponding features in the biological specimen seen in the visualization panel 15. In the illustrated embodiment, the user can select colors from the stain coloring panel 17 of the command panel 16 and other variables such as opacity and edge softness for the displayed parameter ranges 18a-18d.

The datasets describing features may thus comprise, in an embodiment, the ranges of the two or more parameters, and further a spatial distribution of the parameters in order to characterize and visualize the feature in three dimensions. A feature dataset may however also be provided without spatial distribution, for instance to characterize a feature only by the range of values of the selected parameters describing the feature. Other properties such as relative positions of features and context based criteria may also be included in the feature dataset to characterize features of a microscopic object. For instance, a nuclear membrane is expected around a nucleus, therefore if the properties of a nucleus are easy to identify within certain parameter ranges, the presence of a nuclear membrane can be better identified and defined by its relative position with the nucleus.

In the illustrated embodiment, the user can interactively modify the parameter ranges of a feature using the digital stain panel, by changing the size and/or position of a rectangle (or other shape defining the parameter range of a feature), for instance with a screen cursor. The effects of the changes may be seen in the visualization panel 15. Within the scope of the invention, other input methods for changing the parameter ranges may however be utilized.

According to a particularly advantageous aspect of the invention, the object characterization program is configured to receive feedback data through a feedback loop 12. The feedback data may be input by a user, for instance logged into the computer system 2a, or input from data stored in the computing system 2a or downloaded from a data centre server on the network computing system 2b, or obtained from a measurement of a reference object performed by the microscope 4. The feedback data stored or downloaded from a computer system may comprise reference data that describe features, or data describing a feature previously measured and improved iteratively using machine learning processes or user experience and knowledge.

To further increase the accuracy of associating a label characterizing a feature of the microscopic object to a defined range of values of said plurality of parameters, one may also correlate the said label characterizing a feature using known methods and systems of visualizing and analysing a microscopic object, such as:

Electron Microscopy using a microscope that uses a beam of accelerated electrons as a source of illumination. Because the wavelength of an electron can be up to 100,000 times shorter than that of visible light photons, the electron microscope has a higher resolving power than a light microscope and can reveal the structure of smaller objects. A transmission electron microscope can achieve better than 50 pm resolution and magnifications of up to about 10,000,000× whereas most light microscopes are limited by diffraction to about 200 nm resolution and useful magnifications below 2000×;

Chemical Stains: Stains and dyes are frequently used in biology and medicine to highlight structures in biological tissues for viewing, often with the aid of different microscopes. Stains may be used to define and examine bulk tissues (highlighting, for example, muscle fibers or connective tissue), cell populations (classifying different blood cells, for instance), or organelles within individual cells;

Or any other similar state-of-the-art imaging and/or spectroscopy technology

The external feedback data can be considered as reference data (sometimes also called ground truth), which serves to define a correlation between the measured data and the reference data.

The accuracy of characterization of a feature can then be improved by adjusting the ranges of the values of the parameters obtained from the transformation of measured data, in order to maximize the correlation.

Such a feedback loop improves the accuracy of identifying and characterizing features (for instance organelles) of a microscopic object (for instance a eukaryotic cell).

EXAMPLES

Figure 10:
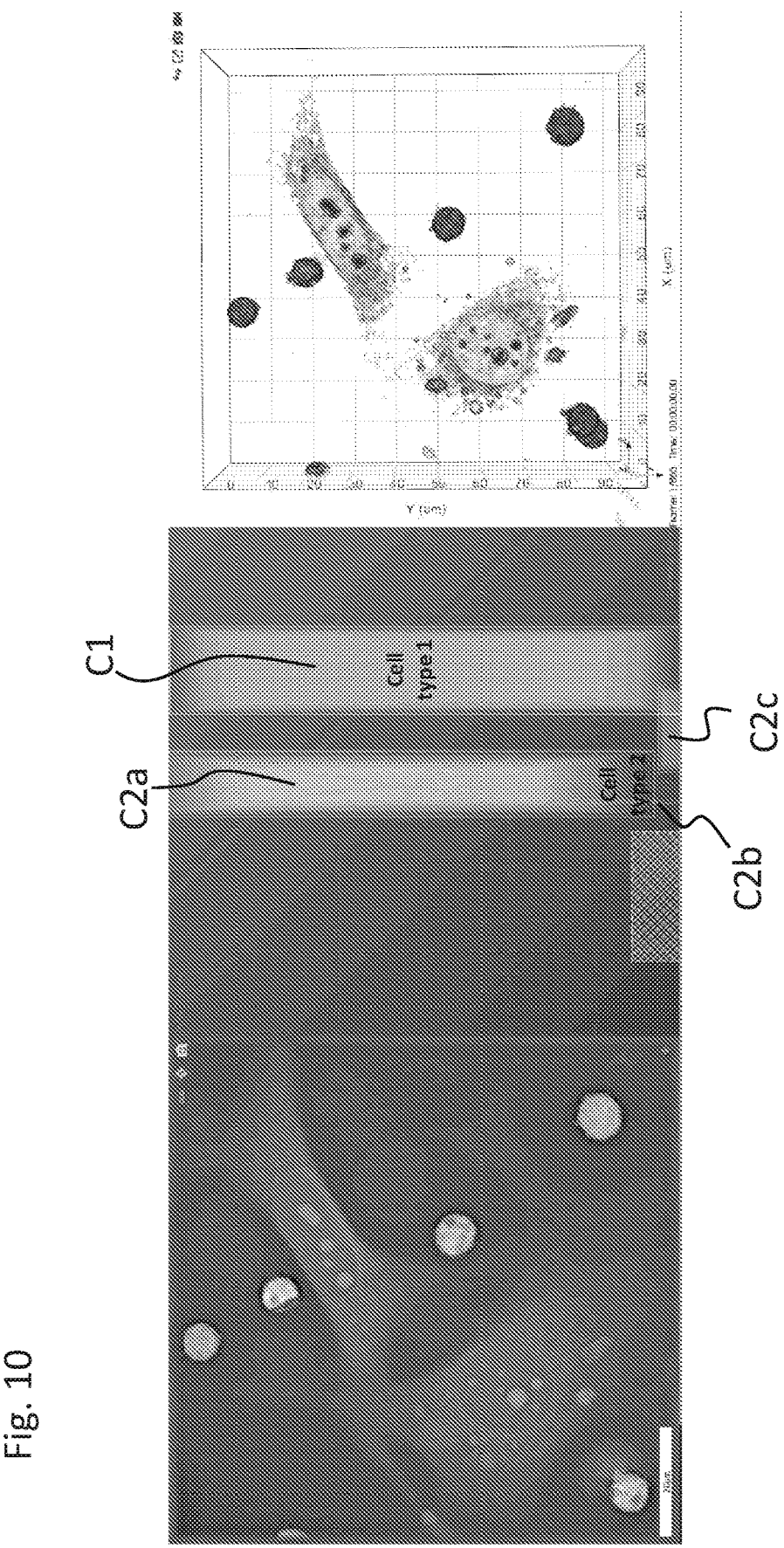
FIG. 10 illustrates an example of input and output data represented visually by a graphical user interface of an object characterization program according to an embodiment of the invention, whereby the left panel (input panel) shows a visual representation of measured RI data of a biological specimen comprising two different cell types, the centre panel (digital stain panel) shows the ranges of parameters for the two different cell types, and the right panel (visualization panel) shows visual representation of the two cell types.

In FIG. 10 is illustrated an ensemble of microscopic objects of cell type 1 and cell type 2. Let's assume:
the cell types are unknown
based on the user's experience or a correlative data-set, one defines initial characteristic ranges for the parameters (e.g. maximum and minimum values of RI and gradient of RI) for the cells' nucleoli and for the cells' plasma.

In FIG. 10 the characteristic ranges of parameters $C2a$, $C2b$, $C2c$ for features of cell type 2 correspond to nucleoli $C2c$ (depicted in red), plasma $C2b$ (depicted in violet) and cell membrane $C2a$ (depicted in blue) whilst cell type 1 as a whole, encompassing both nucleoli & plasma corresponding to parameter range C1 (depicted in green) is represented as a single feature.

A comparison comprising a look-up table (or machine learning outline) of characteristic ranges of the feature of microscopic object allows consequently to identify cell type 1, in this example as an Amoeba, and cell type 2, in this example as a pancreatic cancerous cell, and to add this information to the labels associated to the ranges of parameters $C2a$, $C2b$, $C2c$ respectively C1 characterizing the cell type 2 respectively cell type 1.

On the other hand, if
The cell types are known
And the association of the characteristic ranges of parameters for a specific feature of microscopic object is unknown, then the cell type can be used to obtain from a look-up table or from a machine learning outline the corresponding characteristic ranges of parameters for the features of the cell type and then to feed these back into the computer system for characterization and visualization of the microscopic object. The feedback of providing 'Cell type 2=pancreatic cancerous cells' may thus be in the form of an automated association with corresponding range of parameters $C2a$, $C2b$, $C2c$ for the microscopic features nucleoli (red), plasma (violet), and membrane (blue) respectively.

Architecture of the Object Characterization Program

Definitions

The refractive index (RI) of a medium is defined as the ratio of speed of light in vacuum to the speed of light in that medium.

The formula is:

$$RI = c/v \qquad \text{Equation 1:}$$

where the speed of light c=300,000 km/s and v is the speed of light in the desired medium.

The refraction index for water is therefore:

$$RI_{H20} = \frac{C_0}{C_{H20}} = \frac{300'000 \text{ km/s}}{225.000 \text{ km/s}} = 1.3\overline{3} \qquad \text{Equation 2}$$

Some typical RI values evaluated using green light are reported below.

| Medium | RI |
| --- | --- |
| Water | 1,333 |
| PBS | 1,334 |
| DMEM + 10% FBS | 1,337 |
| Ethanol | 1,364 |
| Urea | 1,495 |
| Fluorodish glass | 1,525 |

More generally, we consider a complex refractive index $\underline{n}=n+i\kappa$. from the microscope output (e.g. holograms) where n is the refractive index and k the absorption.

In a first embodiment and as suggested in FIG. 2, the object characterization parameters can be defined in 2 dimensional space such as Refractive index (horizontal-axis) and the index gradient (vertical-axis). Refractive Index Gradient ($|\nabla RI|$ or RIgradient) describes how the refractive index varies in the proximity of a pixel.

Figure 3:
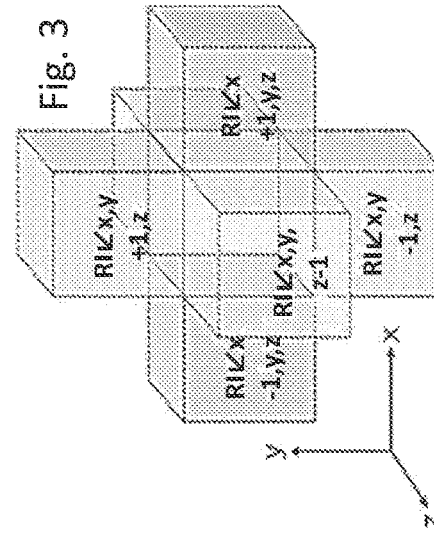
FIG. 3 illustrates schematically neighboring voxels defining a spatial distribution of refractive index (RI).

The formula is:

$$|\nabla RI| = \sqrt{\left(\frac{RI_{x+1,y,z} - RI_{x-1,y,z}}{2n_x}\right)^2 + \left(\frac{RI_{x,y+1,z} - RI_{x,y-1,z}}{2n_y}\right)^2 + \left(\frac{RI_{x,y,z+1} - RI_{x,y,z-1}}{2n_z}\right)^2} \qquad \text{Equation 3}$$

where $n_{x,y,z}$ is the resolution, and $RI_{x\pm1,y\pm1,z\pm1}$ is the RI value of the neighborhood pixels (cf. FIG. 3).

Mathematical Basis:

Let $\tilde{M}$ be the RI distribution, a Tensor (3d or 4d matrix) which contains low-pass filtered refractive index (RI) measurement. In a more general embodiment, M can be defined as complex RI derived, and therefore containing alternative physical quantity distributions such k: optical absorption p: polarization depending RI called birefringence.

By a transform $\hat{O}_n$, $\tilde{M}$ can be redundantly represented such as $$\tilde{Q}_n = \hat{O}_n \tilde{M} \qquad \text{Equation 4:}$$

In this manner, $\hat{O}_n$ represents a set of N transforms resulting in a set of N equivalent representations $\tilde{Q}_n$ where $n \in [1 \ldots N]$.

In general, any non-singular transform, $\hat{O}\hat{O}^{-1}=\hat{O}^{-1}\hat{O}=\hat{I}$, which allows for an equivalent transform such as in form of integral, wavelet, Fourier, Laplacian transform, or through Harmonic analysis, and the use of discrete, discrete-time, data-dependent, linear or non-linear, metric functions and/or distribution functions.

We give below some examples of a one-dimensional function for the sake of simplicity:

Cumulative function $$F_X(x) = \int_{-\infty}^{x} f_X(t) dt$$

Any m-th order derivate of $$\frac{\partial_y^m}{\partial_x^m}, f^{(m)}(x)$$

such as for m=1 called Gradient $\nabla$ $$\nabla f = \frac{\partial f}{\partial x_1} e_1 + \ldots + \frac{\partial f}{\partial x_n} e_n$$

with $$f_{x_n} = \frac{\partial f}{\partial x_n}.$$

such as for m=2 called curvature or Laplacian $\Delta$ $$\Delta f = \frac{\partial^2 f}{\partial x_1^2} e_1 + \ldots + \frac{\partial^2 f}{\partial x_n^2} e_n$$

with $$f_{x_n x_n} = \frac{\partial^2 f}{\partial x_n^2}.$$

Absolute value $$|x| = \begin{cases} x, & \text{if } x > 0 \\ -x, & \text{if } x < 0 \end{cases}.$$

Wavelet transform:

$$\mathcal{J}_M(a,b) = \frac{1}{\sqrt{|a|}} \int_{-\infty}^{\infty} m(t) \cdot t\left(\frac{t-b}{a}\right) dt$$

Fourier transform:

$$\mathcal{F}_M(v) = \int_{-\infty}^{\infty} m(t) \cdot \exp(-2i\pi t v) dt$$

Gabor transform:

$$\mathcal{G}_M(\eta, v) = \int_{-\infty}^{\infty} m(t) \cdot \exp(-2i\pi t v) \cdot \exp(-\pi(\eta - t)^2) dt$$

This yields for example:

Cumulative RI

A cumulative histogram is a mapping that counts the cumulative number of $\tilde{M}$ in all of the voxels, i.e. the frequency of RI distribution within the measured microscopic object. That is, the cumulative histogram $\hat{O}_{n,i}$ of a histogram $\tilde{M}_i$ is defined as:

$$\hat{O}_{n,i} = \sum_{i=1}^{k} \tilde{M}_i \qquad \text{Equation 5}$$

RI Gradient

A cumulative histogram is a mapping that counts the cumulative number of $|\nabla\tilde{M}|$ in all of the voxels. That is, the cumulative histogram $\hat{O}_{n,i}$ of a histogram $|\nabla\tilde{M}_i|$ is defined as:

$$\hat{O}_{n,i} = \sum_{i=1}^{k} |\nabla \tilde{M}_i| \qquad \text{Equation 6}$$

On $\hat{Q}_n$ one can apply an initial transfer function $\hat{F}_0$ in the form of $$\tilde{Q}'_n = \hat{F}_n \tilde{Q}_n = \hat{F}_n \hat{O}_n \tilde{M} \qquad \text{Equation 7:}$$

where $\hat{F}_n$ can be as well a combination of L transforms $$\hat{F}_n = \prod_{l=1}^{L} \hat{F}_{n,l} \qquad \text{Equation 8}$$

which are individually determined by $f_{nlk}$ which is a set of k parameters or thresholds, where $k \in [1 \ldots K]$ of L transforms $$\hat{F}_{n,l}(f_{nlk}) \qquad \text{Equation 9:}$$

as summarized below:

$\tilde{M}$: Tensor (3d or 4d matrix)
    Containing low-pass filtered
    Refractive index (RI) measurement $\tilde{Q}_n$: N Tensors (of dim M), such as
    $\tilde{Q}_n = \hat{O}_n \tilde{M}$
    e.g.
    $\tilde{Q}_n = |\nabla\tilde{M}|$ $\tilde{Q}'_n : \tilde{Q}'_n = \hat{F}\tilde{Q}_n = \hat{F}\hat{O}_n\tilde{M}$
    Segmented Tensor with dim(C)=dim(M)+K $\tilde{C}$: containing cell result
    $\tilde{C} = (\hat{F}\hat{O}_n\tilde{M})T$ $\hat{F}$: L Filters operations applied on Q
$f_{nlk}$: K Parameter of filters L filters
    e.g. thresholds, min, max, etc $\hat{O}$: Non-singular operator
    $\hat{O}\hat{O}^{-1} = \hat{O}^{-1}\hat{O} = \hat{I}$ T: Combination operator (logic, linear, or non-linear but with inverse)

$\hat{O}T = T\hat{O} \neq 0$ where F is the filter for segmentation transform. Examples of K parameters of L filters F comprises for instance:

Min and max—the limits of the F color_.r, color_.g, color_.b—the stain color;

hardness—gives the shape of the opacity function inside the rectangle; values between 0 to 1;

alpha—the opacity maximum; values between 0 and 1; 1–completely opaque; 0—transparent;

visibility—show or hide the digital stain;

diffusion—allows to control the diffusion of a stain to neighboring pixels ridge detection: It is common to detect ridges in images from local derivatives of first and second order. It is actually shown that with x,y, the spatial coordinates (we stick to 2d for the sake of simplicity) and M still the distribution of RI, we have the following conditions fulfilled on a ridge (T stands for tangential and N for normal):

$$\begin{cases} M_{NT} = 0 \\ M_{TT}^2 - M_{NN}^2 \end{cases},$$

where, $$\|\nabla M\|^2 = M_x^2 + M_y^2$$

$$M_{NN} = \frac{1}{\|\nabla M\|^2} \cdot (M_x^2 \cdot M_{xx} + M_y^2 \cdot M_{yy} + 2 \cdot M_x \cdot M_y \cdot M_{xy})$$

$$M_{TT} = \frac{1}{\|\nabla M\|^2} \cdot (M_x^2 \cdot M_{yy} + M_y^2 \cdot M_{xx} - 2 \cdot M_x \cdot M_y \cdot M_{xy})$$

$$M_{NT} = \frac{1}{\|\nabla M\|^2} \cdot ((M_x^2 - M_y^2) \cdot M_{xy} - M_x \cdot M_y \cdot (M_{yy} - M_{xx}))$$

Lindeberg further presented a method to extract ridges based on derivatives of first and second derivatives as shown above which in addition is combined with scale-space analysis for more robust and more meaningful ridge extraction.

Edge detection and ridge detection with automatic scale selection, Tony Lindeberg, Int. J. of Computer Vision, vol 30, number 2, 1998.

Following the set of N filtered Matrixes $\hat{Q}'_n$ can be recombined by the combination transform T (logic, linear, or non-linear but with inverse $\hat{O}T = T\hat{O} \neq 0$) from N dimensions to N=1 and back transformed into the initial output C $$\tilde{C} = T(\hat{F}\hat{O}_n\tilde{M}) = T\tilde{Q}'_n \qquad \text{Equation 10:}$$

where C is the RI content based segmented Tensor with dim(C)=dim(M) containing a biological cell presentation as determined by filter parameters $f_{nlk}$.

Example 1: Combination Operator: Outputted C $$C = \sum_{n=1}^{N} Q'_n$$

The combination of the different sets of transformed data can be a simple linear combination (simple data merging):

$$\tilde{C} = T(\hat{F}\hat{O}_n\tilde{M}) = \sum_n \omega_n \hat{F}\hat{O}_n\tilde{M}$$

or more complex non-linear combinations including regularization techniques where a cost function is to be reduced from parameters tuning with a trade-off between fidelity to data and fidelity to mathematical model. This is the definition of one segmented dataset by one digital stain. In general, this procedure can be repeated and combined for an arbitrary numbers of stains, e.g. by using different color filter functions.

Example 2: Combination Operator: Outputted C $$Q'_{nij} = \begin{cases} \text{if } f_{nlk} > Q_{nij} > f_{nlk}, 1 \\ \text{otherwise, 0} \end{cases}$$

$$C_{ij} = \begin{cases} \text{if } Q'_{1ij} = 1 \text{ and } \ldots \text{ and } Q'_{Nij} = 1 \text{ and, } F * M_{ij} \\ \text{otherwise, 0} \end{cases}$$

This initial representation C(t=0) of $f_{nlk}$(t=0) can be iteratively updated such as $$\tilde{C}(t+1) = \tilde{C}(t) + \eta \frac{\partial c}{\partial \tilde{C}} \qquad \text{Equation 11}$$

where $$\tilde{C}(t+1) = T(\hat{F}(t+1)\tilde{Q}_n)\hat{O}_n^{-1} \qquad \text{Equation 12:}$$

Here, η is the learning rate, and c is the cost function or feedback evaluation. The choice of the cost function depends on factors such as the learning feedback type (supervised, unsupervised, reinforcement, etc.) and the activation function. For example, when performing supervised learning feedback on a multiclass classification problem, common choices for the activation function and cost function are for instance a cross entropy based function.

This process can be applied for any chosen number of representations of C, i.e. the object characterization which is adapted for visual representation as a digitally stained specimen on a GUI of the computer system, hence resulting in any chosen number of characterizations of the microscopic object. Each characterization of the microscopic object (also name "stain" or "digital stain" herein) can be characteristic for one particular biological feature, e.g. an organelle. In this case, the cost function c is defined is such a way as is minimizes the difference in expected output and the actual achieved output C(t) as defined by the filter parameters f(t). This process would for instance result in C(t) as the estimated feature (e.g. organelles) and in F[f(t)] as the estimated feature dataset (e.g. estimated cell organelles characteristics (COC Estimated)) which allows to characteristically define the biological feature by the digital stain space Q.

Examples of Combined Segmentation

Dimension 1: RI

Mathematical transform O for distribution Q $$\hat{O}_1 = I$$

$$\tilde{Q}_1 = \hat{O}_1 \tilde{M} = \tilde{M}$$

A segmentation transform F is a mapping that counts the number of $\tilde{Q}_1$ in all of the voxels, i.e. the frequency of RI distribution within the measured microscopic object.

For a non-cumulative approach, a simple range of values can be defined as $$\hat{F}_{1,1} = [\min(\tilde{Q}_1) \ldots dm \ldots \max(\tilde{Q}_1)]$$

where dm is the sampling depth.

Alternatively, the cumulative histogram $\hat{F}_{1,2}$ for discrete values of $\tilde{Q}_1$ is defined as:

$$\hat{F}_{1,2} = \Sigma_{k=1}^{K} \tilde{Q}_{1,k}$$

Dimension 2: RI Gradient

Mathematical Transform O for Distribution Q $$\hat{O}_2 = |\nabla|$$

$$\tilde{Q}_2 = \hat{O}_2 \tilde{M} = |\nabla \tilde{M}|$$

A segmentation transform F is a mapping that counts the number of $\tilde{Q}_2$ in all of the voxels, i.e. the frequency of RI distribution within the measured microscopic object.

For a non-cumulative approach, a simple range of values can be defined as $$\hat{F}_{2,1} = [\min(|\nabla \tilde{M}|) \ldots d\nabla m \ldots \max(|\nabla \tilde{M}|)]$$

where $d\nabla m$ is the sampling depth.

Alternatively, the cumulative histogram $\hat{F}_{2,2}$ for discrete values of $\tilde{Q}_2$ is defined as:

$$\hat{F}_{2,2} = \Sigma_{k=1}^{K} \tilde{Q}_{2,k}$$

Dimension 3: Integral Transforms

Mathematical Transform O for Distribution Q $$\hat{O}_3 = \mathcal{F}$$

$$\tilde{Q}_3 = \hat{O}_3 \tilde{M} = \mathcal{F} \tilde{M}$$

A segmentation transform F is a mapping that counts the number of $\tilde{Q}_3$ in all of the voxels, i.e. the Spatial frequency domain (SFD) of RI distribution within the measured microscopic object.

For a non-cumulative approach, a simple range of values can be defined as $$\hat{F}_{3,1} = [\min(\mathcal{F} \tilde{M}) \ldots dk \ldots \max(\mathcal{F} \tilde{M})]$$

where dk is the sampling depth.

Alternatively, the cumulative histogram $\hat{F}_{3,1}$ for discrete values of $\tilde{Q}_3$ is defined as:

$$\hat{F}_{3,2} = \Sigma_{k=1}^{K} \tilde{Q}_{3,k}$$

Multiple combination to span the Digital Stain space such as the combination of

Ranges of RI and RI Gradient and RI SFD

With according parametrization of indexMin, indexMax, gradNormMin, gradNormMax, SFDMin, SFDMax—the limits of the rectangle in the digital stain panel representing the parameters refractive index (RI) on the X axis and refractive index gradient (RIgradient) on the Y axis and refractive index SFD (integral form) on the Z axis;

Any combination with further segmentation transforms

Reduction of Q dimension and any combination such as

Duplets: RI & RI gradient or RI & RI SFD or RI SFD & RI gradient

Modification of Q dimensions by replacing Operators O and Filters F

Triplets: RI & RI gradient & RI ridge detection

Increase of Q dimensions by additional Operators O and Filters F

Quadrupoles: RI & RI gradient & RI SFD & RI ridge detection

Etc.

Example 1: Binary Logic Operator $\hat{F}_{1,3}$ and Linear Combination Operator $T_1$ $$Q'_{1ij} = \begin{cases} \text{if } f_{1,3,1} > Q_{1ij} > f_{1,3,2}, \hat{F}_{1,3} * M_{ij} \\ \text{otherwise, } 0 \end{cases}.$$

with e.g. $\hat{F}_{1,3}$ a certain color value and for the second dimension binary logic operator $\hat{F}_{2,3}$ $$Q'_{2ij} = \begin{cases} \text{if } f_{2,3,1} > Q_{2ij} > f_{2,3,2}, \hat{F}_{2,3} * M_{ij} \\ \text{otherwise, } 0 \end{cases}.$$

with e.g. $\hat{F}_{2,3}$ a certain color value and accordingly defined for the $\hat{F}_{3,3}$. Hence, the Combination Operator T can be defined for output Matrix C as following $$C = \sum_{n=1}^{N} Q'_n$$

Example 2: Combination Operator $\hat{F}_{1,4}$ and Intersection Operator $T_2$ $$Q'_{1ij} = \begin{cases} \text{if } f_{1,4,1} > Q_{1ij} > f_{1,4,2}, 1 \\ \text{otherwise, } 0 \end{cases}.$$

And likewise for $2^{nd}$ and $3^{rd}$ dimension. Hence, the Combination Operator T can be defined for output Matrix C as following $$C_{1ij} = \begin{cases} \text{if } \prod_{n=1}^{3} Q'_{nij} = 1, F * M_{ij} \\ \text{otherwise, } 0 \end{cases}.$$

with e.g. F a certain color value. These operations finally allocate colors to the original RI voxels data.

Example of Technical Implementation of a Transfer Function

Figure 4:
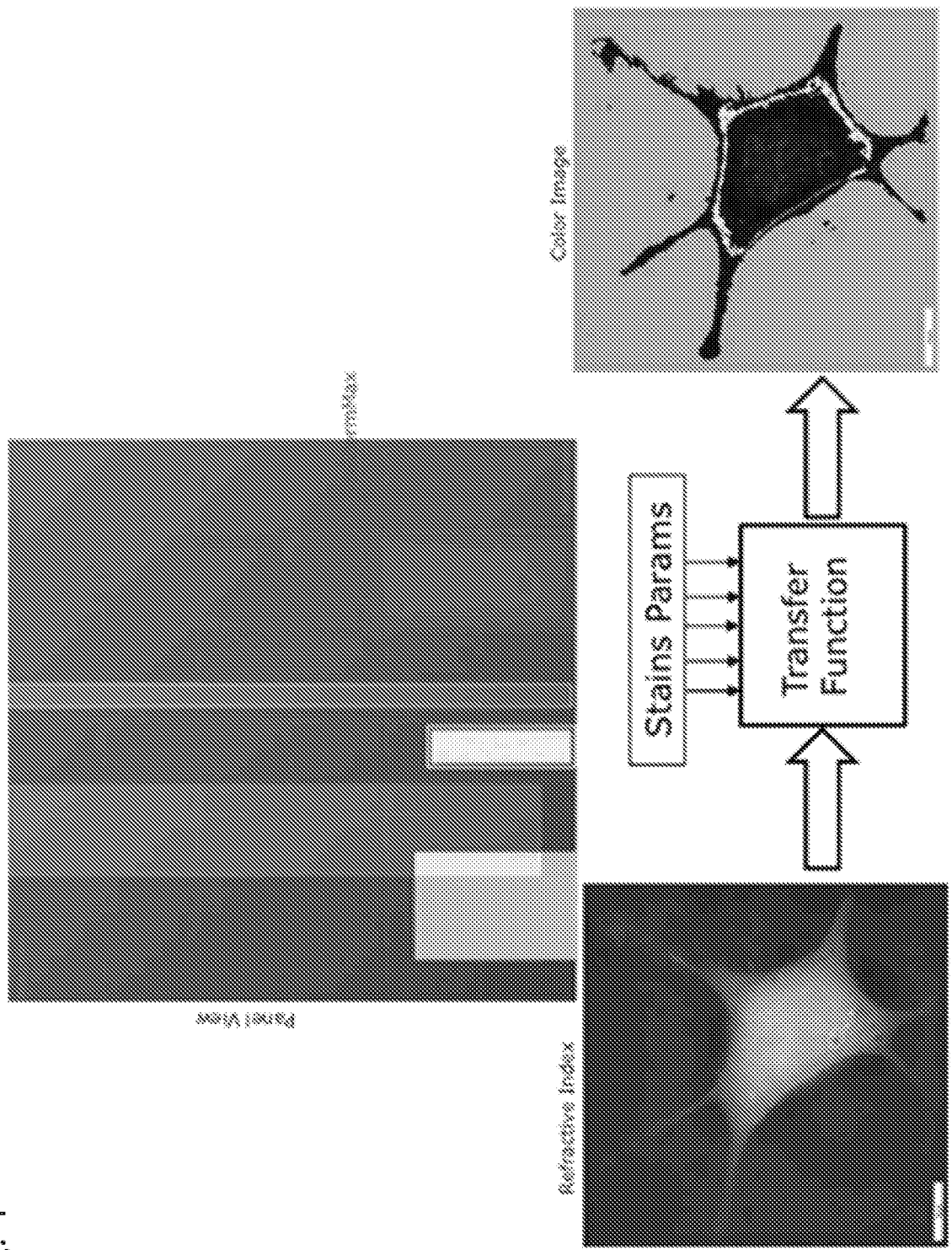
FIG. 4 illustrates schematically an example of typical input and output data represented visually by a graphical user interface of an object characterization program according to an embodiment of the invention, whereby a digital stain panel (centre panel) defines a transfer function between the input data (left panel) and the output data (right panel)

To transform the data in N-dimensions, the characterization of the microscopic object needs to be calculated. Hence, for a linear 2-dimensional stain space with GUI integration as shown in FIG. 4, e.g. a first dimension defined by the parameter "refractive index (RI)" (X axis on the centre digital stain panel) and a second dimension defined by the parameter "norm of the RI gradient" (Y axis on the centre digital stain panel), the characterization of the microscopic object can be defined as a Transfer function that may be implemented as an algorithm of the object characterization program. A pseudo-code showing an example of the steps from raw data (refractive index measurement)+xml stain file to a RGBA data is shown below as an example of implementation. The RGBA data is the input for the 3D visualization display.

Each stain is characterized by the following parameters: indexMin, indexMax, gradNormMin, gradNormMax—the limits of the rectangle in the refractive index—gradient space; index is on the X axis; gradient on the Y axis; color_.r, color_.g, color_.b—the stain color; hardness—gives the shape of the opacity function inside the rectangle; values between 0 to 1; alpha—the opacity maximum; values between 0 and 1; 1-completely opaque; 0-transparent; visibility—show or hide the stain; this parameter is not explicitly shown in the code below;
Steps:
1. For each voxel (for (int a=0; a<dimX*dimY*dimZ; a++)) compute the gradient from the refractive index (gray image data). The computation is done via central difference approximations and taking into account the resolutions:

$gx = (\text{index}[a+1] - \text{index}[a-1])/(2.f*dx);$ $gy = (\text{index}[a+\text{dim}X] - \text{index}[a-\text{dim}X])/(2.f*dy);$ $gz = (\text{index}[a+\text{dim}X*\text{dim}Y] - \text{index}[a-\text{dim}X*\text{dim}Y])/(2.f*dy);$ $\text{gradNorm}[a] = \text{sqrt}(gx*gx + gy*gy + gz*gz);$ where dimX,dimY,dimZ are the dimension of the data block (in our case 512,512,96) and dx,dy,dz are the x,y,z resolution.
2. For each voxel and for each stain compute a strength
s1=testRange(indexMin, indexMax, index[a]);
s2=testRange(gradNormMin, gradNormMax, gradNorm[a]);
strength[a]=std::min(s1, s2);
where std::min takes the minimum between s1 and s2 and testRange function is:

```
float testRange(float min, float max, float value)
{
    /* Outside of range */
    if (value < min)
        return 0;
    if (value > max)
        return 0;
    /* In soft edge */
    float hard = (max - min) / 2 * (1. - hardness_);
    if (value < min + hard)
        return (value - min) / hard;
    if (value > max - hard)
        return (max - value) / hard;
    /* Complete inside */
    return 1.f;
}
```

3. For each voxel and for each stain compute the RGBA quadruplet, like this:
rgba[0]=color_.r;
rgba[1]=color_.g;
rgba[2]=color_.b;
rgba[3]=std::min(255, (int) (strength[a]*alpha_*255.9));
At the end of this step, a 3D RGBA data for each stain is computed; and now we need to combine these RGBA data into a unique one.
4. For each voxel do the blending

```
// Additive compositing
for (int a = 0; a < 4 * dimX * dimY * dimZ; a++)
    dst[a] = src[0][a]; // src[0][a] - First stain ([0]) given in rgba
// Additional stains
unsigned char* d = dst;
for (int a = 0; a < dimX * dimY * dimZ; a++)
{
    for (size_t i = 1; i < src.size( ); i++)
    {// src.size( ) the number of stains
        unsigned char* s = src[i];
        // alpha and multipliers
        unsigned char alphaOut = std::max(s[4 * a + 3], d[4 * a + 3]);
        unsigned int multSrc(0);
        unsigned int multDst(0);
        if (alphaOut)
        {
            multSrc = (unsigned int) s[4 * a + 3] * 256 / alphaOut;
            multDst = (unsigned int) d[4 * a + 3] * 256 / alphaOut;
        }
        // apply source to destination
        dst[4 * a + 0] = (unsigned char) std::min((multSrc * s[4 * a + 0] + multDst* d[4 * a + 0] ) / 256, 255);
        dst[4 * a + 1] = (unsigned char) std::min((multSrc * s[4 * a + 1] + multDst* d[4 * a + 1] ) / 256, 255);
        dst[4 * a + 2] = (unsigned char) std::min((multSrc * s[4 * a + 2] + multDst* d[4 * a + 2] ) / 256, 255);
        dst[4 * a + 3] = alphaOut;
    }
}
```

In the end, the final RGBA data is in the dst array.

Figure 5:
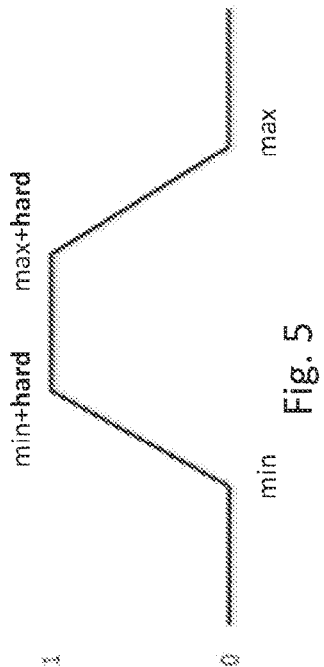
FIG. 5 illustrates schematically an example profile of a transfer function.

The transfer profile (1D presentation of F) resulting from step 2 of the above code by way of example is shown in FIG. 5.

Classes of Feedback Loops in Object Characterization

A simplified feedback to update the characterization of the microscopic object is pictured in FIG. 9a. There are fundamentally two forms of feedback possible: direct feedback from the user, or an external source of knowledge which can be used to improve the convergence of equation 11.
Supervised Feedback Example of a workflow of a 2D transfer function by direct user feedback:

Feedback is mainly based on the user's expertise and allows to systematically quantify and re-apply this expertise to initially characterize or to improve characterization of microscopic objects as follows:
1. The user selects on the GUI of the computer system a color in order to stain a part of the cell (color_.r,color_.g,color_.b parameters);
2. The user picks some sample pixels in the gray image (refractive index image) presented on the GUI of the computer system;
3. For the picked pixels, the object characterization program computes the mean and the standard deviation for the refractive index as well as for the gradient norm.

4. The object characterization program computes the minimum (mean−2*stdDev) and the maximum (mean+2stdDev) for both inputs. So, the indexMin, indexMax, gradNormMin, gradNormMax parameters are computed.
5. The object characterization program computes and applies the transfer function to the gray image in order to obtain the color image.
6. Feedback: The user could change the default values of the hardness, alpha, visibility parameters. The user could move the parameter rectangle (indexMin, indexMax, gradNormMin, gradNormMax) in the digital stain panel displayed on the GUI of the computer system. The new transfer function is reapplied by the object characterization program.
7. The user could add more than one object characterization (digital stain), by repeating the $1^{st}$, $2^{nd}$ or $6^{th}$ points.

Observation: For the moment, the main purpose of the object characterization program is to control the microscope, to visualize 4D (xyzT) data and to provide an easy access to the user for the staining process.

In embodiments, the user feedback may also be described by N>2 of digital stain space Q, such as:
1. Detection of all independent objects which share the same object characterization (with a threshold setting). Definition: An object represents all pixels that are connected in a given space.
2. Improve the user interaction:
   1. By extending the picking procedure from 2D to 3D
   2. By enhancing the picking procedure (i.e.: spline curve)
3. Improve the stain space (digital stain panel view)
   1. By adding more dimensionality, along the RI and gradient norm axes, for instance statistical moments, texture characteristics, frequencies, and scale-space parameters
   2. By allowing the stains to have non-even shapes (not necessary a rectangular), whereby users may define the shape of the stain in the digital stain panel and to have a procedure to store the user selected shape.
4. Add network computing system services for saving data and stain spaces.

Unsupervised Feedback

The workflow using a feedback system illustrated in FIG. 9b may comprise the following steps:
1. Acquire data (e.g. Holograms) from a cell sample with a microscope;
2. Compute, in the computer system using an object characterization program according to this invention, the stain space from holograms through complex refractive index and filters;
3. Mix, in the computer system using the object characterization program, the user interaction (user feedback) with the estimated object characterization (e.g. the COC Estimated), the result forming an output of the mixer block;
4. Refine, in the computer system using the object characterization program, the stain space using the mixer block output, thus generating one or more feature datasets characterizing one or more features of the microscopic object (e.g. COC data);
5. Save, in the computer system using the object characterization program, complex refractive index data as well as the features datasets on local storage and/or on a network computing system's data center to populate the data center with characterizations of features of microscopic objects;
6. User: Launch and supervise network computing system's data analysis. 7. Network computing system: Compute estimated features datasets (e.g. COC Estimated data) based on data from the data center.

Hence, the mixing with external feedbacks ΣX illustrated in FIG. 9b allows to replace supervised by unsupervised feedback provided that machine learning can be applied for quantitative data of
  ΣC database of segmented data
  ΣM database of measurements
  ΣO database of object characterizations and it's standard deviation (ΣO) representing a degree of reliability of the object characterization process The features datasets characterizing various features of microscopic object may be calibrated through biologically relevant events such as results of biological procedures (e.g. cell survival) or fully automated machine learning processes for instance based on Deep learning, critical parameter analysis, or non-rigid error analysis.

The cross comparison (also known as "ground truth") with other technologies
  Chemical analysis
  Parallel/sequential staining
  High-imaging technologies (eg SEM)
refers to the accuracy of the training set's classification for supervised learning techniques. This is used in statistical models to prove or disprove research hypotheses and may also be used in the present invention to improve object characterization. Ground truthing refers to the process of gathering the proper objective (provable) data for this test by above mentioned methods.

Bayesian spam filtering is a common example of supervised learning. In this system, the algorithm is manually taught the differences between spam and non-spam. This depends on the ground truth of the messages used to train the algorithm—inaccuracies in the ground truth will correlate to inaccuracies in the resulting spam/non-spam verdicts.

Unsupervised feedback relies on the population of an external (remote from user) Database as shown in FIG. 7:
1. Populate the network computing system's data center with feature datasets characterizing one or more features of the microscopic object (e.g. Cell Organelles Characteristics (COC)). The user determines the feature dataset and adds meaningful annotations. The mixer block takes into account only the user interaction (the estimated feature datasets are not available at this moment)
2. When a certain amount of data are available on the data center, the network computing system analysis block starts to provide output, namely an estimated feature dataset. In the mixer block the estimated feature dataset (COC Estimated) will enhance the user interaction, thus more precise characterizations of features of a microscopic object are made. So, the features datasets saved on the data center became more and more precise.
3. Data from other types of microscopes (STED, Confocal, . . . ) may be saved and stored in the network computing system's data center. The aim is to enhance the reliability of data analysis.
4. With the growing of analysis reliability (provided by the network computing system through the COC Estimated), user interaction will became less and less important.

5. As the ultimate goal, the user interaction should be neglected and the system should provide automatically the best feature dataset for a given complex refractive index distribution.

Reinforcement Feedback

Examples for reinforcement feedback for Digital Stains illustrated in FIG. 9c and FIG. 9d seek to characterize microscopic objects (e.g. cells) from a refractive index point of view.

An architecture of a reinforcement feedback system may for instance comprise:
1. Feedback loop to improve the user selection
   1. Adding automated object detection:
      1. Cell Envelope (via Watershed, Active Meshes algorithms)
      2. Point-like/Spherical objects (via Wavelet based methods, . . . )
      3. Line-like/plane-like objects (Hough Transform, Curvelet)
      4. Complex forms (Deformable algorithms, Watershed, Deep learning, . . . )
   2. Long term aim: eliminate the user selection input and keep only automated methods;
2. Acquired knowledge via network computing system services with machine learning and data mining systems;
3. A software interface for complex data visualizations and user interactions.

Generalization of Technical Implementation

In essence, the presented invention's architecture can be summarized as shown in FIG. 6 as described as follows:
1. Complex Refractive Index
   1. Compute the complex refractive index ($\underline{n}=n+i\kappa$) from the microscope output (holograms) (where: n is the refractive index; k is the absorption)
2. Filters Computation
   1. Operations: compute gradient norm, statistical moments, texture characteristics, frequencies, scale-space parameters;
3. Stain Space
   1. Visualization operations (how the stain space is presented to the user, see panel view). For example: compute strength, compute RGBA quadruplet.
   2. Interaction operations (how the user interact with this space). For example: set the stain parameters (indexMin, indexMax, gradNormMax, . . . color, . . . )
   3. Automatic feature (e.g. organelles) detection. For example: Cell envelope, point-like, line-like, plane-like objects detection, . . . .
4. Mixer (User Interaction/Network computing system feedback: estimated feature dataset (COC Estimated))
   1. Operation: set the balance between user interaction and the network computing system feedback to generate an estimated feature dataset (COC Estimated)
5. Network computing system's Data Analysis
   1. Example: Principal Component Analysis, Machine learning algorithms, Deep learning, Data mining, Non-rigid learning, Critical parameters analysis
6. Local storage and Network computing system's Data Center
   1. Secure data storage operations for complex refractive index and feature datasets (COC)
   2. Sharing operations Example of User-Defined Digital Stains Referring to FIG. 6, an example of processes of the according to embodiments of the invention starting from the acquisition of data right through the processes to output of data, sharing, and learning processes is described below.

Figure 1:
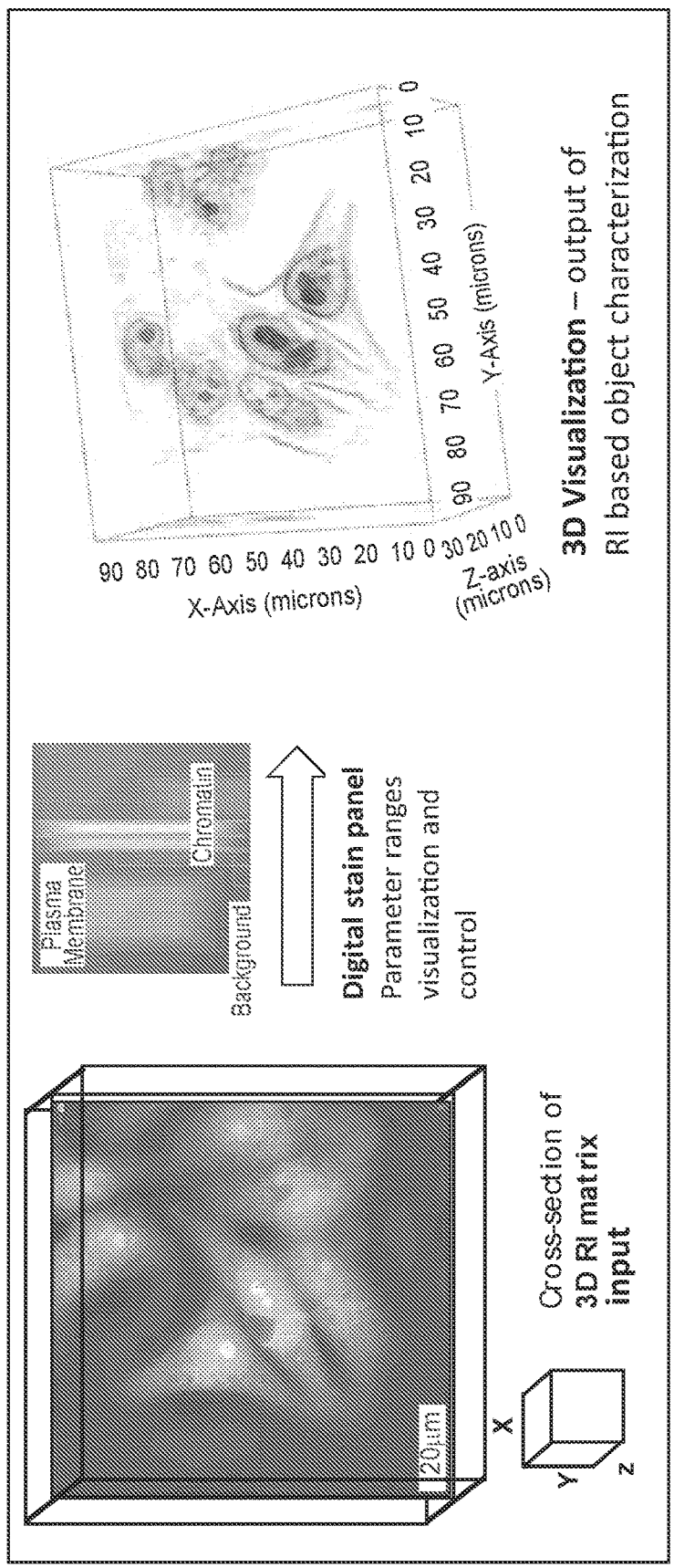
FIG. 1 illustrates an example of typical input and output data represented visually by a graphical user interface of an object characterization program according to an embodiment of the invention, whereby a digital stain panel (center panel) defines a transfer function between the input data (left panel) and the output data (right panel). In this example the input data is a refractive index (RI) distribution of a cell obtained by quantitative cell tomography, in vitro, without any invasion or sample preparation, by means of a microscope detecting changes to light as it propagates through the cell, to obtain a three or four dimensional distribution of the physical refractive index (RI) within the cell. By this means, one can measure the cell's physical properties.

Inputs (Information/Data Inputted from Registers and by User):

Acquiring 3D physical data (refractive index, gradient) of a microscopic object by means of a digital microscope. The input format is depicted in FIG. 1 and yields equation 1. This is starting step S1 in FIG. 6 and is first of all locally stored (S2).

Processing of Inputs:

Producing a segmented 3D image of the specimen to generate a feature dataset estimate (COC estimate), where the different Transfer functions and its parameters defined in Digital Stain space Q represent the different values of acquired refractive index and gradient in 3D space.

In the case of supervised feedback only, feedback loop S3a comprising interaction from the user using the GUI illustrated in FIG. 2 is executed as follows:

1. Choose a meaningful slice on the 2D visualization panel (left side). Dragging the mouse up to down (left click pushed) on the 2D visualization panel or by moving the Slices slider.
2. Pick a new parameter range (seen as a colored rectangle depicting parameters of a specific feature characterizing the object) in the digital stain panel and go to the 2D visualization panel and draw. Click and/or drag the mouse on the desired region of interest. The pixels under the cursor are used to define input parameters f.
3. $C_0$ is calculated and given by equation 2 through equation 10.
4. Now the initial guess of a parameter range (digital stain) $F_0$ is represented in the panel view (=Digital stain space Q) and superimposed on the 2D visualization panel.
5. The parameter range (digital stain) can be fed back by the following operations to vary f(t) with consequent update of C(t) as given by equation 11 and equation 12:

Change the weight of the colored image on the 2D visualization panel by moving the Overlay slider.

Change the opacity (Opacity slider or drag up-down with the right click pushed).

Change the edge softness (Edge softness slider or drag up-down with the right click pushed on a stain edge).

Move a stain (parameter range) in the panel view (click on the stain and drag it on the desired position in the refractive index—index gradient space).

Change the shape of the stain (select and edge or a corner and drag it).

Alternatively or in addition, in the case of at least partially unsupervised feedback, feedback loops S3b, S4b, and S5b may be executed as follows:

6. The initial indication of COC (C,F,f for t) from previous input is sent to a database constituting an ensemble of C,F,f as a function of the feature dataset (COC);
7. Data-mining/Machine learning approaches as described in previous section in used to iterate equation 11; 8. A new feature dataset (COC) estimate (C,F,f for t=t+1) is fed back to the local user Outputs (Data for Further Processing; Information for Visualization/Display):

Storing the rendered 3D image of the object on a computer, transferring and sharing the data and image with other users in the network.

Biological Significance of Object Characterization

Digitally Stain Cells

The Digital stain panel in FIG. 11 shows the typical disposition of the range of parameters represented by stain squares:

I quadrant is characterized by high variation rate in the refractive index and low RI, this region is typical for edges structures, like membranes.

II quadrant has high index gradient and high RI values, it generally includes texture zones, like vesicles.

III quadrant, having a low gradient index and low RI is more transparent and homogeneous and is typical for the background.

IV quadrant is characterized by low variation rate in the refractive index and high RI, generally includes high density homogeneous structures like the nucleus.

The Digital stain applied on the RI-map is shown in FIG. 11.

Digital Stain Parameter: Position
 i. Shift horizontally the stain square to change the RI range and stain a different part of the sample.
 ii. Shift vertically the stain square to change the RI gradient range and stain a different part of the sample.

Figure 12:
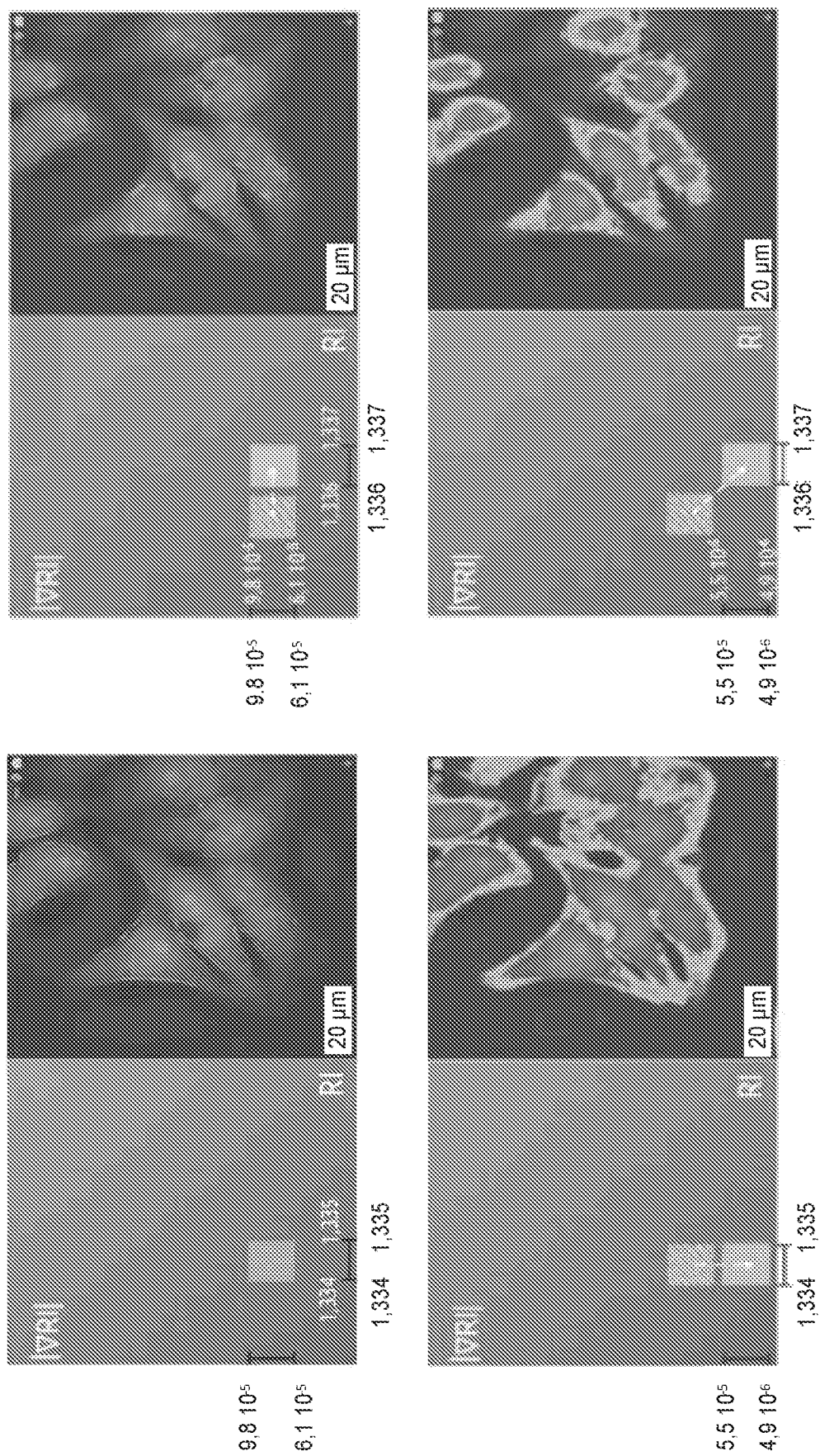
FIG. 12 illustrates an effect of varying position parameters on the digital stain panel on a biological specimen.

In FIG. 12 is shown the combined effect of these position manipulations.

Figure 13:
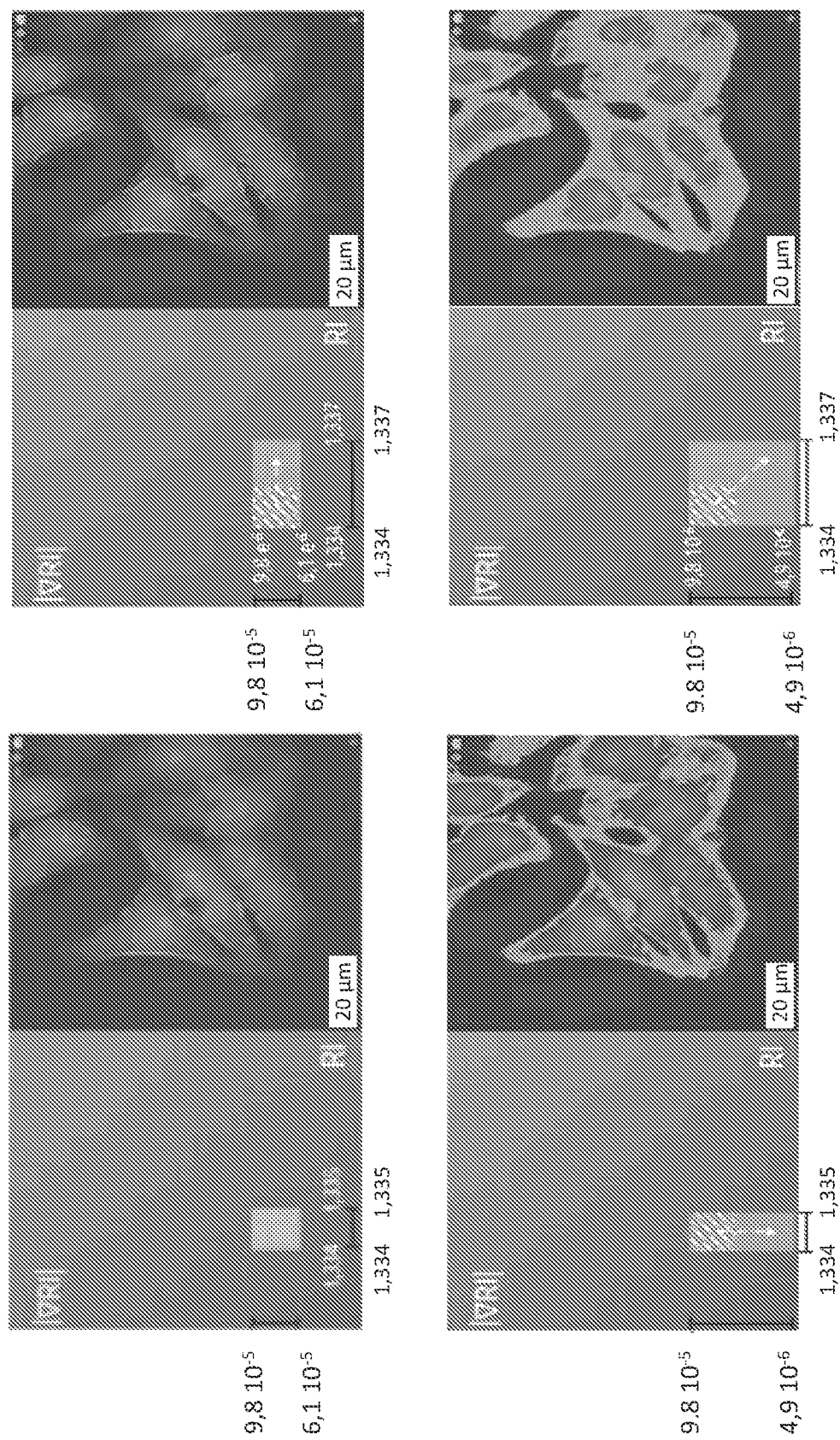
FIG. 13 illustrates an effect of varying shape parameters on the digital stain panel on a biological specimen.

Digital Stain Parameter: Shape
 i. Enlarge or reduce the width of a stain square to stain respectively more or less sample structures
 ii. Enlarge or reduce the high of a stain square to integrate more or less variation In FIG. 13 is shown the combined effect of these shape manipulations.

Digital Stain Parameter: Opacity & Edge Softness

Figure 14:
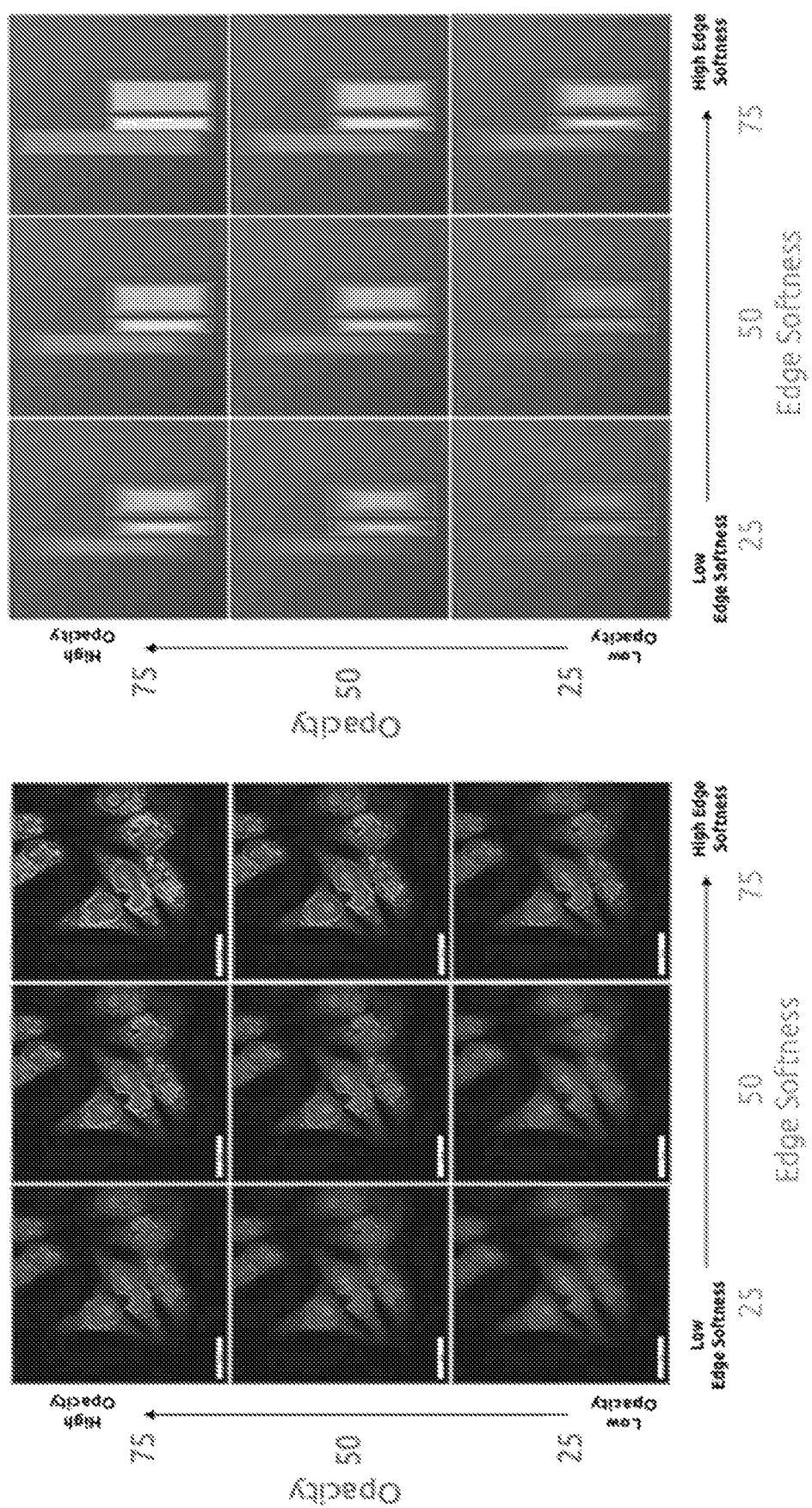
FIG. 14 illustrates an effect of varying edge softness on the digital stain panel on a top-view of a biological specimen.
Figure 15:
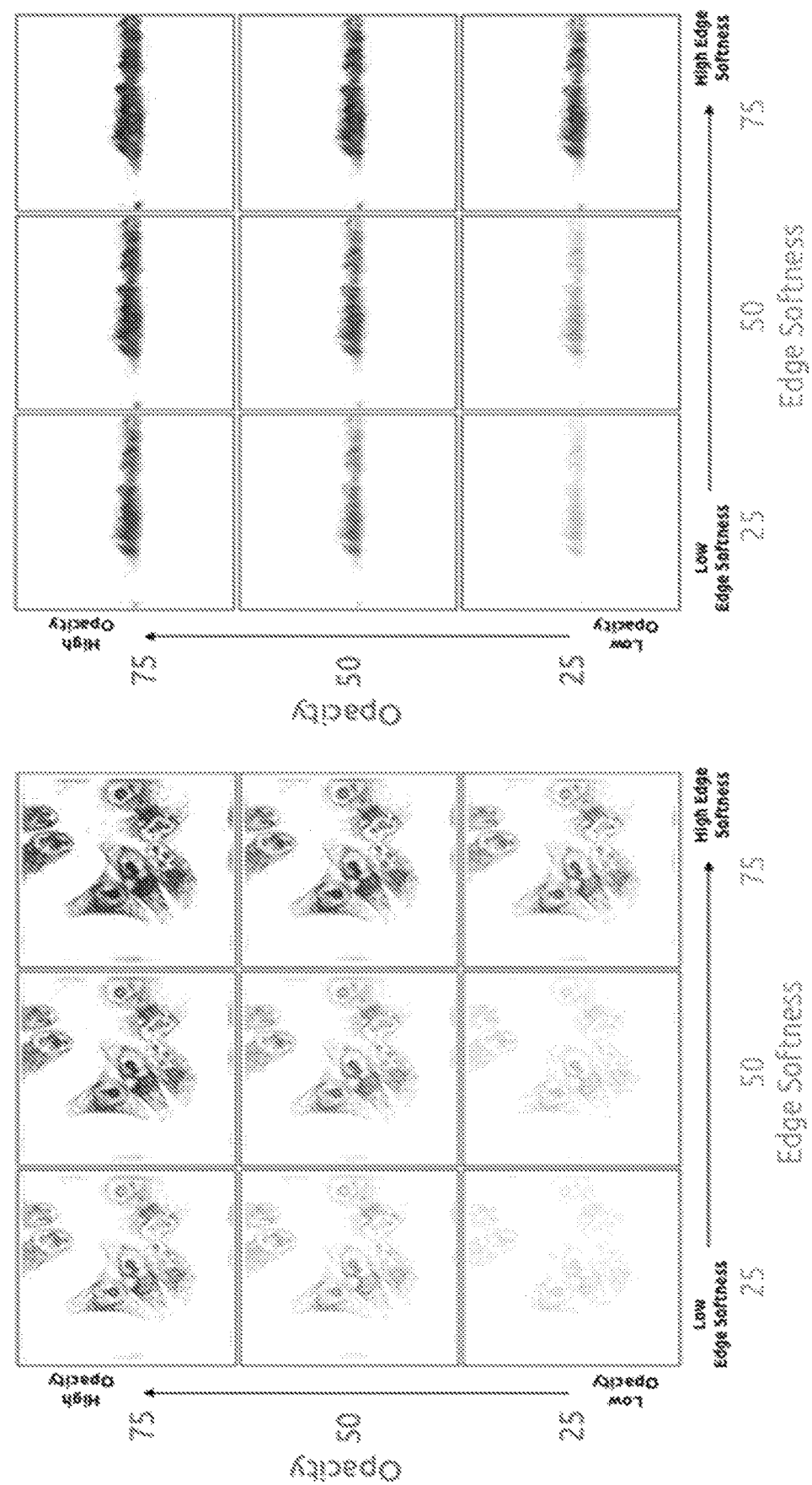
FIG. 15 illustrates an effect of varying edge softness on the digital stain panel on a side-view of a biological specimen.

The opacity parameter sets the maximum intensity of the stained pixel color. Minimum level is 0 (transparent), maximum level is 100 (opaque). The edge softness parameter sets how fast change in the space the intensity of the stained pixel color. Minimum level is 0 (smooth change), maximum level is 100 (quick change). Both effects are depicted in FIG. 14 and FIG. 15.

Digital Stain Parameter: Set the Background RI Value
 1. Stain with a new color a region of RI-map without cell sample
 2. Define Background Stain
 3. Set the value of Background's Refractive Index (e.g. PBS RI value is 1.334)
 4. Press OK to set the background: now the background color in the RI-map disappears and the background stain square becomes gridded
 5. When one sets the background RI value all the other stain RI values are rescaled.

Figure 16:
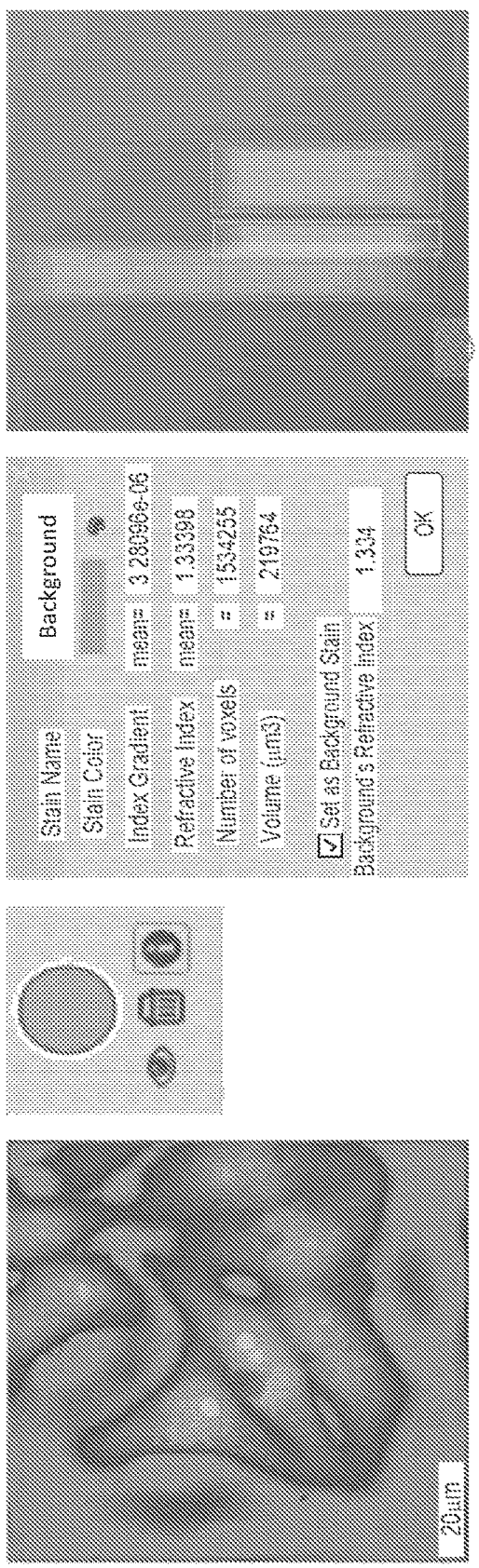
FIG. 16 illustrates a digital stain background definition on a biological specimen.
Figure 17:
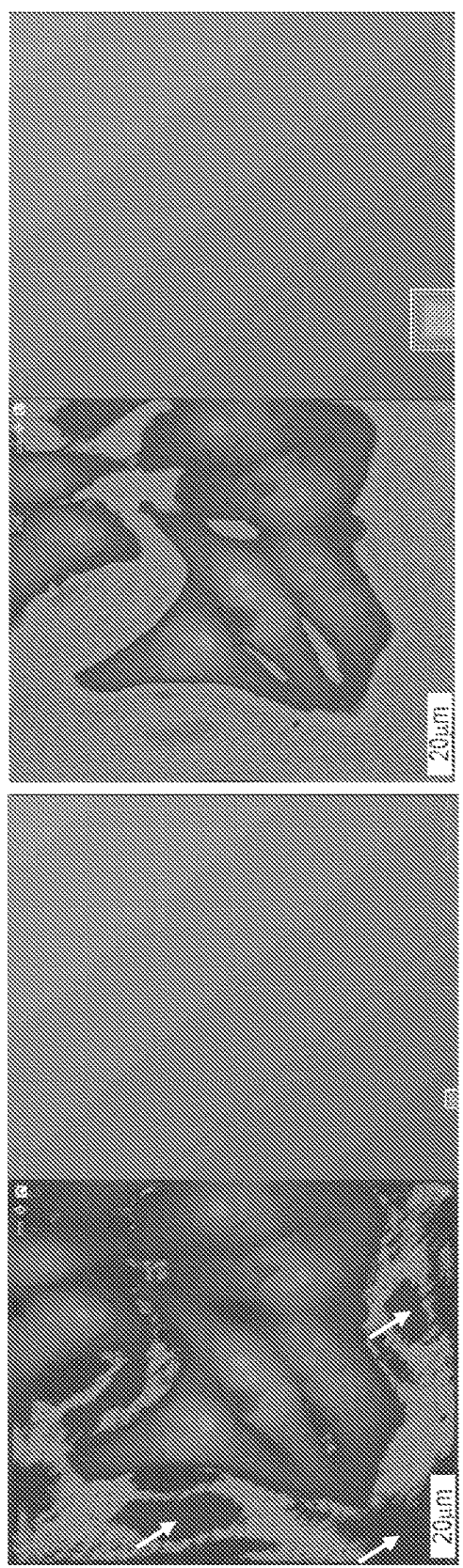
FIG. 17 illustrates a digital stain background optimization on a biological specimen.

During the setting background procedure staining (3e.1) avoid to let uncover area without cell sample (FIG. 16). To obtain the best background, manipulate the background stain square shape and position to cover all the empty regions (FIG. 17).

Digital Stain Parameter: Imaging System Effects

Figure 18:
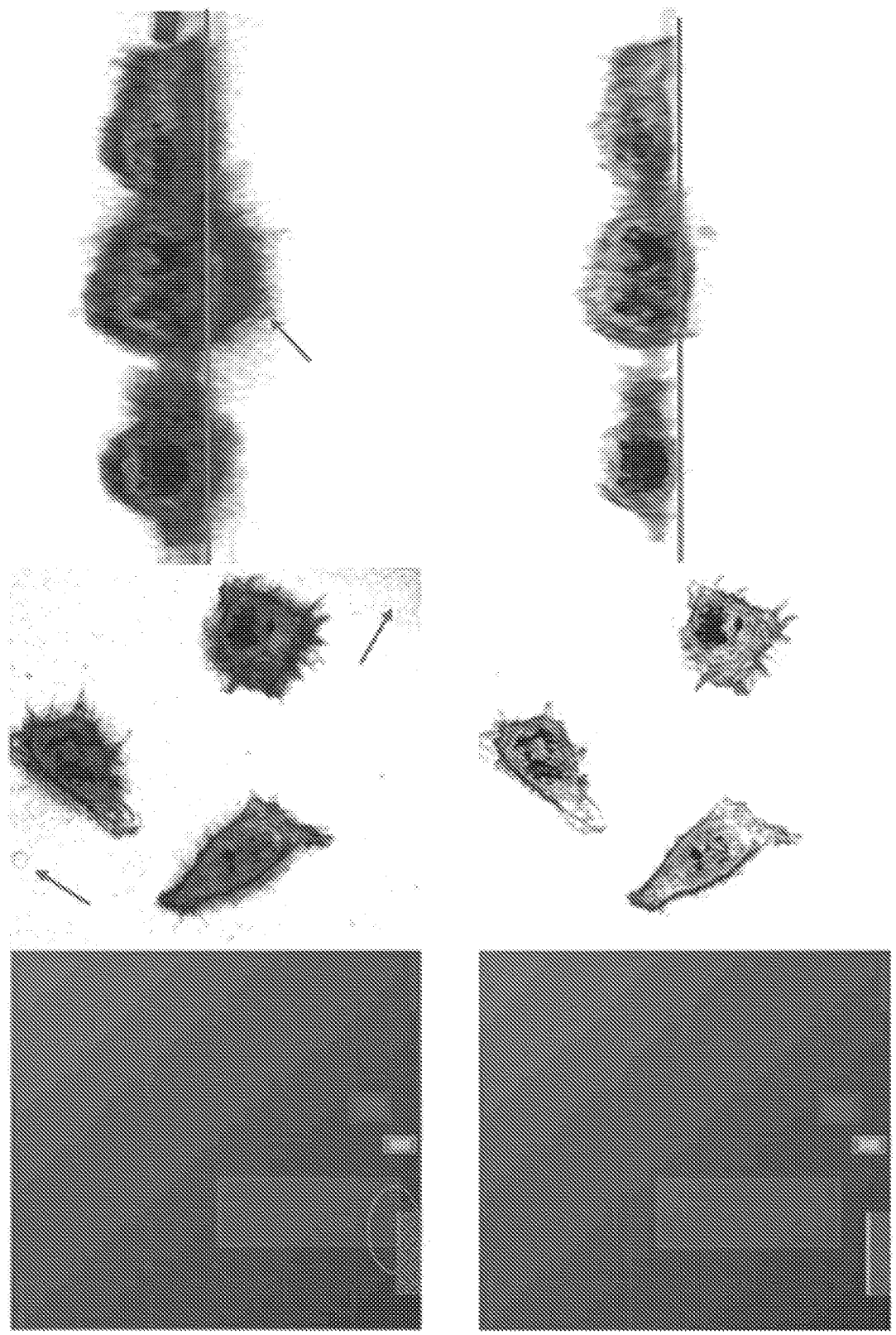
FIG. 18 illustrates an effect of optical aberrations on object characterization parameters, represented in the digital stain panel, on a biological specimen.

If there is overlap between a parameter range for a feature of the object and a parameter range selected for the background, some imaging artifacts may be visible on the 3D visualization: imaging artifacts are pointed by arrows in FIG. 18 where the stain covers the background too and it is spread up and down the plane where the cells are adhering (green line).

To stain only physical and meaningful features of a microscopic object, parameter ranges (e.g. represented by the rectangles in the digital stain panel) shouldn't overlap the background square FIG. 18.

Digital Stain Parameter: Unique Definition and Overlapping

To distinguish efficiently different object features, the use of similar colors for different parameter ranges (e.g. represented by the rectangles in the digital stain panel) (FIG. 19) should preferably be avoided. Generally a simple and efficient digital staining includes few and well distinguished parameter ranges (not overlapped and using very different colors for different ranges).

Subgrouped parameters (FIG. 20) could be used to put in evidence simultaneously features inside of another feature characterized by a wide RI range e.g. organelles within a whole cell, whereby the parameter ranges of the organelles (e.g. cell membrane, cytoskeleton, nuclear membrane, nucleoli) are within the parameter range of the whole cell.

Other times several overlapping parameter ranges (FIG. 21) allow to put in evidence features (e.g. in this illustrated example: sub membrane region, nuclear membrane, interface region) that would be otherwise difficult to characterize, because of geometrical issues or when no other new or sufficiently different colors are available for the visualization of the features.

Figure 22:
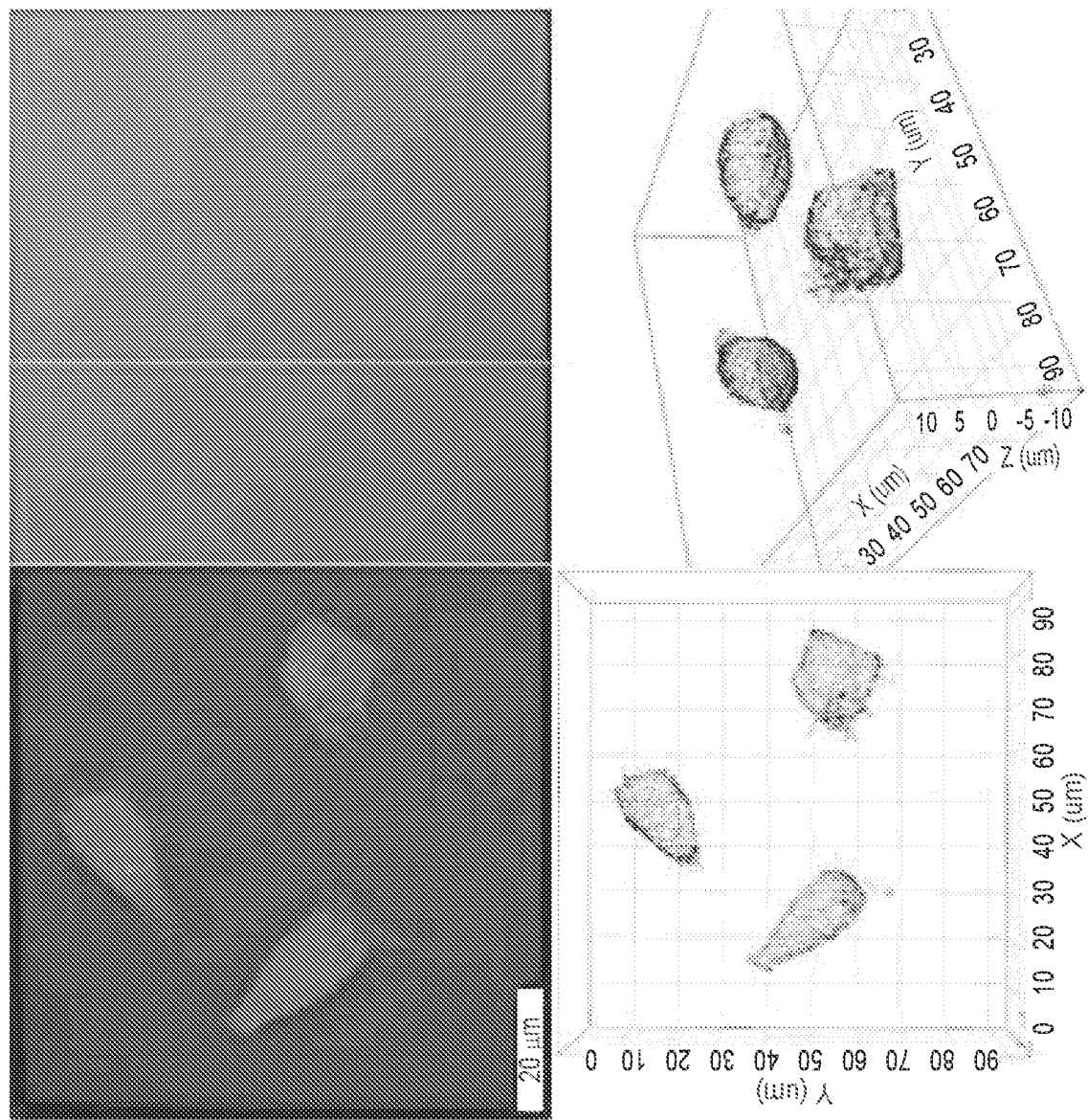
FIG. 22 illustrates cellular envelopes parameterized by digital stain on a biological specimen.
Figure 23:
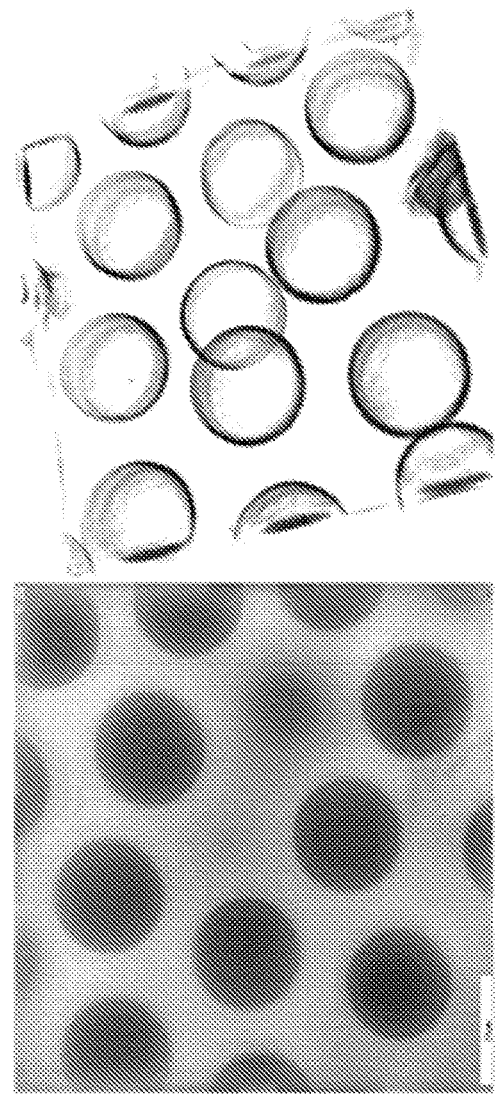
FIG. 23 illustrates an RI data acquisition obtained with a microscope as described in EP2998776 and digitally stained with an object characterization computer program according to an embodiment of the invention. The six spheres used for the measurement are the ones in the center of the image indicated by the green arrows (A) 2D map of the refractive index of the image, we can scroll between the 96 stacks of the image in this view. (B) 3D representation of the spheres present on the left panel. In this view, each color corresponds to a specific refractive. In the 2D view, the scale bar is 20 µm.

Create a parameter range as narrow as possible around the target RI value (smallest RI range), and as high as the total digital stain panel (no discrimination based on index gradient) (FIG. 22). Emphasize all the stained pixels set the top level of opacity and edge softness.

Advantages for Biological Applications

Object characterization according to the present invention is useful for physical-content based (RI) segmentation which can provide significant information content on the biological specimen, for instance it can provide a signature/finger print of diseases, indicate events beneath the resolution limit like virus infections, and many such events. From a big data analysis point of view (e.g. deep learning) this gives a decisive advantage since (a) physical data means quantitative data (in 5 dimensions: three spatial, and two RI based) which are therefore inherently prone to be compared (prior knowledge advantage not given very often or extremely hard to achieve)

(b) a ground-truth correlation (obtained for instance through reference data, external data, or using other technologies) can be performed to increase reliability of generated object characterization results.

Example: Automated Cell Metrics

Volume regulation plays a critical role in a lot of phenomenon. Volume homeostasis in cells is primordial for their survival. Alterations of the cell volume can alter the structure and the constancy of the cell's interior. This is why a large variety of cell volume regulation mechanisms had been developed by the cells in order to counteract the osmotic changes by either increasing or decreasing their volume. In the case of proliferation, an increase of the total cell volume is stimulating the process while its decrease will inhibit it. The same kind of contrary signals happens in protein synthesis and degradation. If the cell is well hydrated, and thus is swelling, it acts as an anabolic stimulator. On the contrary, if the cell is shrinking it acts as a catabolic cue. In the case of programmed cell death, volume decrease, and more precisely apoptotic volume decrease, is known to trigger it. The migration of cells also requires a dynamic change of the total volume. For instance, migration of neutrophils is largely facilitated by this volume modification. All of the previous phenomena are normal and current in a cell's life cycle. But, in some cases, the volume regulation is dysfunctional and leads to diseases. This is the case for renal failure where one of the most striking features is an increase of cell volume. The same phenomenon happens also in acute cerebral oedemas, but also in epilepsy where we observe a swelling of the cells before a seizure. Another example is the cataract formation in people suffering from diabetes mellitus, an accumulation of sorbitol in lens cells causes the cells to swell. Finally, in the fibrosing disease, because of a high TGFβ stimulation which provokes the entry of water, the cells are also swelling. On the contrary, a decreasing of the volume can also lead to dramatic consequences, a perfect example being sickle cell anaemia. Moreover, as stated before, a lot of hypercatabolitic states which can go from injury, burn, liver carcinoma or pancreatitis are linked to cell volume decrease. Finally, in tumours, an alteration of the nuclear volume can be observed. It can either be larger, and this is the case in carcinoma and bladder meningioma or it can be smaller as for lung carcinoma.

This is why there is a real need for a method that would combine a non-invasive approach with a great time and physical resolution in order to determine exact volume of living cells and/or its sub-parts. There are existing methods but that present flaws in the previous points mentioned. One approach is to determine the total volume of water into the cell. To do so, one can exploit the self-quenching properties of some dyes. Then by selecting an intracellular marker and monitoring by fluorescence microscopy the intensity of the dye, we can deduce the relative changes of the volume. Indeed, more intracellular volume means a higher concentration of the dye and as its concentration increases, the fluorescence decreases because of their self-quenching. This technique is not only limited to self-quenching dyes but also normal ones. As long as it is targeting the intracellular volume a monitoring is possible. The major drawbacks of these techniques are the relative measurement of the volume and the possible toxicity for the cells because of high markers concentration. The coulter counter can also be an alternative for the determination of the total cellular volume. This technique use cells in suspension in two chambers of saline solution separated by a small orifice. When a Direct Current (DC) is applied, any cell going through the orifice will displace an equivalent volume of saline solution and change the impedance. In this case, we can only measure the total volume of the cell and not the sub-parts of it and on top of that the cells are not in their environment anymore.

Other methods based on microscopy have also been developed. Among them we can find spatial filtering combined with light microscopy, dynamic light scattering system, scanning laser confocal microscopy, electron microscopy, atomic force microscopy, and holographic microscopy. Spatial filtering relies on the fact that the cell volume fluctuation is modifying the optical path length which is then detectable. Although this technique has a good sensitivity, it is fairly difficult to carry out and do not work on every system. Dynamic light scattering is a laser based technique normally used to measure the diffusion coefficients of different proteins. It can be used, coupled with a microscope, to obtain a spatial map of the scattering centers in the samples obtained from their light fluctuation decay rates, but with a poor temporal resolution. Scanning laser confocal microscopy has a high spatial resolution. The image is composed of several thin sections of the sample and a 3D reconstruction of the acquisition can be obtained with image processing. However there are a lot of drawbacks, such as the photodynamic damage done to the cell, the time resolution and specific requirement for the substrate. Transmission electron microscopy can also be used. Its principle is the same as the light microscopy, but instead of using light it uses electrons which allow having a better resolution. By the analysis of the images with image processing tools one can derive the volume of the cells. However, this technology is tedious and expensive with a long and elaborate process to first prepare the samples and then analyze the images. Atomic force microscopy (AFM), relies on a probe, cantilever, scanning the xy plane of the sample and thanks to a laser hitting its back and going to a detector, we can reconstruct the sample. Any change in height or force will have an effect on the direction on the light. Even if the spatial resolution is really high (30 nm), the time resolution is really low. As it is time consuming, you can't have more than about one image each minute and it is really difficult to image more than one cell in one acquisition. Finally, the probe is in direct contact of the cell and thus might change its real behavior. Holographic microscopy measures the changes in phase of the light while passing through the samples and this information can be converted in a height profile. Even if this technique has a good time resolution as well as a great spatial resolution, one can't see inside the cells. The different peaks observable are the results of some parts of the cell on top of each other, but one does not have their representation, making it difficult to specifically measure the volume of a subpart of the cells.

In the present invention we propose an easy and reliable method of sub-cellular volume estimation. By using an object characterization process according to embodiments of the invention applied to holographic tomography, one can study the apoptotic process in a non-invasive fashion. This technology allows characterizing and visualizing the 3D structure of living cells without any stain or sample preparation, based on a measurement of a cell's physical properties, namely it's Refractive Index (RI) distribution defining different parts of the cell. The nucleus can be identified as a distinct feature of the cell and the nuclear volume can be measured and tracked using an image processing tool. The fluctuation of the nuclear volume during apoptosis can thus be tracked. In the early stages of the apoptosis, pyknosis takes place. This is the shrinking of the cell and its nucleus which is a typical phenomenon happening during apoptosis. This morphological change, amongst the others (rounding-up of the cell, retraction of the pseudopods, nuclear fragmentation, blebbing of the plasma membrane and so on), were investigated many times before with light microscopy. Apoptosis is a controlled and programmed cell death triggered when the cell is not able to adapt to a stressful environment. It can be initiated in many ways. For example one can induce with chemicals, infections, radiations or nutrient deprivation. The last option is the one chosen for the illustrated study. Finally, apoptosis is an important phenomenon for the well-being of the organism. When it is malfunctioning, it can have terrible consequences. The tissue homeostasis in adulthood is possible thanks to apoptosis, for example the regulation of blastocysts. But it also plays a role in the development phase with the suppression of the interdigital webs. Then if this phenomenon is not well regulated, problems like auto-immunity can happen. Indeed, normally there is an elimination by apoptosis of the T and B cells directed to the cells of their owner. If this is not the case, some dramatic consequences can happen. Finally, the apoptosis plays a major role in cancer formation and tumor progression. It has been showed that some oncogenic mutations target the apoptosis pathway which leads to cells dividing fast and not dying resulting in tumor initiation.

Figure 30:
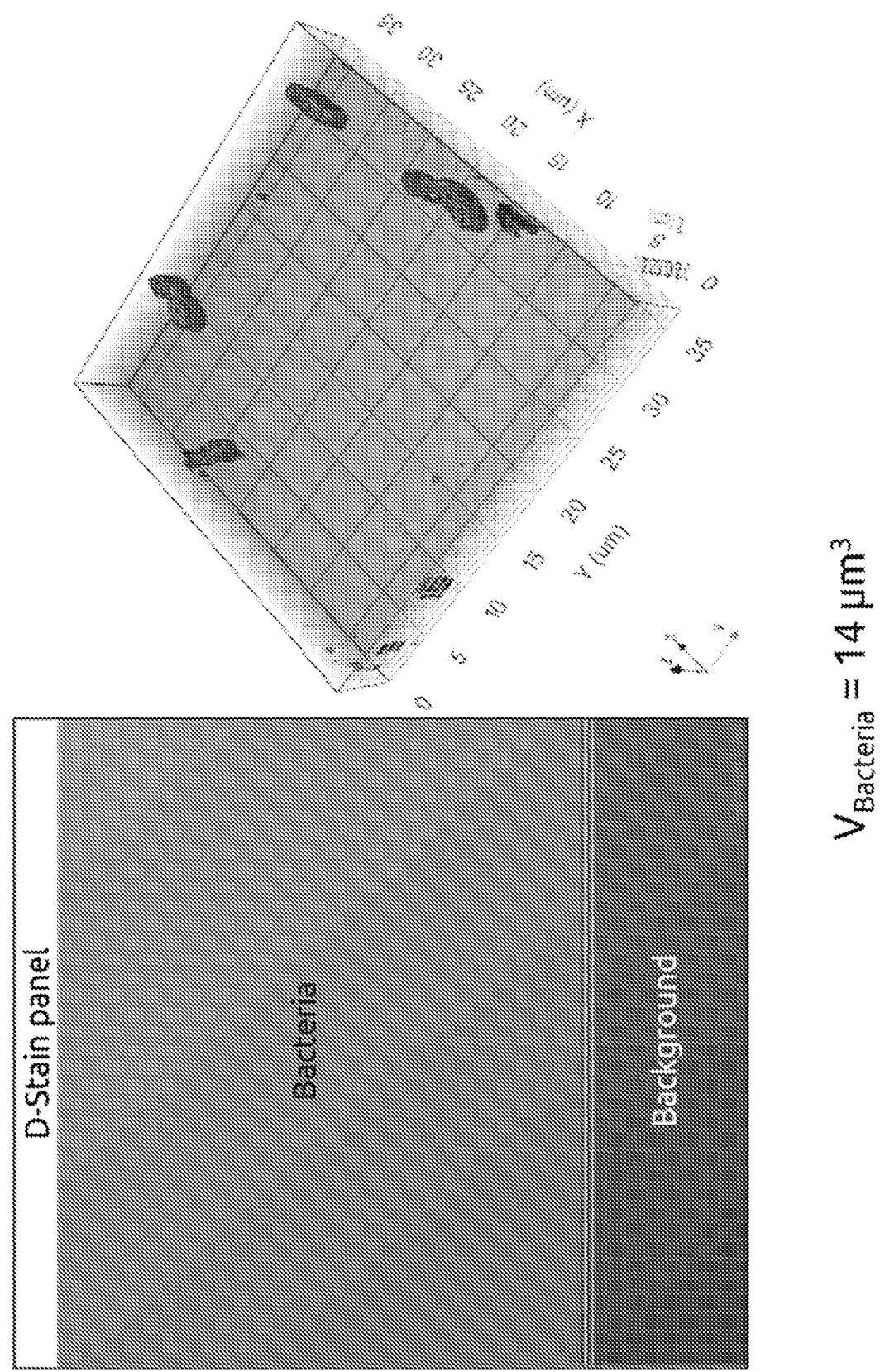
FIG. 30 illustrates a *Lactobacillus* (bacteria). The total cell volume was digitally stained in red by an object characterization program according to an embodiment of the invention. The digital stain panel is shown on the left and on the right side the 3D reconstruction of the whole cell volume. The volume of the digital stained pixels gives us the total cell volume. The total volume was following divided by four since there are four cells in the field of view.

The object characterization process according to embodiments of the invention allows for direct volume measurements of biological samples, for instance bacteria, such as shown in FIG. 30. The present invention may advantageously be used to monitor in real-time the cell volume in a precise and quantitative way.

Based on a 4D RI acquisition, the object characterization process can be used to detect specific cell parts such as the nucleus of the cells. The digital staining is done post-acquisition and allows to discriminate the different components of the cell (i.e. the nucleus) based on two or more RI based values, including for instance RI values and transformed RI values such as RI gradient values.

The digital staining panel presented on a GUI for the user to visualize and work upon is an important feature of the invention for effective characterization and visualization of data acquired on a microscopic object by digitally staining features of the object (cf. FIG. 2). It allows for instance to define a region in a 2D space defined by parameters such as the refractive index on the x axis and the gradient norm of the refractive index, that represents its spatial variation, on the on the y axis. Parameter ranges corresponding to features of the object are displayed as colored rectangular areas in the digital staining panel and can be modified by the user. Changes to parameter ranges may be shown in real time in 2D and 3D.

In an embodiment of this invention the parameter range definition can be performed interactively, including an automatic definition of the corresponding parameter region in the digital staining panel. This enables stains to be defined on regions with similar structural characteristics. Only the voxels with those specific physical characteristics are automatically segmented. To measure the volume a simple integration over volume of the stained voxels is sufficient.

Figure 25:
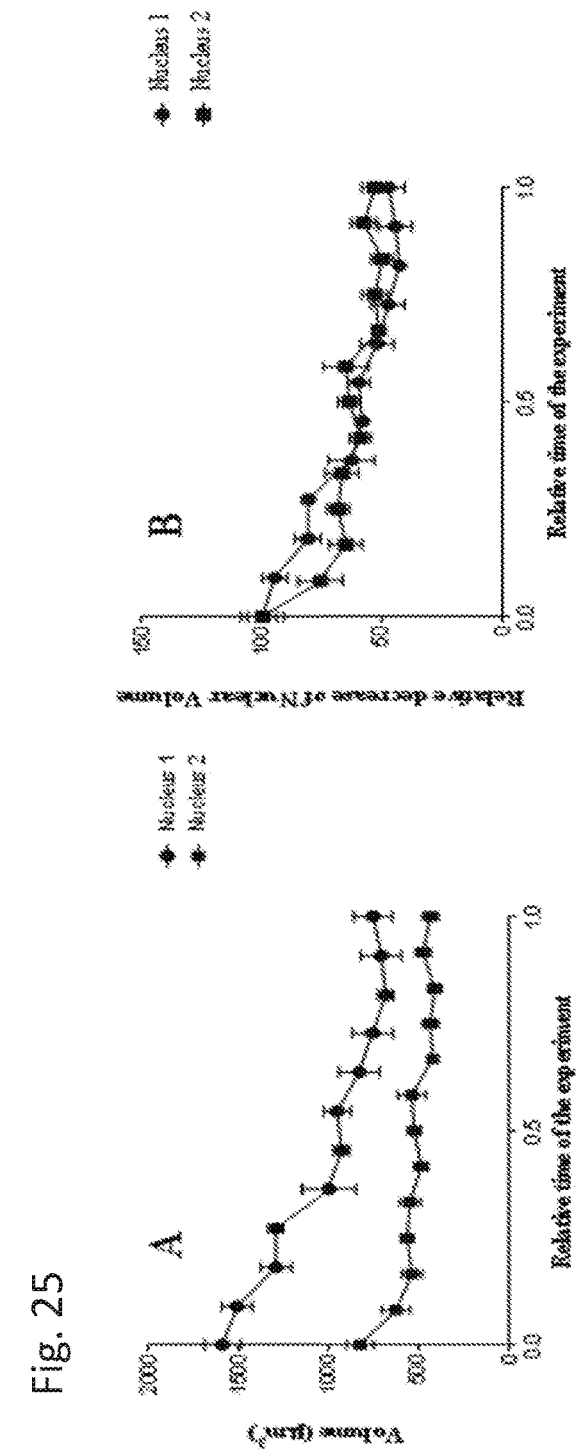
FIG. 25 illustrates graphs of cell nucleus volume changes. (A) This graph shows the evolution of the nuclear volume for each cell at any time point of the experiment. The time is normalized but the volume is not, we see that cells can start with a drastic different value of volume, so we need to normalize the date if a comparative evaluation has to be done. (B) This graph shows the relative decrease of the nuclear volume over the time of the experiment. The volume was normalized by taking the first value at time t0 as 100%.
Figure 24:
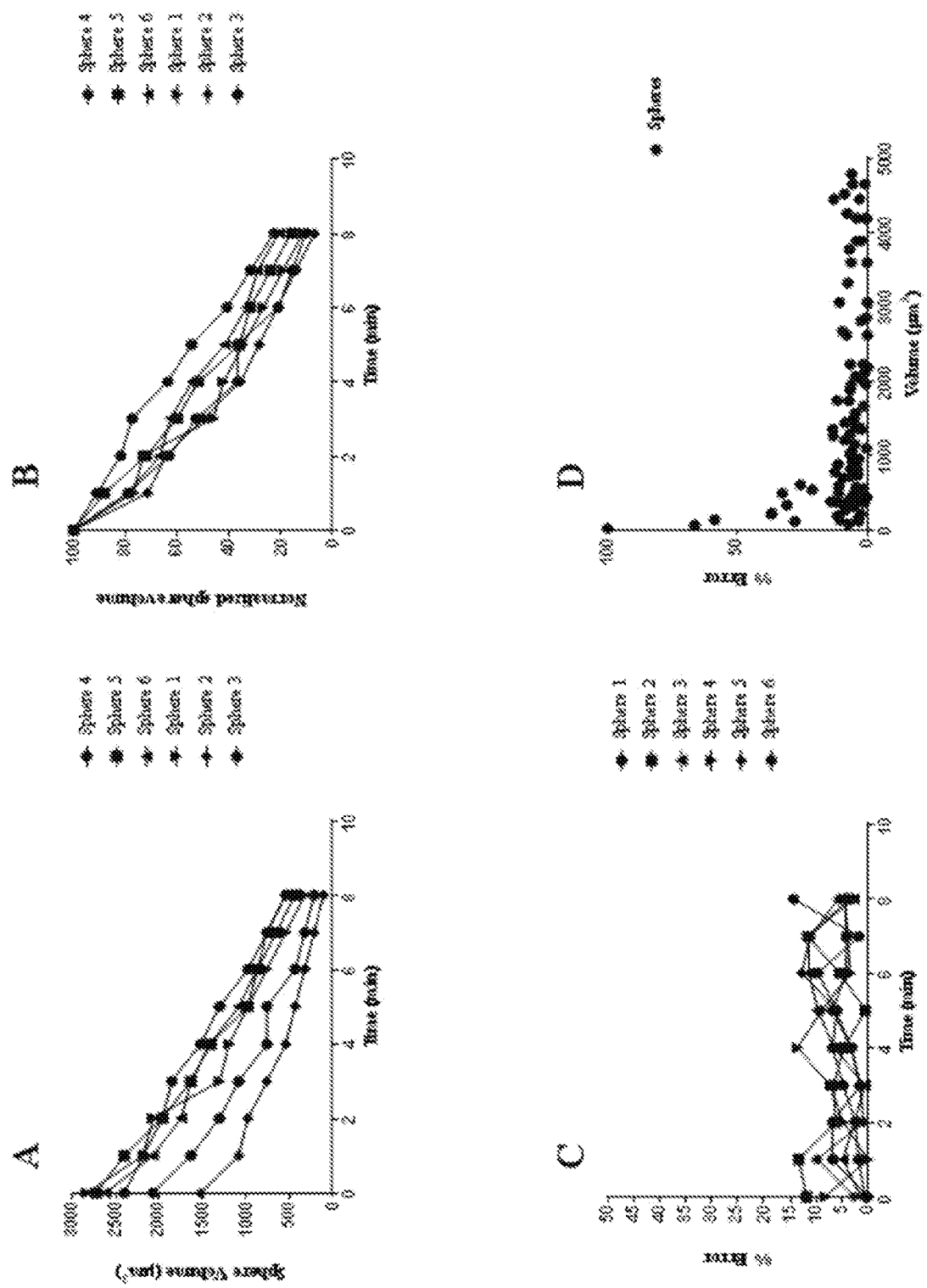
FIG. 24 illustrates protocol validation graphs. (A) Evolution of the sphere's volume during a period of 8 minutes, the decrease is linear and every sphere has the same behavior. (B) Normalization of the previous graph. The volume at time t0 is taken as 100%, we can see that every sphere reaches approximately 20% of the starting volume at the end of the 8 minutes. (C) Determination of the error done at each time point for every sphere. It stays constant over time and stays around 5% for each sphere. (D) Relation between the errors committed with the developed protocol and the total volume of the cellular part. When the volumes become too small (<500 µm$^3$) the precision of the technique decreases.

The accuracy of object characterization methods according to embodiments of the invention have been determined through the use of a reference: six spheres with a known volume were imaged cf. FIG. 24. The volume of the spheres was measured for 8 minutes and a (expected) decay over time was observed (FIG. 25). A frame every minute was extracted and, using the 2D diameter of the spheres at each time point was measured. This allows calculating their total volume assuming they were perfectly shaped. Then, following the abovementioned object characterization process voxel integration, the volume is measured. These data were then compared with the theoretical predictions (FIG. 25). The results show that the mean error value obtained with our method was $\sim \pm 5.76\%$. Moreover the method remains very accurate until very small volumes (>500 um2) as shown, where is reported the correlation between the relative error and the computed volume. These results demonstrate that an object characterization process according to the present invention is capable of precise volume monitoring of sub-cellular components over time and in a totally non-invasive fashion.

Cell's Nuclear Volume

Figure 26:
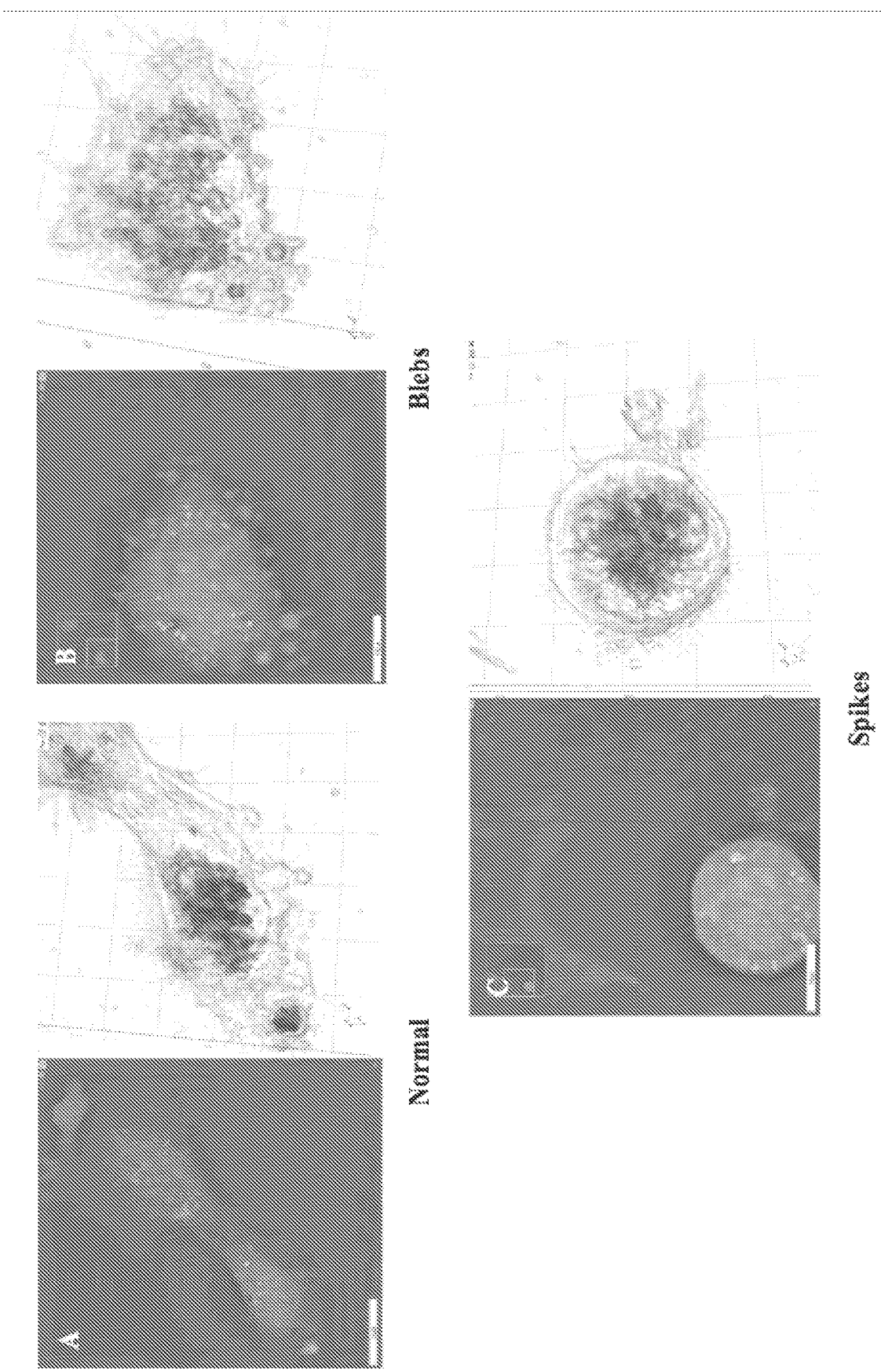
FIG. 26 illustrates images of the apoptosis process generated by an object characterization program in a computer system according to an embodiment of the invention. On each panel one can see the 2D map representation of the different refractive index of the cell. On the right panel is the 3D holographic representation of the cell stained digitally. Each color represents one range of refractive index. (A) Here is represented the morphological aspect of the normal cell in the first place. (B) Blebbing is occurring and the cell is starting to lose volume, the nucleus is still quite untouched. (C) In this view one can see the spikes and that the nucleus condensed and shrank. This is just preceding the later stages of apoptosis where the nucleus is dislocating in more pieces. The scales bar are illustrates a (A) 20 µm for the 2D view. (B) 10 µm (C) 10 µm.

Multiple FRCs dishes were analyzed. Thus, to compare the different cells, a normalization of the data was necessary. First, the apoptosis time frame cell was different for each cell and the cell volumes were also different. Therefore, the time was normalized by taking the last time point (when the cell was already dead) as 100%, whereas the volumes were normalized by taking as 100% the first value of measurement (when the cell was alive and healthy). This allowed extracting the relative volume change for each acquisition. Finally, just specific time points were chosen for the analysis. It was chosen in order to have the same amount of point of interest for each experiment On the 3 cells observed a general emerging trend as illustrated in FIG. 25 is observed. A decrease of the 50% in nuclear volume is observed for all cells. Moreover, all the characteristic morphological changes proper of apoptosis are observable to confirm that a good time range was chosen. FIG. 26 shows different morphology images corresponding to specific phases of the process.

As known, the apoptotic nucleus is not only condensing but is also shrinking before breaking apart. After this step two other steps follow: i) nuclear fragmentation ii) the cell breaking apart into apoptotic bodies. Moreover, the dynamics of the phenomenon are similar among the different cells. Since no treatment of the cells was applied to force the trigger of apoptosis the culture conditions were representative of any cell culture growing in the optimal conditions. This proves that apoptosis is a homeostatic process occurring normally in the cells to maintain the overall well-being of the system.

The present invention provides an easy and effective way of tracking a cell's volume over time using a method of characterization and visualization of complex refractive index distribution measured by a microscope without using markers or manipulation of the cells (no sample preparation is used). This implies no pathways or structures inside the cell are perturbed.

Moreover, on contrary to certain techniques as AFM or SLM, the hardware does not touch the cells during the measurement process, which could also alter their behavior.

Example: Automated Cell Segmentation

Figure 29:
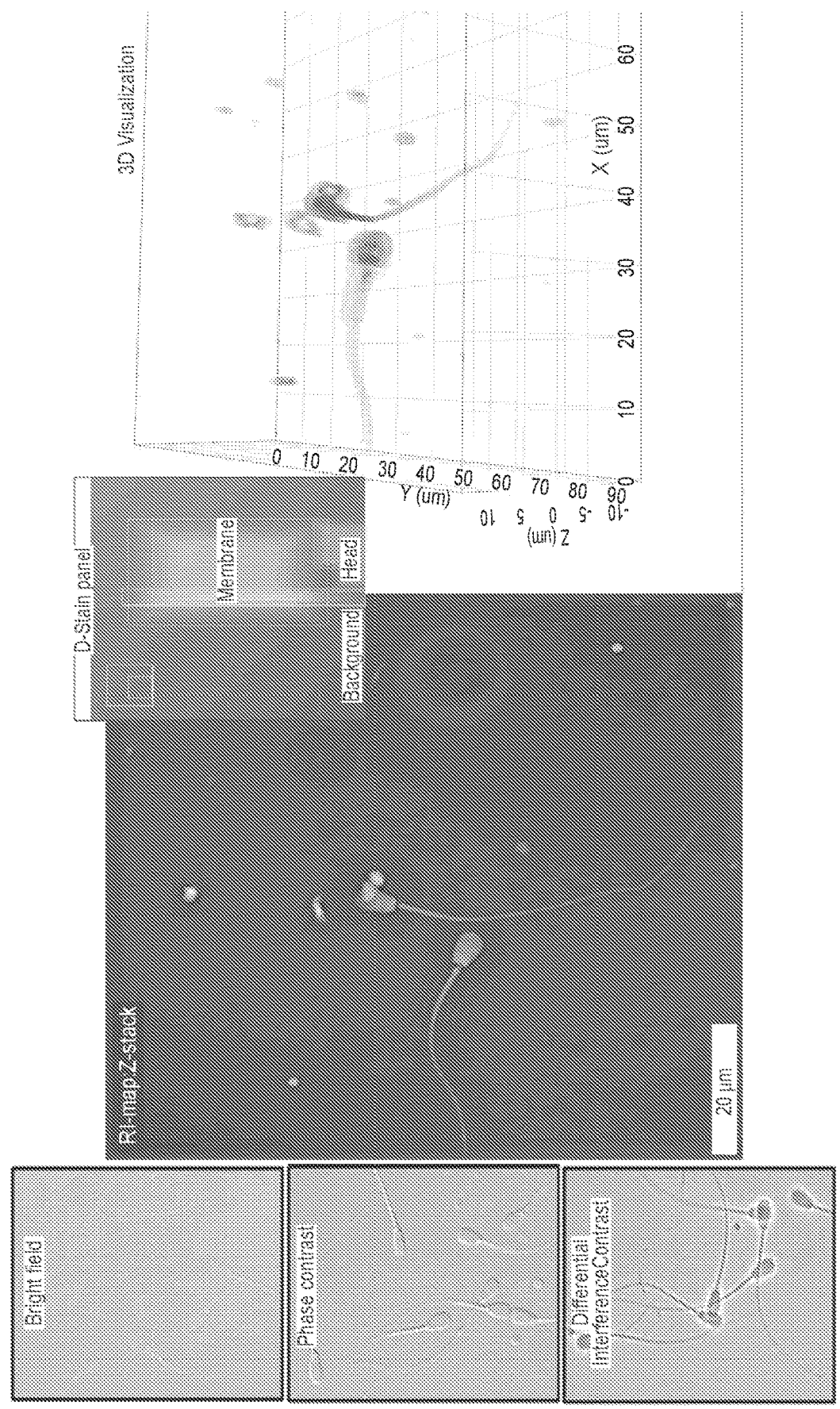
FIG. 29 illustrates on the left side a human sperm cell imaged by phase contrast, in the middle an RI distribution as input data (data acquired from a microscope), and on the right side a 3D visualization of the sperm cells generated by an object characterization program according to an embodiment of the invention using the input data.

Likewise, a method of characterization of a microscopic object according to embodiments of the invention may be used to assess reproductive health, whereby the evaluation of the structural and functional integrity of spermatozoa is of key importance. Besides human medical fertility applications, this holds true also for the breeding industry. Different animal spermatozoa can be imaged for this purpose. The obtained 3D images digitally stained based on their RI are illustrated in FIG. 29. The digital staining panel shows the different transformed RI ranges that are representative of different specific cell features.

Methods of characterization of a microscopic object according to embodiments of the invention are advantageously capable of investigating in a quantitative and reliable way the composition and morphology of sperm cells in real-time, without altering their physiological characteristics (no chemical staining), and automatized cell segmentation.

Example: Cancer Marker

A typical cancerous tumor contains millions or even billions of cells harbouring genetic mutations which drive them to grow, divide, and invade the tissue in which they are embedded. However, as the cells proliferate, they don't all remain in the neighbourhood. Some cells escape off the edges of a tumor and are swept away by the bloodstream or lymphatic system. These cells take the name of Circulating Tumor Cells (CTCs) and may colonize distant sites to form metastases.

A sensitive and reliable detection and enumeration of cancer cells in blood could provide a powerful diagnostic tool for early detection of tumor invasion and early assessment of treatment efficacy.

However CTCs are:
1. Very heterogeneous: they may significantly vary from each other in size, shape, and immunophenotyping profile.
2. Fragile: they may be damaged and fragmented during the standard multi-step preparation processes, with consequent inaccurate detection and misinterpretation.

Figure 27:
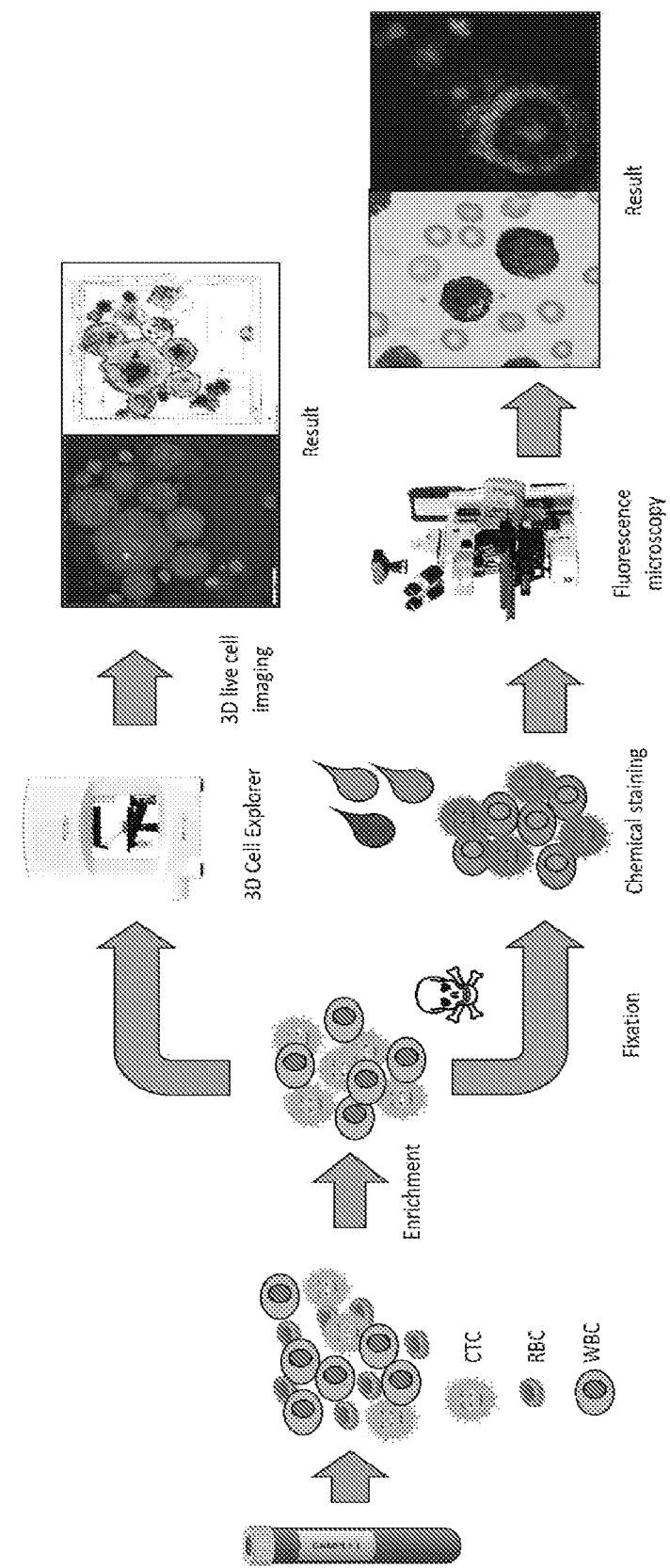
FIG. 27 illustrates a CTCs extraction, enrichment and analysis obtained with a microscope as described in EP2998776 (upper branch) as opposed to traditional fluorescence microscopy (lower branch)
Figure 28:
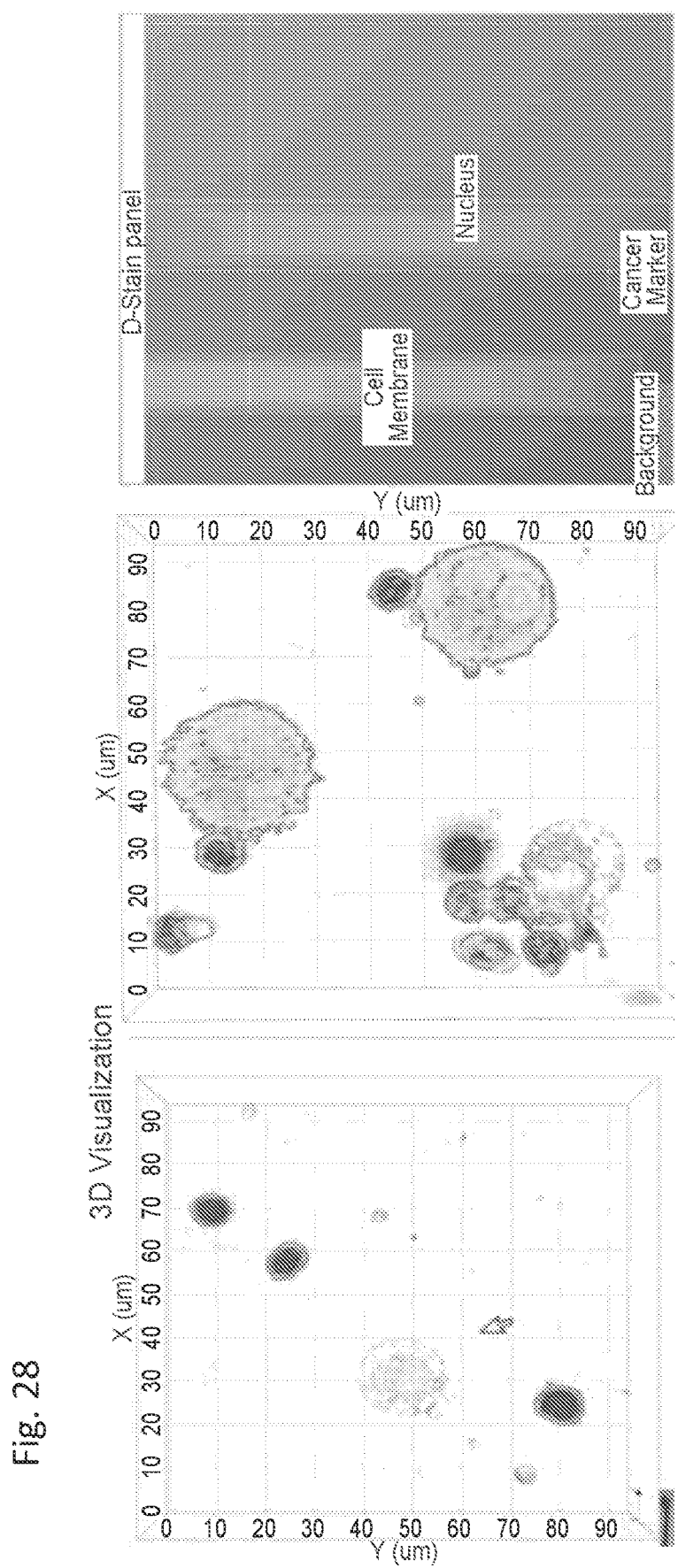
FIG. 28 illustrates an example of an object characterization process according to an embodiment of the invention for automatic cancerous cell detection.

Certain microscopy techniques require the sample to be fixed and stained leading to a lower sample quality and increased risk of false results (FIG. 27 CTCs extraction enrichment and analysis obtained with a microscope according to EP2998776 (upper branch) as opposed to fluorescence microscopy (lower branch). Object characterization processes according to the present invention may advantageously be used in conjunction with marker free microscopy in detecting and analyzing CTCs. Digital staining of the cell compartments based on their specific Refractive Index (RI) enables identification and analysis of CTCs A549 morphological features cf. FIG. 28). In this example a whole blood sample after enrichment is analyzed in order to show demonstrate how to distinguish CTCs from all other normal Blood Cells based on digital Stains.

On the image one can observe a few actors:
A549 (Red arrows): characterized by big round shape cells (diameter>20 microns) they are generally multinucleated (2-3 nuclei). Peripheral Blood Mononuclear Cells (PBMCs): they can be of two different types: round & flat shape and attached to the bottom of the dish (around 15 micron of diameter, Green arrows) or small floating spherical cells (less than 10 micron diameter), characterized by very high and homogeneous RI typical of nuclear region (Blue arrows). They possess only one and well defined nucleus.

Example: Cell Behavior Prediction

Characterisation of RI behaviour as a function of time allows monitoring the cellular thickness during the different mitotic phases. To this aim, one can identify the specific RI range corresponding to cell membrane and nucleic acid and define them as parameters for the object characterization method.

Figure 31:
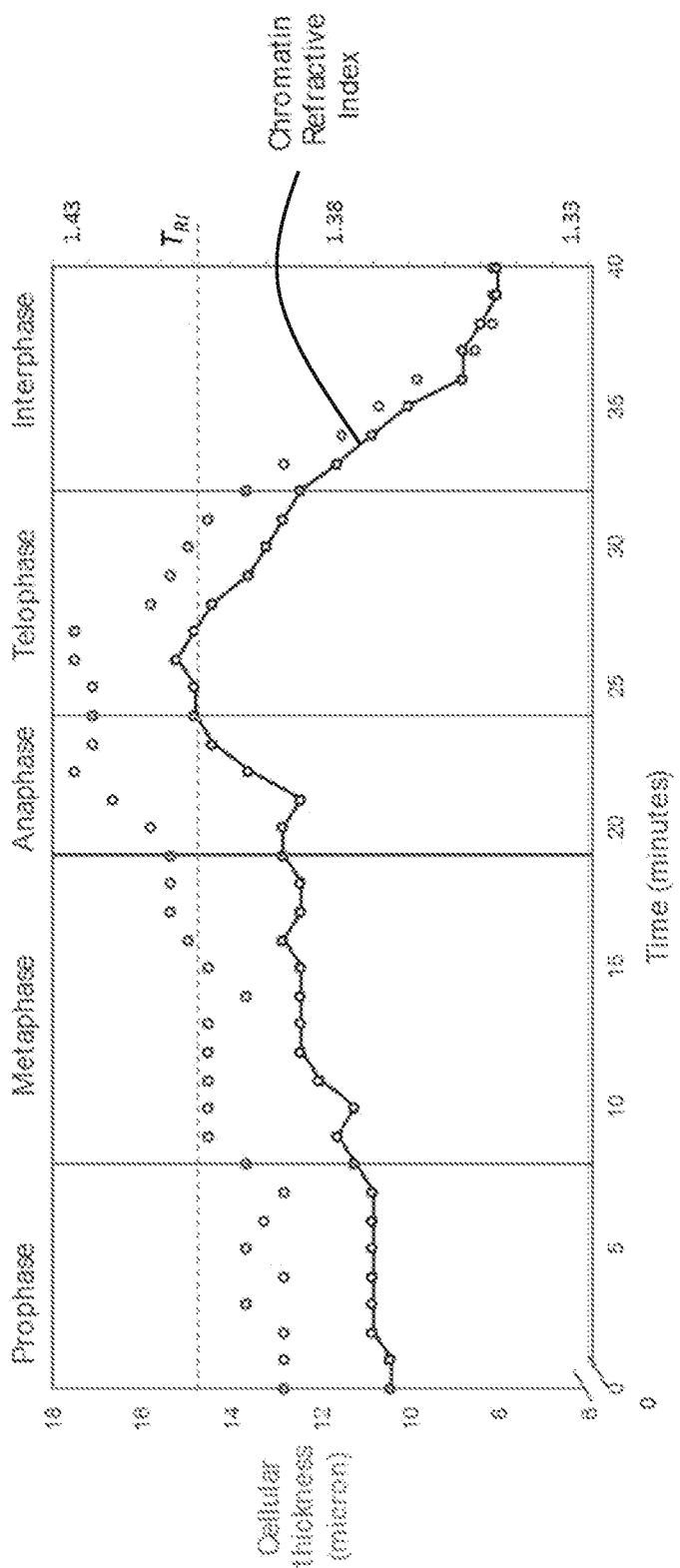
FIG. 31 illustrates a graph of cellular thickness, and refractive index, as a function of time, for early indication of cell mitosis.

In the FIG. 31, the mitotic cell from prophase is represented in terms of cell thickness and its associated RI. The cell gets progressively rounder and thicker during the first mitotic phases, reaching a peak during the transition between the Anaphase and Telophase. After that, in correspondence with the segregation of the genetic material and the final cytokinesis one witnesses a rapid decrease in cellular thickness to a new minimum level corresponding to the new interphase.

Using the object characterization program according to an embodiment of the invention, one may characterize a typical RI increase during meta- and anaphase and accordingly define a threshold $T_{RI}$ related to the RI so to predict the occurrence of Mitosis.

Example: Automated Cell Organelle Detection

The present invention also allows for individual marking of cell parts, called organelles. This example demonstrates a correlative feature characterization approach for mitochondria detection. In a recent publication, Haseda, Keisuke, et al. (2015) were able to determine the refractive index of an isolated mitochondria using retardation-modulated differential interference contrast microscopy with a precision of ±0.01. The refractive index measurement of subcellular components gives information about the structures and the functions of cells. This value could be useful to detect mitochondria in a complex cell structure. Other publications have also determined the refractive index of different subcellular structures: the nucleus (~1.39) by R. Barer, S. Joseph (1954), the cytoplasm (~1.35-1.38) studied by F. Lanni et al. (1985) and J. Beuthan et al. (1996) Based on these results, totally automatic non-invasive detection and segmentation of the different subcellular structures is possible by an object characterization process according to the present invention in absolute terms.

Figure 32:
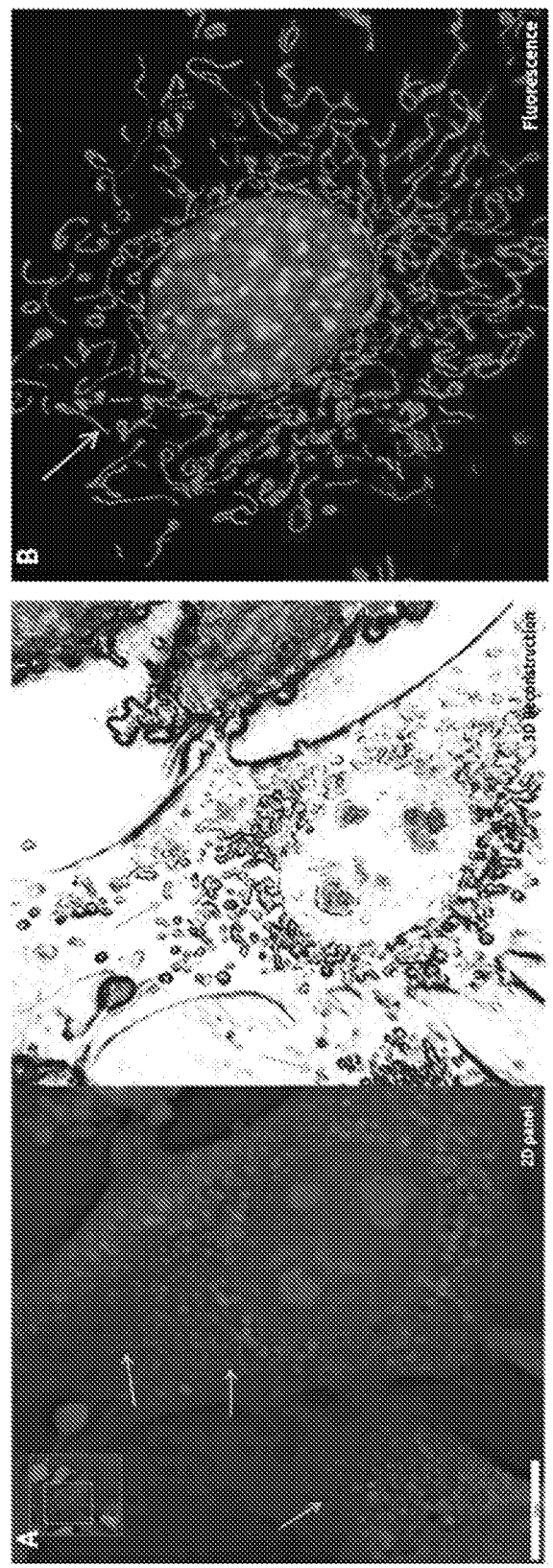
FIG. 32 illustrates a comparison between a brown fat cell (left panel A) and an embryonic mouse fibroblast cell treated with dies (right panel B), both acquired using a microscope as described in EP2998776. On the left panel the input measured refractive index distribution within the cells is displayed while on the middle panel a 3D reconstruction of the fat cell generated by an object characterization program according to an embodiment of the invention is shown. The mitochondria are digitally stained with red and the nucleus in blue. The mitochondria are indicated by the arrows in the left panel. In both type of cells, we recognize the particular shape of the mitochondria assembling together in a filamentous shape.
Figure 33:
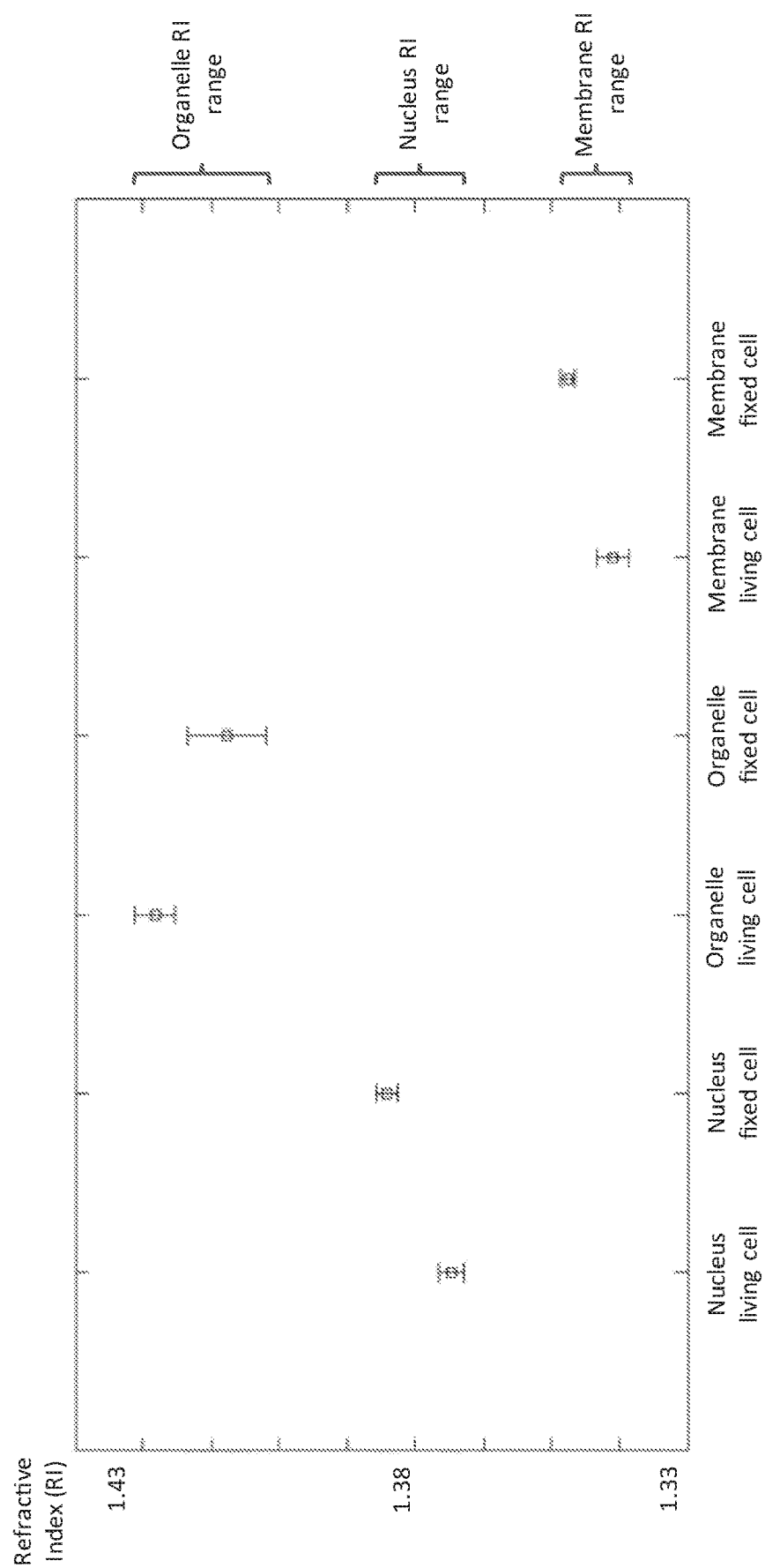
FIG. 33 illustrates graphically a comparison of the RI between living cells (n=7) and fixed cells (n=8) for three different structures: plasma membrane, nucleus and organelles.
Figure 34:
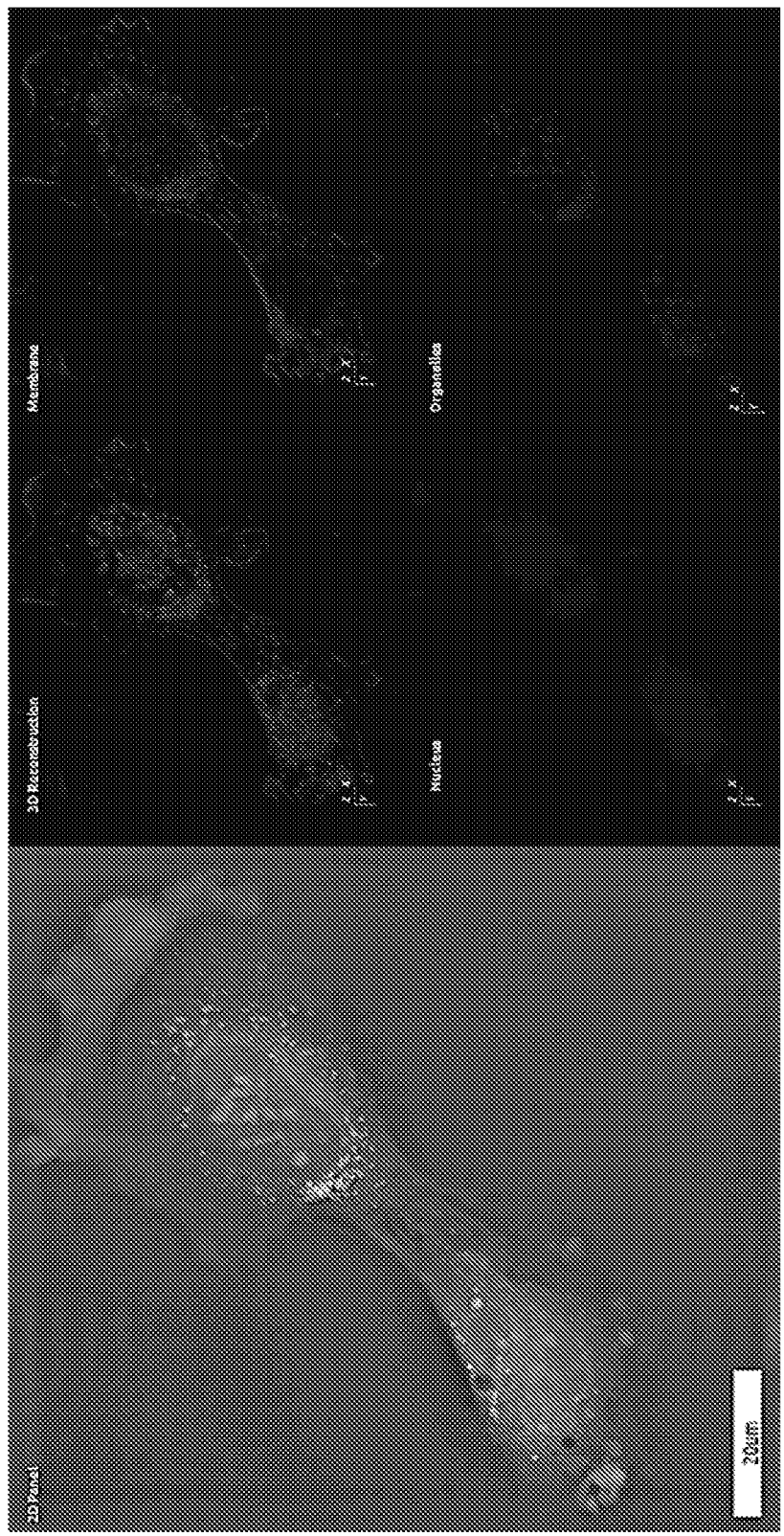
FIG. 34 illustrates a live fibroblastic reticular cell. On the left panel, the refractive index distribution (corresponding to the input data) within the cells is displayed while on the right panel a 3D reconstruction generated by an object characterization program according to an embodiment of the invention is shown. The nucleus is digitally stained with blue, the organelles with red and the plasma membrane is green.

On FIG. 32 are shown cell images with distinguishable mitochondria assembly. One can identify for each structure a specific RI range which is slightly different for the two conditions (<0.001). One can conclude that it is possible to identify a RI range proper of each cellular sub-structure allowing the definition of special stains common to both living and fixed cells. FIG. 33 shows the digital staining obtained. The results obtained in this study confirm that different cell structures correspond to a specific RI range independently from fixation. This bio-physiological observation allows quantifying features of a biological specimen and referencing in a database to feature datasets characterizing said features.

Network Computing System Extensions for Fully Automated Feature Characterization of Microscopic Objects The methods and systems according to the present invention will enable a microscope as described in EP2998776 to become a network computing system microscope allowing a user to benefit from shared knowledge and network computing system services. Basic services as storing and sharing should be available at the launch of the User system's network computing system, follow up by data analysis services. The microscope status can be shared and known, in order to propose the best microscope calibration and to have a fast and reliable assistance. Custom made analysis and data interpretation via statistical models can be added to the network computing system.

Services for Feature Characterization of Microscopic Objects a. Automated proposal of feature characterization based on user annotation b. Cell recognition based on expert's feature characterization of microscopic objects Data Interpretation Services a. Critical parameter analysis with user feedback b. Non-rigid learning via neuronal networks c. 4D shape recognition Cell events/development prediction Automated pathologies recognition Searching services on a complete index of refraction library Example of Network Computing System Services Advantage The present invention in conjunction with network computing system services can improve the life of millions of people. Let's consider an In Vitro Fertilization (IVF) example. Nowadays, the fertilization relies on the choice of a sperm cell by a medical doctor. The doctor makes a visual inspection of a 2D image without any quantitative information and picks one spermatozoid (see FIG. 28). This procedure may be improved employing methods and systems according to the present invention, as described below.

A microscope as described in EP2998776 can see the sperm cells in 3D without harming them (FIG. 29), and so, the practitioner could take a more reliable decision by profiting from the supplementary dimension. Also, after each network computing system step implementation (see the section above), the IVF decision making process will be improved:

After the 1st step: The practitioner could learn from the data shared by his peers and also he could share his experience. He could check the annotations made by his peers and also the success of the IVF procedure for the chosen sperm cell.

After the 2nd step: A system according to the present invention will enhance the visualization of sperm cell by providing the best digital stains of selected features. In addition, it will compute and present to the doctor relevant information, like volume, membrane integrity, motility, etc.

After the 3rd step: Based on statistical and data analysis, the network computing system will recommend to the doctor which sperm cell is more likely to give the desired result. To improve our system, the feedback from the practitioner on the success of the procedure will be still very valuable.

After the 4th step: The ultimate goal is to create an automated system, validated by the medical community, for choosing the best sperm cell for the IVF procedure.

Digital Gating

Possible integration approaches in object characterization taking into account the information provided in FIG. 35:
Example: Cell line (CL) 1 Malaria, CL2 no Malaria
User scenario 1 (analysis using a program according to the invention)
1) 1 acquisition including several cells of CL 1 and CL2 in the field of view
2) User selections Malaria infected cells (or parts) in 'Brush over Memory' mode i.e. collection of 2D RI/gradientRI Histogram collection
3) Based on this selection a specific (e.g. polygon Digital stain) point network computing system is selected
User scenario 2 (Network computing system analysis)
1) 20 acquisition of CL 1 (10× only these cells) and CL2 (10× only these cells)
2) Optional: User selections Malaria infected cells (or parts) in 'Brush over Memory' mode i.e. collection of 2D RI/gradientRI Histogram collection
3) 2D RI/gradientRI Histogram point network computing system are output from a program according to the invention
4) Based on this selection or CL 1&2 2D RI/gradientRI Histogram point network computing system superposition a specific (e.g. polygon Digital stain) point network computing system is selected (D-Gating)

Calibration of Digital Stains

FIG. 9b Digital stains calibrated by external input:
External feedbacks ΣX
 Quantitative data of
 ΣC database of segmented data
 ΣM database of measurements
 ΣO database of stains
  e.g. STD(ΣO) gives trust in stain
 Calibration through
  Results of procedure (e.g. cell survival)
  Deep learning, critical parameter analysis, non-rigid error analysis
 Comparison with other technologies
  Chemical analysis
  Parallel/sequential staining
  High-imaging technologies (eg SEM)

Types of External Inputs
 Low resolution (LR): 4DRI from user C
 High resolution (HR):
  1. Quantitative cell library (QCL) database
  2. High-resolution images (e.g. AFM, STORM)
  3. Model-based Cell (cell simulations)
 Different images have same quantitative data+different noise (imaging condition)
 PCA (principal component analysis) for 4d quantitative RI data (4DRI)
  1. 'Eigencell' modes
  2. Additional regularization when insufficient observation available
  3. Prior knowledge: physics of cell, meta-data of cells (e.g. cell type, phase, . . . )
Model Parameters
 Supervised learning: Prior knowledge or PCA based on metadata from user
 Unsupervised learning: Prior knowledge or PCA based QCL comparison
Improved Optical Specimen Resolution
 FIG. 9c Digital stains improved by reference objects:
 C: voxel based result
 V: vector based reconstruction (surfaces beyond low-pass filtered frequencies of C)
 R: Reference object
  geometrical objects (spheres)
  calibrated objects (e.g. sem tomograms of organelles)
  physical constrains (connected membrane)
 Feedback O
  contains learning from f-parameters, e.g.
  iterations trends, distributions
Cell Fate Prediction
 FIG. 9d Digital stains for predicting cell behavior:
 C: Time series of segmented measurements
 P: predictions, recognition (e.g. sub-resolution elements)
 R: Reference of time series
  time shifts of stains>cell death
  enclosures of viruses>characteristic RI incensements
  computer models of cells (simulations)
 Feedback
  time dependences of O, e.g. delta (stain of nucleus)
  PCA (principal component analysis, e.g.
  surface roughness (stain of membrane)

As mentioned hereinabove, according to a particularly advantageous aspect of the invention, the object characterization program is configured to receive feedback data through a feedback loop 12. Referring now to FIGS. 36-52, feedback data may advantageously comprise input from a measurement of a chemically stained biological specimen performed by the microscope 4, for instance using fluorescence microscopy. The chemical staining feedback data can be considered as reference data serving to define a correlation between the measured data and the reference data. The accuracy of characterization of a feature of a biological specimen can then be improved by adjusting the ranges of the values of the parameters obtained from the transformation of measured data, in order to maximize the correlation.

This optimization problem allows hence to define a cost-function which needs to be optimized, typically in an iterative approach which can be supervised or unsupervised. Likewise, the external input of the reference data gained from the chemical stained could be also used as ground truth in machine learning approaches.

Hence, the external feedback of chemically stained data can be considered as reference data (sometimes also called ground truth), which serves to define a correlation between the measured data and the reference data.

A correlation function R can be for instance defined as the overlay between the chemical stained cell measurement 2D/3D/4D (external input X(cs) as defined in FIG. 9b) and the digital stained measurement 2D/3D/4D, called C(t). In an optimization approach, this correlation function $$R=\text{corr}(C(t),X(cs))$$ Equation 13:

can be maximized to achieve the best possible overlay, hence the best calibration of the digital stain through the chemical stain as external input. The accuracy of characterization of a feature can then be improved by adjusting the ranges of the values of the parameters obtained from the transformation of measured data, in order to maximize Equation 13.

Figure 36:
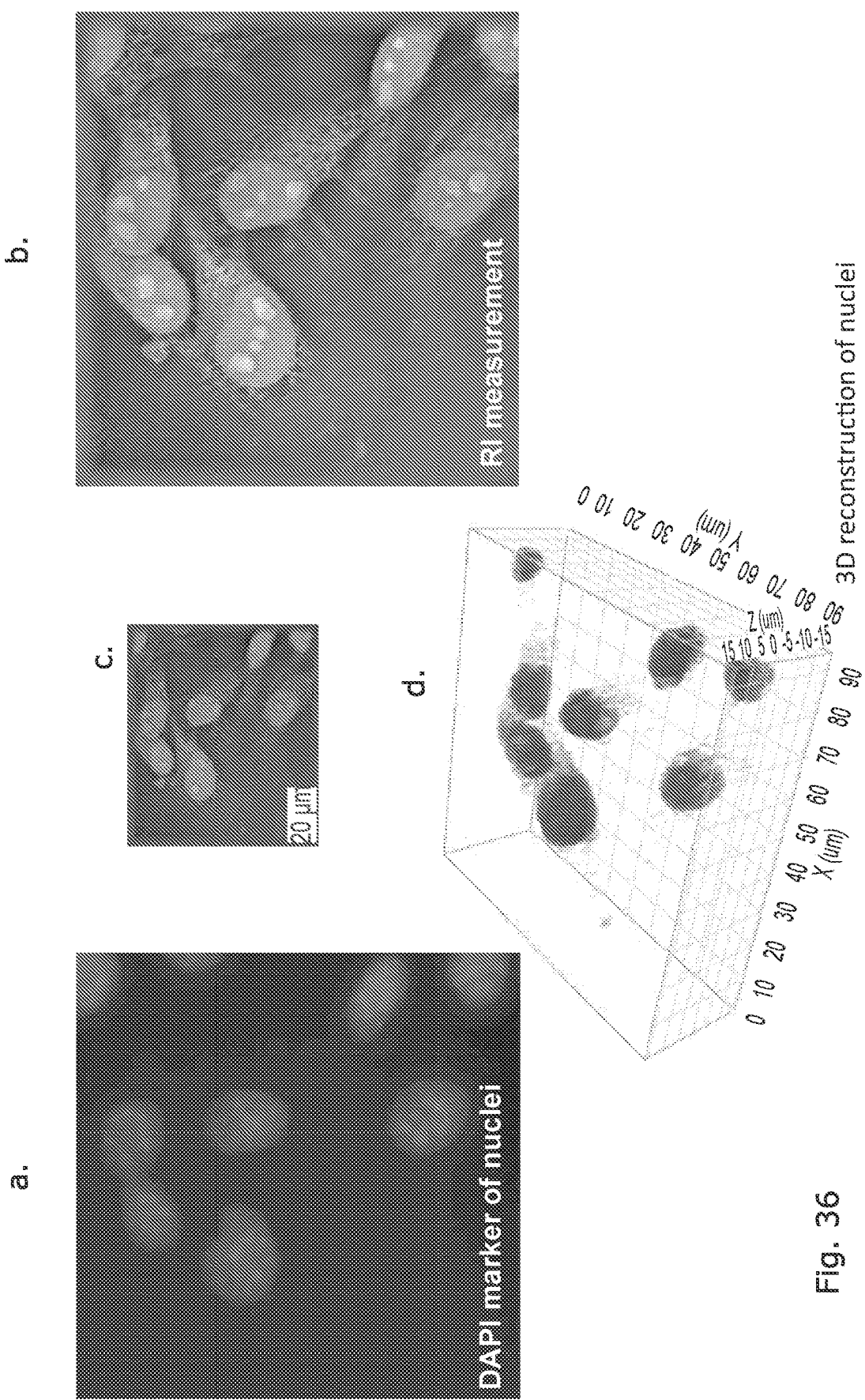

As a simple example of this general approach, we can consider FIG. 36 where the external input X(cs), composed by 2D chemical stain measurement (DAPI specifically binding to the biological feature of nucleus), is used to calibrate a digital Stain (characterized by parameter set t) which allows for the segmentation of the nucleus in the 3D RI measurement M. In this case the cost function can be defined as a minimization problem of overlaying surfaces (i.e. sums of segmented pixels), such as $$\|\Sigma C_{2D}(t)-\Sigma X_{2D}(cs)\|\le\delta$$ Equation 14:

where $\delta$ is a defined threshold or precision. According to Equation 11, the optimal parameter set t can be found by iterations of $$\|\Sigma C_{2D}(t+1)-\Sigma X_{2D}(cs)\|\le\|\Sigma C_{2D}(t)-\Sigma X_{2D}(cs)\|$$ Equation 15:

through abovementioned optimization algorithms (unsupervised) or the user's feedback (supervised).

In this case, Equation 15 is defined is such a way as is minimizes the difference in expected output X(cs) and the actual achieved output C(t) as defined by the filter parameters f(t). This process would for instance result in C(t) as the estimated feature (e.g. nucleus) which is limited to the given N-dimensional space and transformations which parametrize the D-Stains and limited to the N-dimensional (e.g. 2D or 3D) of the reference data.

In a preferred embodiment, a ground-truth correlation (obtained for instance through X(cs)) can be performed to increase reliability of generated object characterization results.

Such a feedback loop improves the accuracy of identifying and characterizing features (for instance organelles) of a microscopic biological specimen (for instance a eukaryotic cell).

In an embodiment, the feed-back data may be obtained by chemically staining the biological specimens of interest and using a microscope according to the invention, obtaining both the two dimensional fluorescence image and simultaneously performing a refractive index measurement (RI acquisition) so as to reconstruct a three dimensional image of the biological specimen. The acquisition of the fluorescence image generated by the chemically staining the biological specimen may be combined (for instance overlaying partially or completely) with the image constructed from the RI acquisition in order to enhance, improve and calibrate features revealed by fluorescence imaging. This improves the digital characterization of the biological specimen initially characterized by a refractive index measurement.

Referring first to FIGS. 37-41, examples of digital staining of a biological specimen are illustrated.

Figure 37:
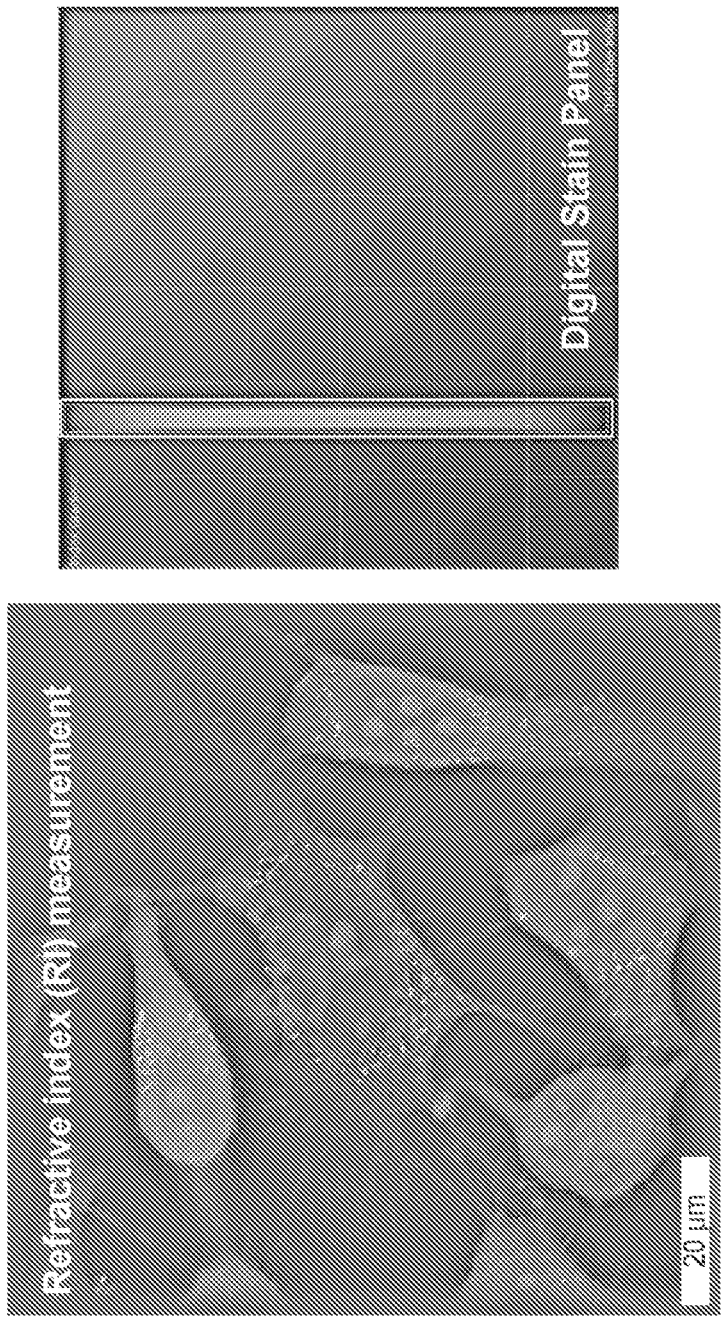

First, as illustrated in FIG. 37, an acquisition of the refractive index of the biological specimen is performed using the microscope and an initial approximation ("blind guess") of a possible digital stain is selected (from previous stored data, or by selection by the user) in order to perform an approximation of the digital stain specific of the cell plasma membrane.

Figure 38:
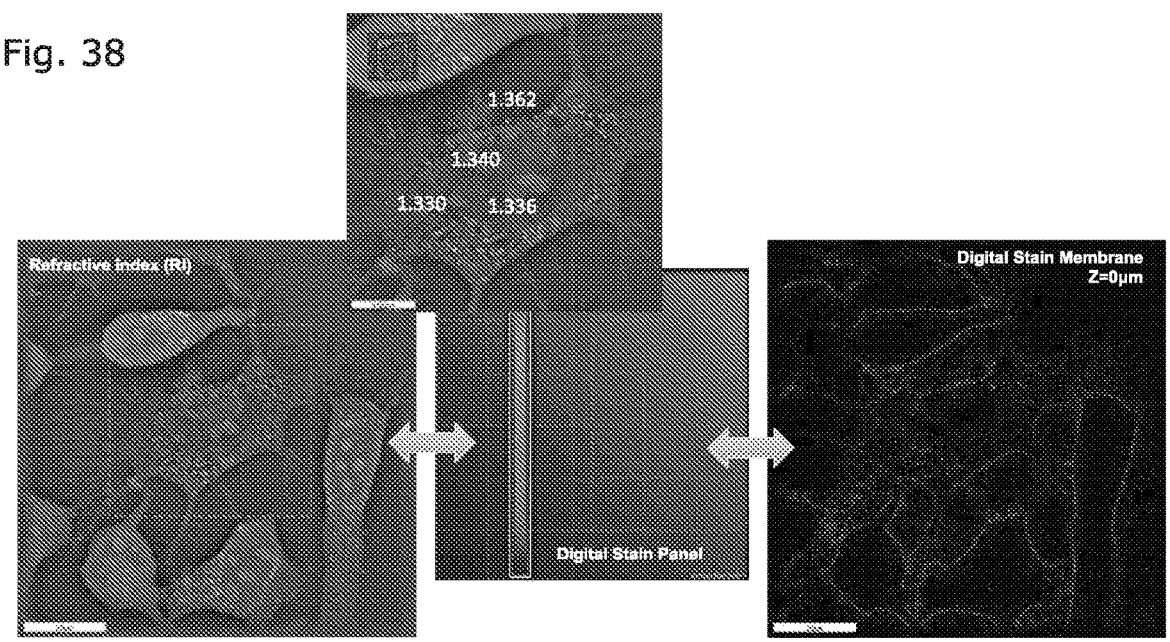

FIG. 38 illustrates the digital stain of the membrane using this initial approximation. This approximation is based on quantitative RI values where different cell compartments have different refractive index signatures. Using these signatures to define the parameter sets of t, the D-stained segmented volume (right panel 'Digital Stain Membrane') can be calculated.

Figure 39:
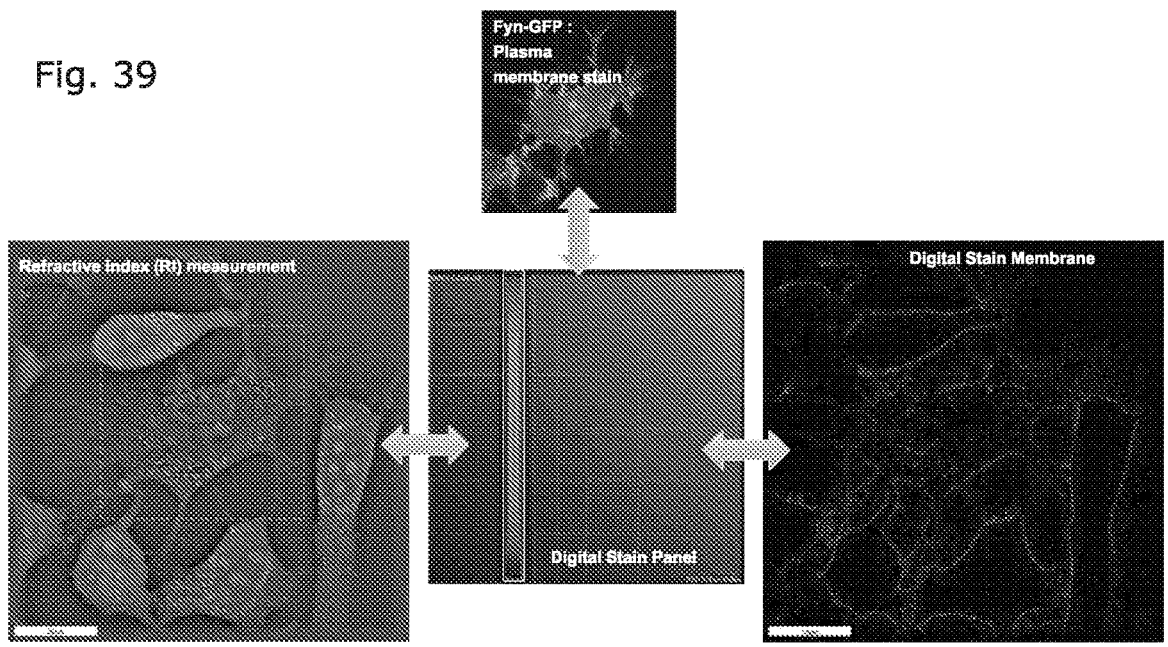
Figure 40:
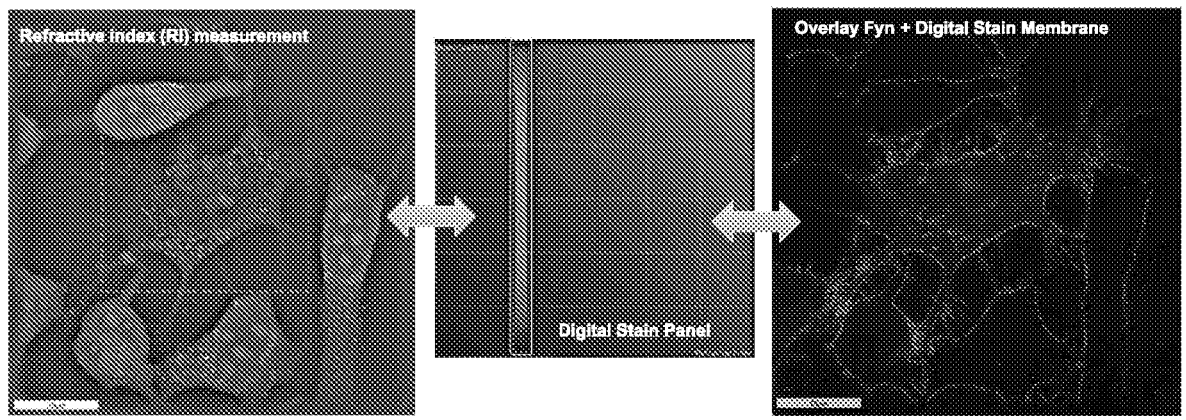

As illustrated in FIG. 39, using data from the fluorescence image of the chemically stained plasma membrane (in this case using FYN-GFP marker obtained through Epi-fluorescence measurements of the identical microscopic object), this reference data from the fluorescence acquisition can be added to the digital stain by way of overlaying the image data in order to redefine the digital stain and optimize it as illustrated in FIG. 40 (right panel 'Overlay Fyn—Digital Stain Membrane). The supervised optimization through real-time feedback of the D-stain is made through a graphical user interface tool by the user who can thus adjust and refine the segmentation process by shrinking or stretching the digital stain edges to include or exclude voxels based on their RI and RI gradient values in real-time from the observation of the segmentation applied onto the RI data. In an unsupervised approach, this optimization can be automated by optimization algorithms to find the global minimum as preferably defined in cost function of Equation 15.

Figure 41:
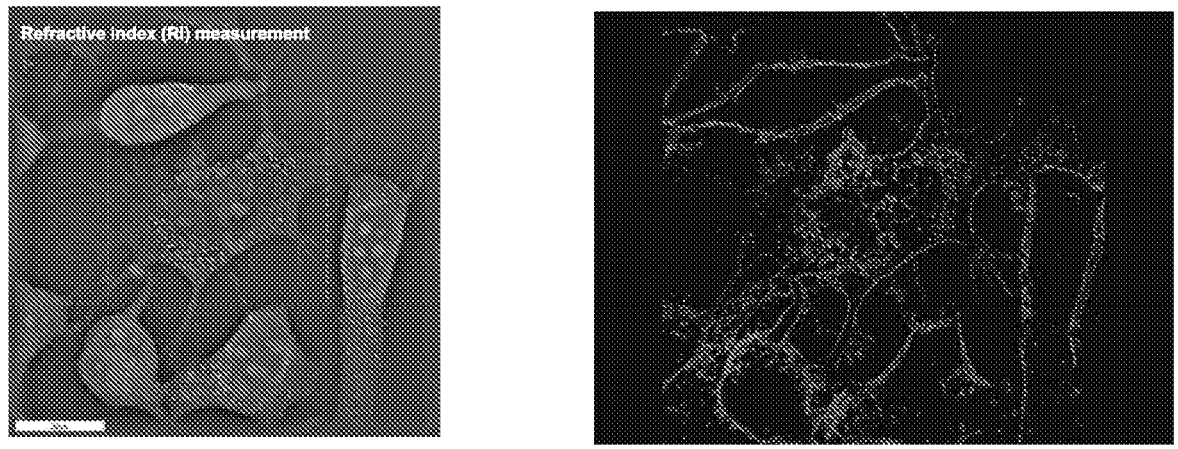

The digital stain set of t calibrated using the chemical staining in two dimensions can then be applied in three dimensions to the acquired RI data to obtain a 3D segmentation specific to the plasma membrane in this example staining as illustrated in FIG. 41.

The use of fluorescence acquisition data for calibrating the digital stain provides some important advantages, in particular to create digital stains that are specific to cell features and that can then be used as references for characterizing the features of a biological specimen using only the RI acquisition. Moreover, the method also allows to use fluorescence microscopy images in order to improve imaging of cell features using 3D cell holographic tomography.

The calibration with fluorescence acquisition according to the present invention on the digital staining process also enables to reduce imaging artefacts inherent to fluorescence imaging.

An important aspect of the calibration with fluorescence acquisition according to the present invention, is that it enables specific long-term imaging of live biological features in a non-invasive manner while fully benefitting from the object characterization obtained by fluorescence imaging (which in conventional methods leads to death of the cells being imaged and thus only allows a short time of observation of the living biological specimen).

Referring to FIGS. 42-49, various examples of the above mentioned advantages are illustrated.

Figure 42:
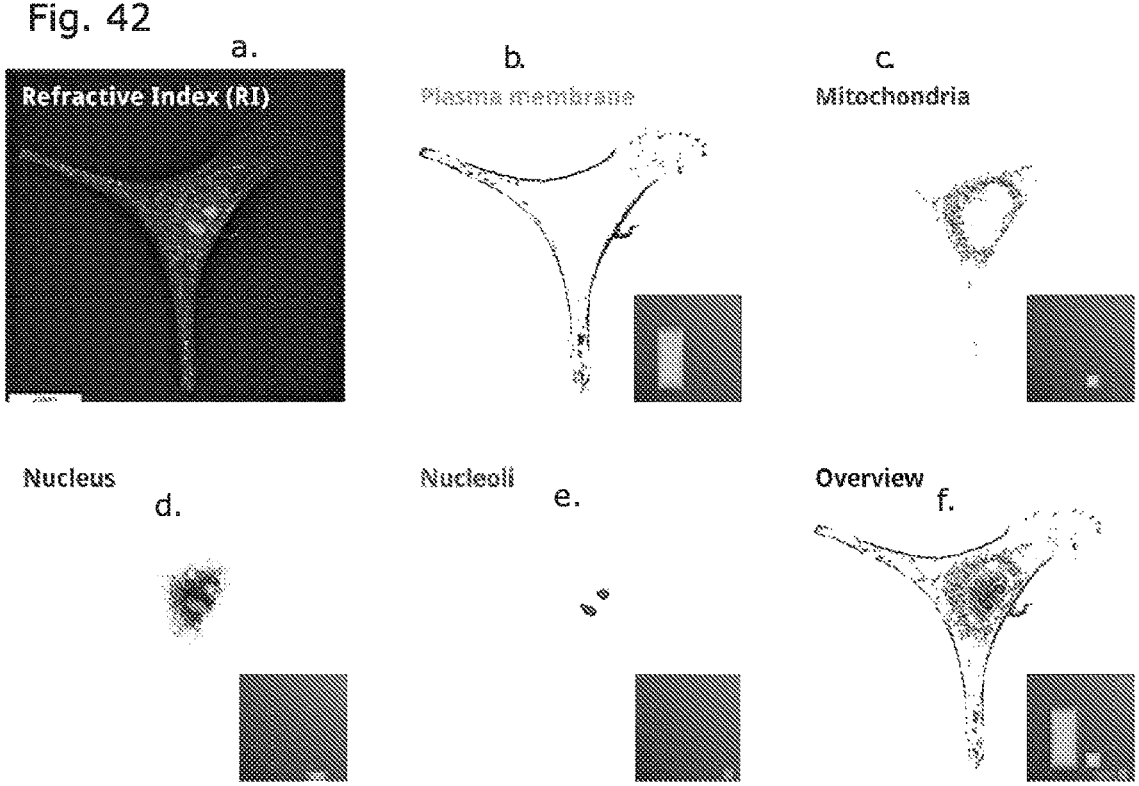
FIGS. 42 to 47 show various examples of images processed by the microscopic object characterization system according to embodiments of this invention to highlight certain advantages of the digital stain calibration using fluorescence microscopy, whereby

In FIG. 42, an image based on the acquisition of refractive index by a microscope according to this invention is illustrated (a.) and various specific features that may be obtained by calibration with fluorescence imaging are illustrated, for instance the plasma membrane (b.), mitochondria (c.), the nucleus (d.), the nucleoli (e.) which may be combined to provide the overview as shown in FIG. 42f.

The use of fluorescence imaging in combination with the refractive index acquisition can for instance be used for spatial segmentation by digital stains of cell organelles and cell types, or for temporal segmentation by digital stains of live cell cycles and cell death, or in yet another example for quantitative cell biology by digital stains for nuclear volume measurements.

Figure 43:
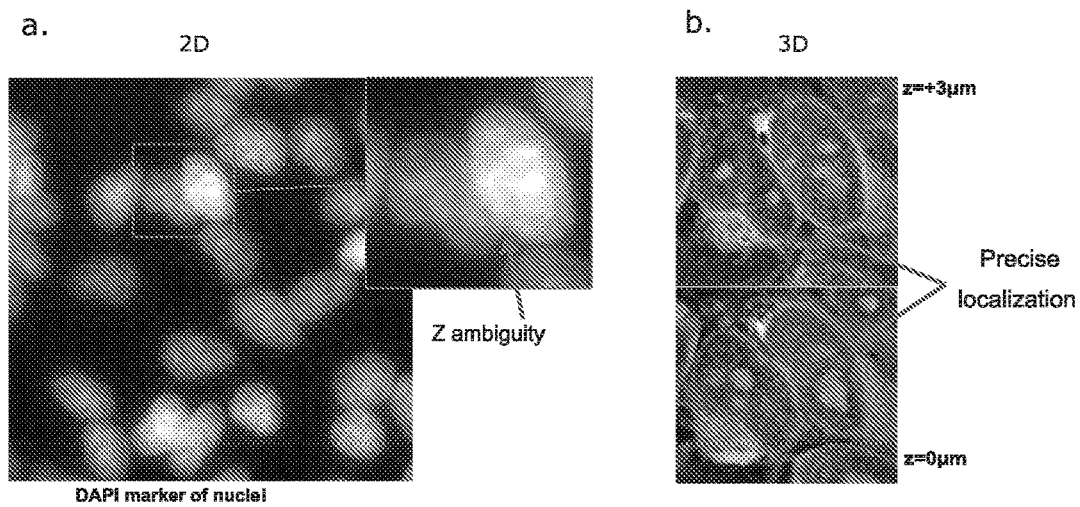

As illustrated in FIG. 43, 2D fluorescence microscopy acquisitions contain ambiguities in the axial localization of the cell features and can be exploited to calibrate digital stains which then allow for removing ambiguities and thus obtaining precise localization of features in three dimensions. In the example shown, the nuclei are marked by DAPI in the fluorescence acquisition image and may be overlaid with a slice of a 3D refractive index acquisition in order to calibrate the digital stain specific to the Nucleus. Extending the calibrated digital stain from two dimensions to the three dimensional reconstruction allow for a specific segmentation of the data where localization ambiguities are removed.

Figure 44:
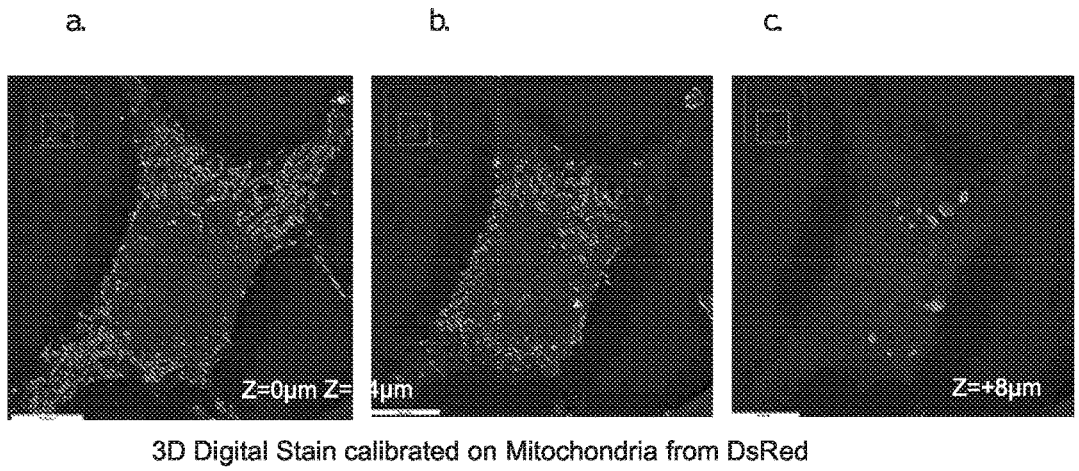

FIG. 44 illustrates a further example of transforming 2D fluorescence microscopy into 3D cell tomography, in this case for the generation of a 3D digital stain calibrated on mitochondria from the chemical marker DsRed. This example illustrates how one can determine the 3D mitochondrial network's spatial configuration and morphology within the cell by slices through different depths from z=0 mum (adherent cell part) to z=8 mum (upper cell part). In addition, the shown overlay between the refractive index measurement M and the segmented (through calibration on DsRed) feature allows to contextualize the mitochondrial network in its cellular embodiment.

Figure 45:
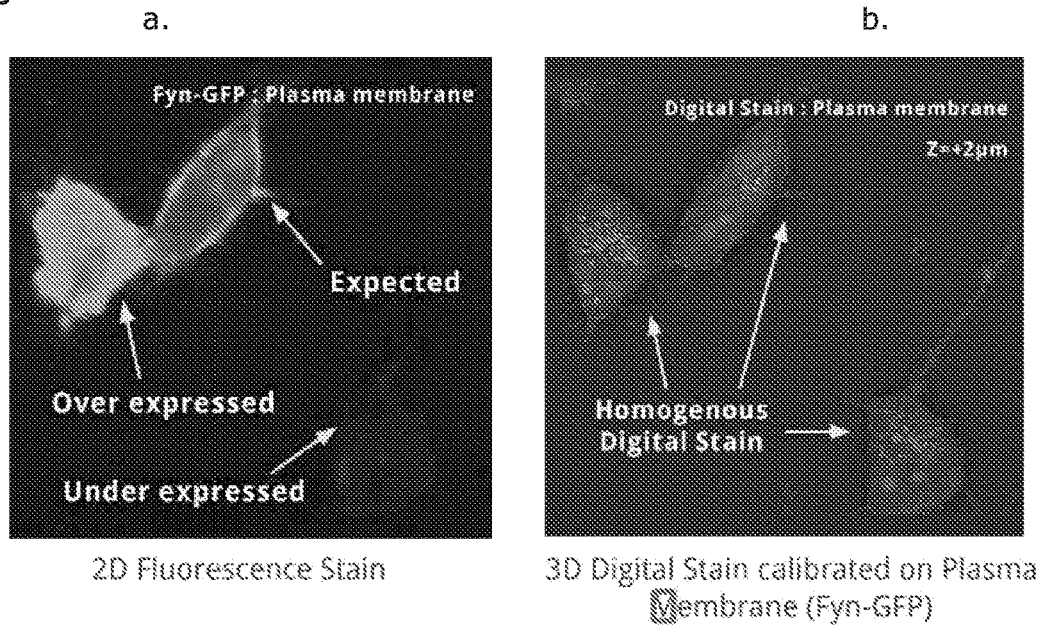
Figure 46:
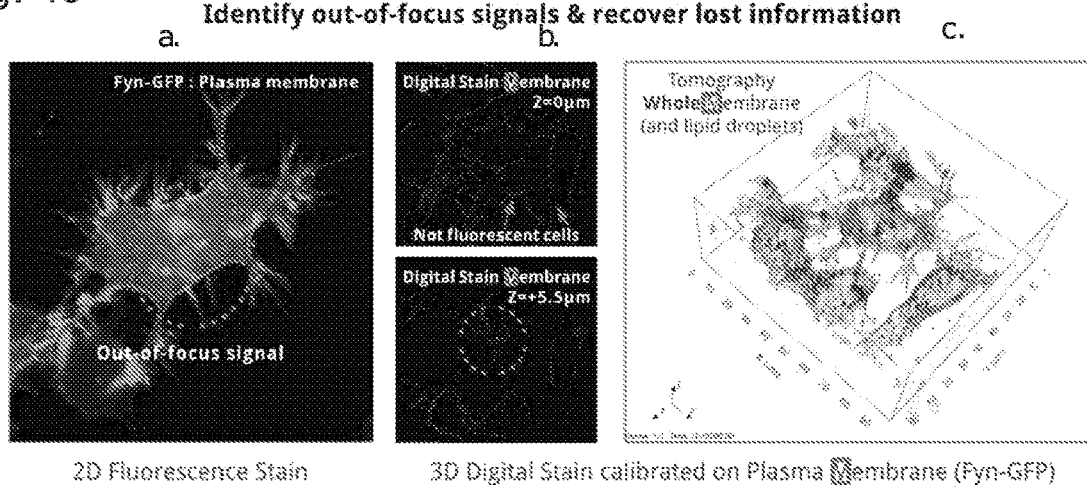

Referring to FIG. 45, an example of the correction for imaging artefacts in fluorescence microscopy is performed by the digital staining process according to the embodiment of the invention. In FIG. 45a, a 2D fluorescence stain is illustrated where certain regions are overexpressed, underexpressed, or as expected, properly expressed and this be transformed with a digital stain using RI acquisition according to the process of the invention, to homogenize the results (getting rid of chemical stain expression fluctuations and of chemical staining disparity) in order to obtain a calibrated 3D digital stain that is specific to the biological feature of plasma membrane.

Other imaging artefacts may also be corrected by the digital stain imaging process according to the embodiment of this invention on 2D fluorescent stain images, for instance comprising an out of focus signal in a plasma membrane as illustrated in FIG. 46a, which is transformed using a 3D stain calibrated on the plasma membrane as shown in FIG. 46c. Thanks to this transformation in FIG. 46b, one can actually eliminate the out-of-focus noise in the adherent cell plane (z=0 mum) and precisely localize it at an upper cell position at z=5.5 mum.

Figure 47:
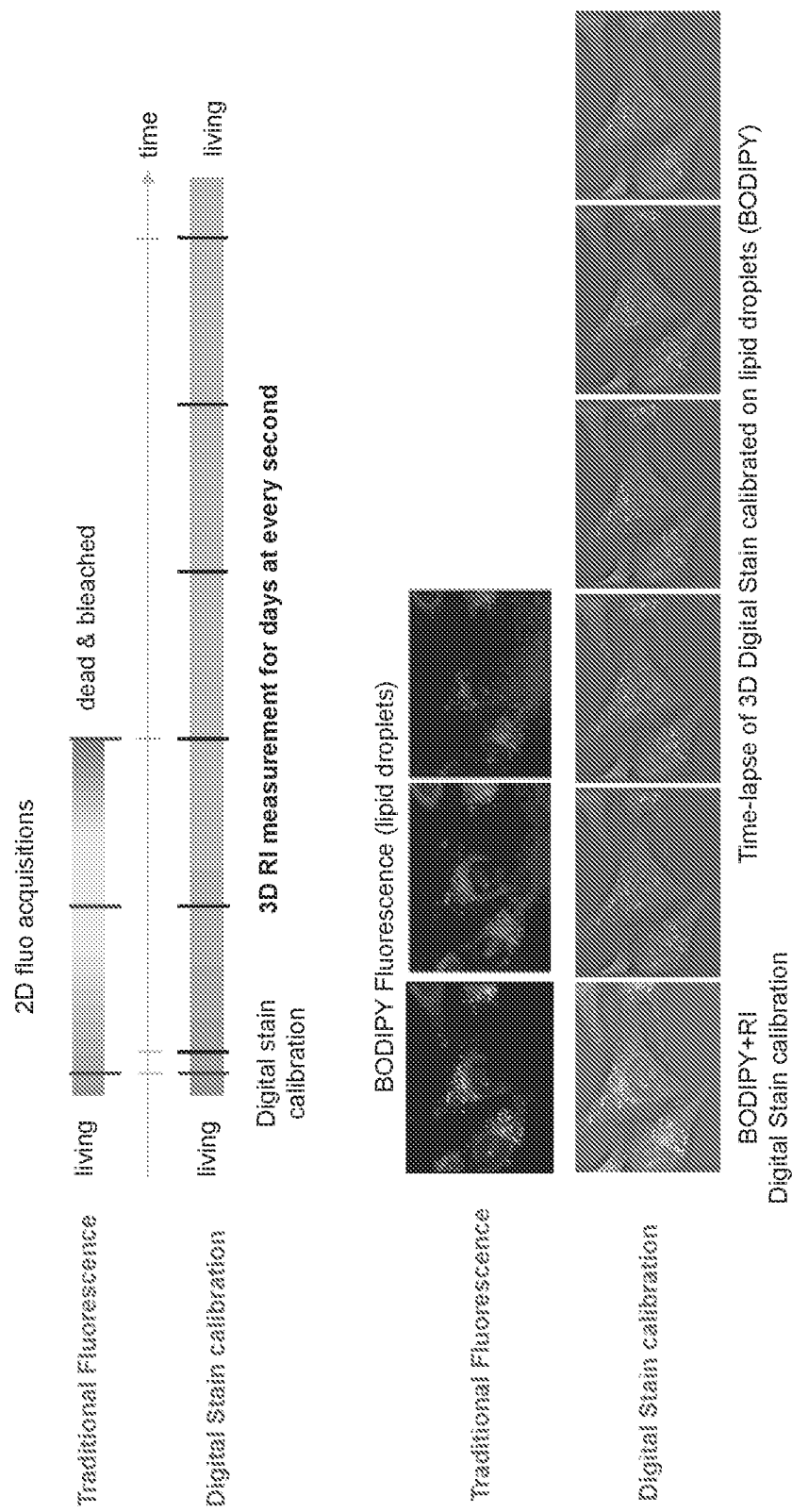

Referring to FIG. 47, as illustrated, calibrating digital stains with fluorescence microscopy acquisition allows to benefit from the results of fluorescence microscopy and can then be used for similar acquisitions without chemical staining to provide three dimensional RI measurements for a long period of time (for instance in the order of days or weeks) on a living cell, which would otherwise not be possible with traditional fluorescence because the addition of chemical markers reduce the lifetime of a cell compared to its normal lifetime in the absence of chemical staining. The example shows that a sensitive chemical marker (Bodipy specifically binding to lipid droplets) is limiting the possible time of cell observation by bleaching effects which result in the loss of signal and cell death through oxidation stress. A single calibration process (which can be repeated when necessary) of the digital stain to this chemical marker of bodipy (hence lipid droplets) allows to overcome this limitation and enables long-term imaging with high biological specific and low cell intrusion.

Figure 48:
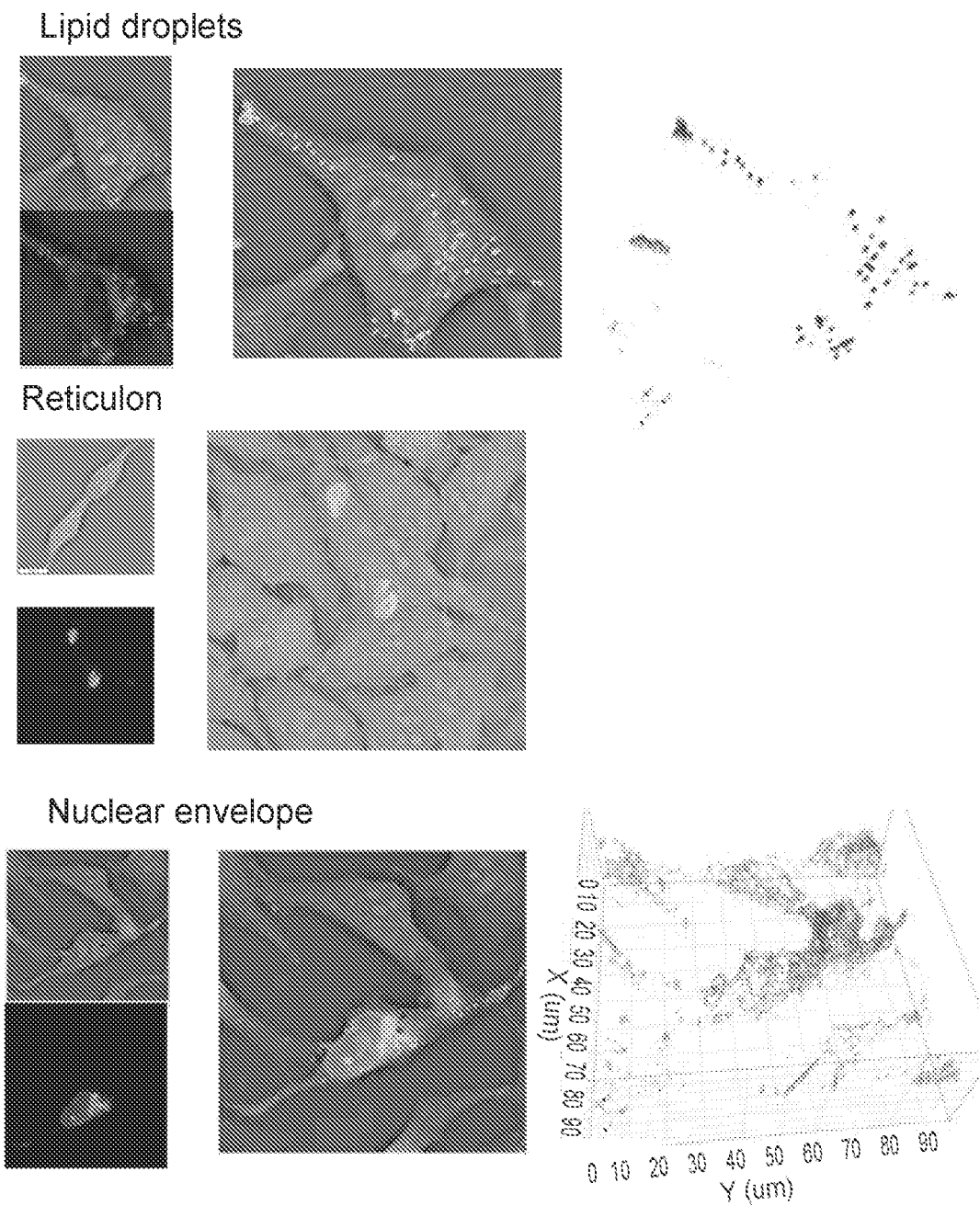

FIG. 48 illustrates examples of cell features that have been digitally stained according to a method of this invention, the various organelles illustrated being a plasma membrane, mitochondria, nucleus, lipid droplets, reticulon and nuclear envelop. In this example, we show for 6 organelles, the process of calibration of the digital stain. A slice of the acquired 3D RI dataset is merged with a 2D epifluorescence image. The correlation between the two types of data allow for defining a digital stain that is specific to the chemically labelled cell feature. The calibrated digital stain may then be applied to the whole 3D RI dataset for a three dimensional segmentation of the data Digital stains calibrated on the fluorescence markers and specific certain cell features may then be defined and stored in libraries as reference data.

In FIG. 49, examples of various organelles represented by their refractive index image acquisition, the fluorescence signal acquisition image and the overlay of the two in order to generate a clearer signature characterizing each of these organelles. The examples being mitochondria (a.), nucleus and nucleoli (b.), membrane (c.), liquid droplets (d.), nuclear membrane (e.) and lysosomes (f.).

Figure 50:
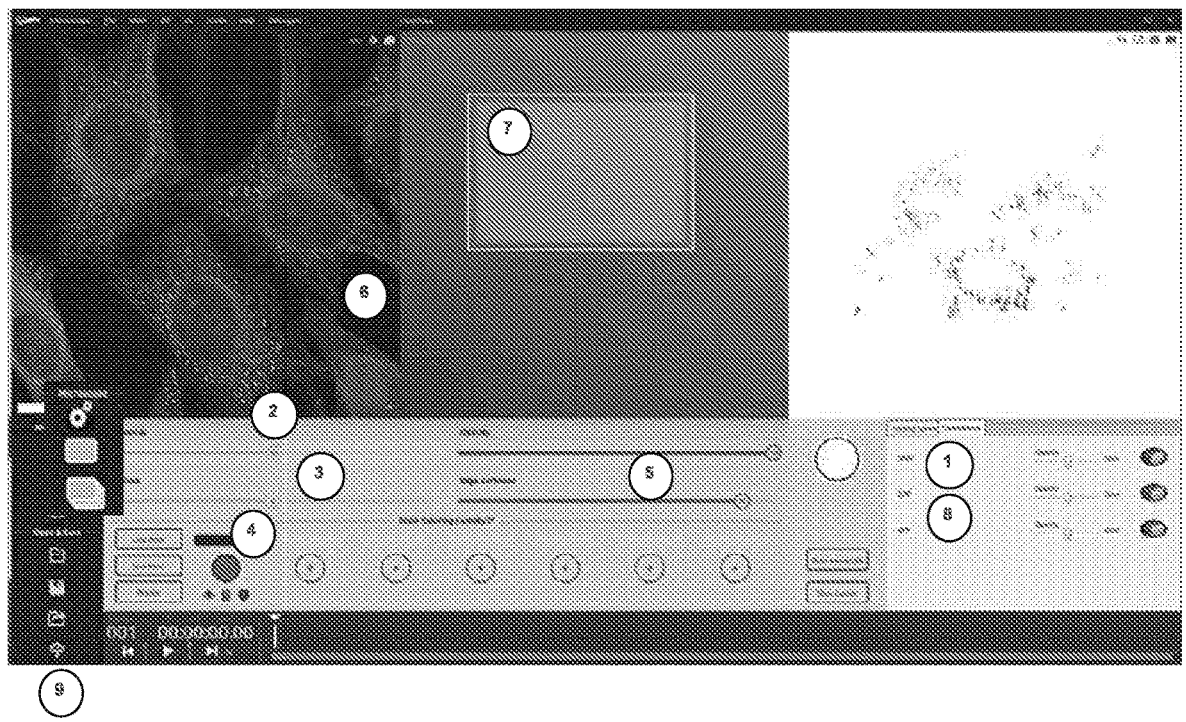
Figure 51:
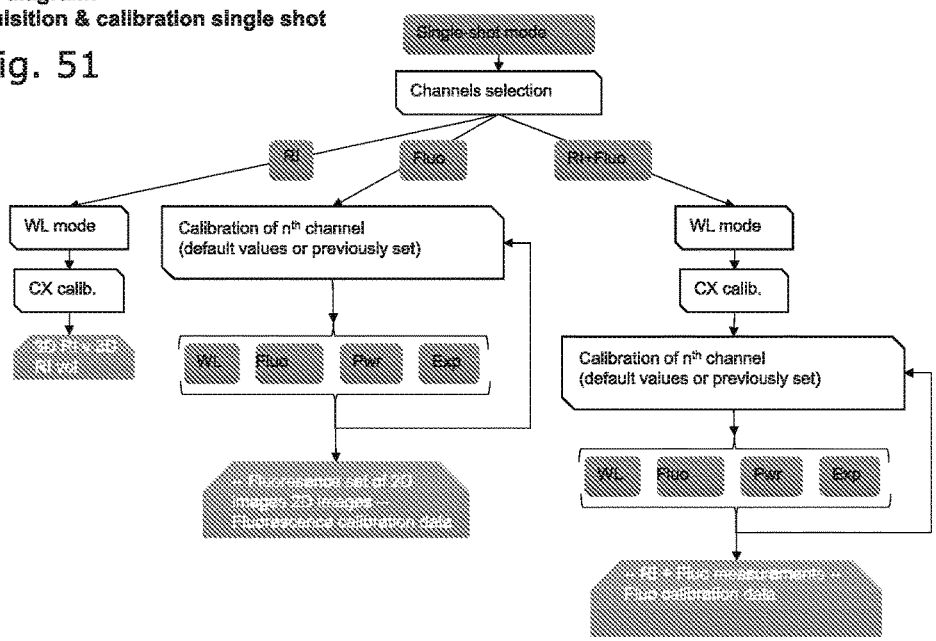
FIG. 51 illustrates a flow diagram of a process according to an embodiment of the invention for acquisition and calibration for a single shot acquisition.
Figure 52:
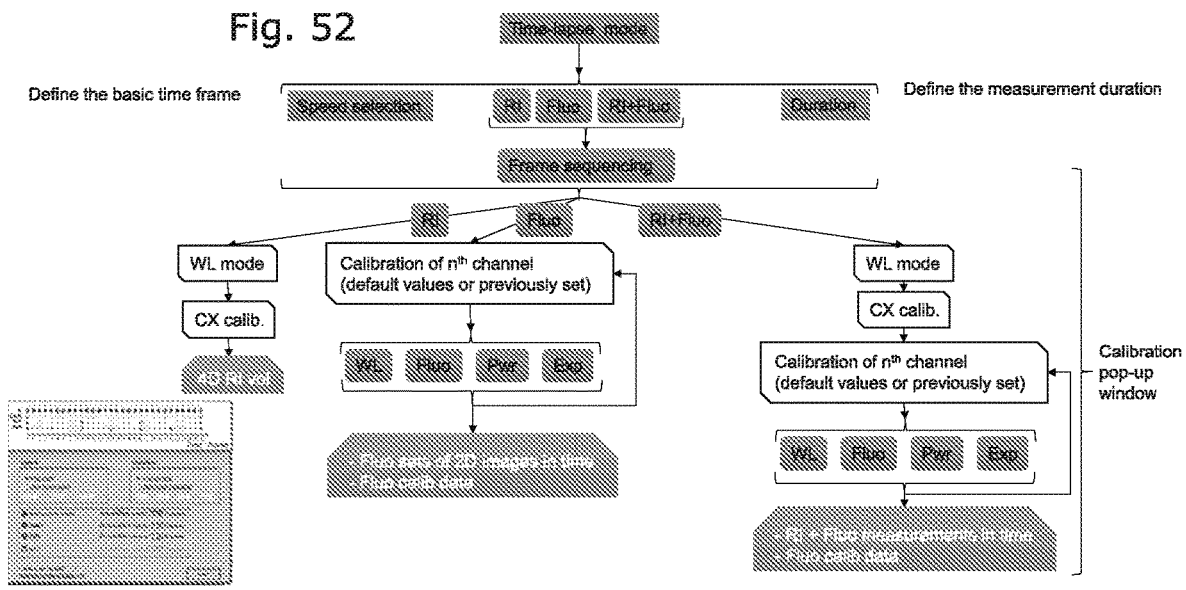
FIG. 52 illustrates a flow diagram of a process for acquisition and calibration of a time lapse acquisition according to an embodiment of the invention.

Referring to FIGS. 50-52, implementation on the use of reference data from epifluorescence to calibrate the digital stains is illustrated, by way of example only, using for instance the following steps:
1) Select the Fluorescence channel of interest used as reference
2) Set the overlay to 50% for a balanced weight of the two data channels in the display panel (an overlay of 0% would leave the RI dataset only in the display panel while 100% shows the epifluorescence data only)
3) Select a slice which contains the organelle/feature of interest
4) Select a Digital Stain (D-stain) and pick a color
5) Play with C-stain saturation if necessary, in order to ease the visual colocalization of the C-stain and the D-stain
6) Zoom in if necessary
7) Adjust in the panel to best match D-stain and C-stain channels. To do so, adjust the D-stain along the two axis (RI and RI gradient) by graphically shrink or stretch its edges in order to label the voxels contained within the pink area being then part of the RI signature of the studied cell feature. Play if necessary with the opacity and the edge softness to have a D-stain with smoother transition in the transformation panel potentially improving this way the rendering on the 3D panel (right panel). Most importantly, to allow for a visual feedback of the overlay between the D-Stain (e.g. red) and C-Stain channel (e.g. yellow), the 2 channels are color-mixed which result for instance in an orange overlay area (see left panel). Adjusting the parameters t in order to maximize the violet overlay area can hence be considered as an example of the supervised feedback through the cost function defined in Equations 13-14.
8) Do similarly for the other C-stains if necessary
9) Save the panel once finished Referring now to FIG. 51, a flow diagram for acquisition and calibration of a snap-shot is illustrated. For this mode, the user needs to first select the channels of measurements: holographic tomography for RI measurement and fluo for epifluorescence measurement. For the Digital stain calibration, the user will select the mode with both RI and fluorescence measurements. The user will select a genuine cell in the sample on which the parameters of the microscope will be adjusted for both imaging methods. Once the setting-up is done the measurements are carried out and the microscope delivers a 3D RI map and one 2D image per fluorescence channel.

Referring now to FIG. 52, a flow diagram for acquisition and calibration of a time lapse is illustrated. In a similar manner as what is described in FIG. 51, once the setting-up is done for each channel and the time-lapse parameters are chosen, measurements are carried out and the microscope delivers a 3D RI map and one 2D image per fluorescence channel at regular independent time instants.

Figure 53:
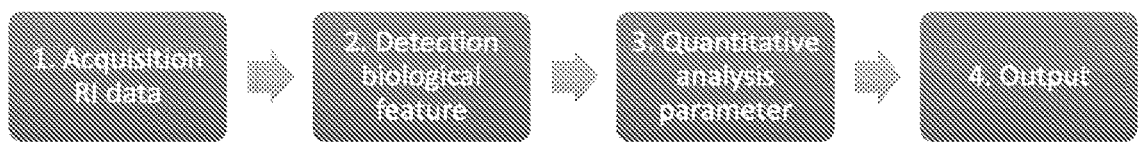
FIG. 53 illustrates a simplified global sequence for analysis of a biological sample with digital stains generated by an object characterization system according to an embodiment of the invention.

Referring to FIG. 53, a simplified flow chart illustrating an example of a typical pipeline for analysis of object characterization data is illustrated.

In the first step corresponding to acquisition of refractive index data, the aim is to generate and export cell populations data, for instance 10 to 100 data sets of refractive index in 2D, 3D and 4D. In a second stage, for the detection of biological features, the aim is to segment the raw datasets with digital stains, beforehand calibrated, specific to the cell features under interest. These D-stains may for example be derived from refractive index, refractive index gradient, refractive index higher order momentums shape detection e.g. Hough transform (adding this way a shape detection algorithm to the voxels classification)], segmentation by RI texture (analysis based on the spatial structure of the RI distribution) machine learning of complicated structures [, reference data and similar (refine the features detection with machine learning algorithm fed with prior feedbacks from prior segmentation on reference and/or similar datasets).

In the third stage the aim is to objectively and repeatedly quantify the measurements and produce parameters that allow for quantitative analysis. It thus means extract meaningful metrics for quantitative biology from the segmented data that may then be used to demonstrate the scientific validation of a hypothesis, for example:

compare outputs with reference cell line for e.g. cell growth monitoring demonstrate a scientific hypothesis on large cell populations produce distribution plots (like used in gating of cytometry analysis) to have a statistical significance of the scientific question under study drawing on quantitative and reliable analysis

LIST OF TERMS/DEFINITIONS

| Tomographic holography | 3D RI based on a holographic detection scheme imaging system |
|---|---|
| Transfer function | A Transfer Function is the ratio of the output of a system to the input of a system based on Refractive Index in multi-dimensional space (real or spatial frequency space). |
| Real Space | N dimensional space of RI distribution as measured by singular acquisition or time-lapse |
| SFD or k-space | Spatial frequency space as the Fourier Transform of Real Space of same rank |
| RI | Refractive index (distribution) |
| 3D RI | Tomographic reconstruction in Real space of RI |
| 4D RI | Time lapse of 3D RI |
| 4D + 1 RI | Correlative imaging of 4D RI |
| (4D Cell Parts) recognition | Automated object characterization, pathologies, critical analysis |
| Specimen Or Sample | A translucent microscopic object such as a cell, bacterium, or virus |
| 4D Prediction | Prediction of Cell behavior (e.g. mitosis, necrosis, etc) and/or |
| Cell event detection | Detection of cellular events (e.g. virus infection) smaller than originally allowed by the optical resolution of the imaging system |
| Calibration | Population of tree of cells, SEM, TEM, cross-referencing/comparison with model, etc. |
| Sampling | Acquisition |
| Characteristic behavior | Indirect (secondary effect) discovery of virus infection/transcription |
| Resolution | ∞-resolution > model or calibration limited |
| Shape recognition | orientation (k-space) & magnification (fractal wavelet) independent/robust (noise limit > fuzzy logic) with possible iterative adaption |
| General equation | Reference + bitmap > vector with prediction (resolution and/or dynamic) |
| Recursive sampling | set of references > 3d acquisition device > comparison device > output device |
| Model adaption | real space > k-space > band-pass limited noisy > Bayesian fit |

The invention claimed is:

1. A method of digital characterization of a microscopic object based on measured refractive index data representing at least a spatial distribution of measured values of refractive index (RI) or values correlated to refractive index of said microscopic object, the method comprising: inputting in a computing system said measured refractive index data; executing an algorithm applying a plurality of transformations on said refractive index data to generate a spatial distribution of a plurality of parameters; the method further comprising associating a label characterizing a feature of the microscopic object to a defined range of values of said plurality of parameters, whereby different features of the microscopic object are characterized by different defined ranges of values of the plurality of parameters and associated to different labels, wherein the microscopic object is biological matter, including any of prokaryotes or eukaryotic organisms, wherein said distribution of a plurality of parameters and associated labels define an n dimension stain space, n being greater than 1.

2. Method according to claim 1, wherein said plurality of transformations on said refractive index data generates a three dimensional spatial distribution of the plurality of parameters.

3. Method according to claim 1, further comprising a segmentation of the n dimension stain space, said segmentation including generating at least one feature dataset comprising ranges of values of said plurality of parameters and said associated label characterizing at least one feature of the microscopic object.

4. Method according to claim 3 wherein the segmentation includes a feedback loop for adjusting values of said feature dataset based on external or user based input.

5. Method according to claim 4 wherein said feedback includes user based inputs from said user visualizing said image displayed on a screen.

6. Method according to claim 5 wherein said feedback includes external inputs, said external inputs including any one or more of previously acquired data characterizing microscopic objects, data on reference objects, data from machine learning programs, data characterizing the microscope by which the microscopic object is measured, shape recognitions programs, or correlation functions of said external data with the microscopic object.

7. Method according to claim 6 wherein said feedback includes any one or more of reference object inputs, for instance geometrical objects, calibrated objects such as previously validated tomograms of organelles, physical constrains such as connected membranes or flux continuity of organelles, or physical constrains related to the microscope by which the microscopic object is measured.

8. Method according to claim 1 further comprising associating a stain colour to said at least one feature dataset and generating an image file for display of said at least one feature on a screen for a user to visualize.

9. Method according to claim 8 wherein the microscopic object comprises a plurality of different features, a plurality of feature datasets being generated, each feature dataset characterizing a different one of said plurality of different features.

10. Method according to claim 9, wherein different stain colors are associated to different features.

11. Method according to claim 1 comprising generating an image file for display of the microscopic object including a plurality of features on a screen for a user to visualize.

12. Method according to claim 1 wherein the biological matter is a eukaryotic cell or a portion of a eukaryotic cell.

13. Method according claim 1 wherein the feature comprises an organelle of a cell, or a combination of organelles of a cell.

14. Method according to claim 1 wherein said measured refractive index data is a complex refractive index distribution, represented by phase and intensity values, of the measured microscopic object.

15. Method according to claim 1 wherein said plurality of parameters include spatial and temporal parameters in order to characterize or visualize a behavior over time of the microscopic object or a portion thereof.

16. Method according to claim 1 wherein said plurality of transformations include transfer functions operated on the input measured refractive index data.

17. Method according to claim 16 wherein said transfer functions comprise any one or more functions in the form of integral, cumulative, frequency, derivative, wavelet inc. factal, Fourier, Gabor, Laplacian transform, or through Harmonic analysis, and the use of discrete, discrete-time, data-dependent, linear or non-linear, metric functions, distribution functions, logical operators, bandpass filters, color functions, hardness, alpha and gamma transfer functions, surface rendering such as diffusion, Hugh transforms, and imaging processing transforms such as ridge or edge detection.

18. Method according to claim 1, comprising providing a microscope configured for three dimensional tomographic imaging of biological specimens, and acquiring with the microscope said measured refractive index data representing at least a spatial distribution of measured values of refractive index (RI) or values correlated to refractive index of said microscopic object, said microscopic object being a biological specimen.

19. Method according to claim 18 further comprising chemically staining the biological specimen and acquiring with the microscope, fluorescence image data from the biological specimen.

20. Method according to claim 19 further comprising inputting in a computing system said measured refractive index data and said fluorescence image data and computing a correlation between said measured refractive index data and said fluorescence image data to generate reference data characterizing one or more features of the biological specimen, the reference data being stored in a memory.

21. A non-transient computer-readable medium having tangibly stored thereon instructions that, when executed by a processor, perform the method of claim 1.

22. A computing apparatus comprising a processor and a memory having stored thereon instructions that, when executed by the processor, perform the method of claim 1.

23. Microscopic object characterization system comprising a computer system, a microscope with a computing unit connected to the computer system, and an object characterization program executable in the computer system configured to receive refractive index data representing at least a spatial distribution of measured values of refractive index (RI) or values correlated to refractive index of said microscopic object, the object characterization program executes an algorithm applying a plurality of transformations on said refractive index data, the transformations generating a distribution of two or more parameters used to characterize features of the microscopic object, the computer system further comprising a feedback interface configured for connection to a data server in a network computing system via a global communications network and configured to receive feedback data from the data center server for processing by the object characterization program to refine or enhance a characterization of said features, further comprising a display module configured to generate a command and object visualization panel for display on a screen, the command and object visualization panel including an input panel, a digital stain panel, and a visualization panel, the input panel providing a visual representation of the refractive index input data, the digital stain panel providing a view of at least two of said parameters used to characterize the microscopic object and configured to allow parameter ranges to be set interactively by a user, and the visualization panel providing a visual representation of the characterized microscopic object, wherein different colors are associated to each parameter range such that the depicted shapes representing parameter ranges in the digital stain panel have different colors, these colors being applied at each spatial position of the microscopic object where the parameters fall within the range corresponding to that color for visualization in the visualization panel.

24. Microscopic object characterization system according to claim 23 comprising a plurality of said microscopes and a plurality of said computer systems interconnected to the network computing system.

25. Microscopic object characterization system according to claim 23 further comprising a database accessible by authorized users of the system, the database populated with datasets describing features of microscopic objects.

26. Microscopic object characterization system according to claim 25 wherein the database is configured to receive data uploaded by authorized users of the system, in particular datasets describing features of microscopic objects.

27. Microscopic object characterization system according to claim 25 wherein the database is installed in a data server in the network.

28. Microscopic object characterization system according to claim 23 wherein each different parameter range is associated to a corresponding different feature of the microscopic object.

29. A method of digital characterization of a microscopic object based on measured refractive index data representing at least a spatial distribution of measured values of refractive index (RI) or values correlated to refractive index of said microscopic object, the method comprising: inputting in a computing system said measured refractive index data; executing an algorithm applying a plurality of transformations on said refractive index data to generate a spatial distribution of a plurality of parameters; the method further comprising associating a label characterizing a feature of the microscopic object to a defined range of values of said plurality of parameters, whereby different features of the microscopic object are characterized by different defined ranges of values of the plurality of parameters and associated to different labels, wherein said distribution of a plurality of parameters and associated labels define an n dimension stain space, n being greater than 1.

30. Method according to claim 29, further comprising a segmentation of the n dimension stain space, said segmentation including generating at least one feature dataset comprising ranges of values of said plurality of parameters and said associated label characterizing at least one feature of the microscopic object.

* * * * *